(12) United States Patent
Puchkoff

(10) Patent No.: US 10,384,590 B2
(45) Date of Patent: Aug. 20, 2019

(54) UTILITY CARGO SYSTEM FOR VEHICLE

(71) Applicant: Jerome Puchkoff, Boyton Beach, FL (US)

(72) Inventor: Jerome Puchkoff, Boyton Beach, FL (US)

( * ) Notice: Subject to any disclaimer, the term of this patent is extended or adjusted under 35 U.S.C. 154(b) by 0 days.

(21) Appl. No.: 15/443,421

(22) Filed: Feb. 27, 2017

(65) Prior Publication Data

US 2017/0166105 A1    Jun. 15, 2017

Related U.S. Application Data

(63) Continuation-in-part of application No. 29/569,981, filed on Jul. 1, 2016, now Pat. No. Des. 808,887, and a continuation-in-part of application No. 14/582,229, filed on Dec. 24, 2014, now Pat. No. 9,580,004.

(60) Provisional application No. 61/935,076, filed on Feb. 3, 2014, provisional application No. 61/921,265, filed on Dec. 27, 2013.

(51) Int. Cl.
  *B60R 9/06*    (2006.01)
  *B60P 7/08*    (2006.01)

(52) U.S. Cl.
  CPC .............. *B60P 7/0815* (2013.01); *B60R 9/06* (2013.01)

(58) Field of Classification Search
  CPC .................................................. B60P 7/0815
  USPC ....................... 410/110; 296/3; 224/405, 403
  See application file for complete search history.

(56) References Cited

U.S. PATENT DOCUMENTS

| | | | | |
|---|---|---|---|---|
| 2,289,366 A | * | 7/1942 | Johnson | B66C 7/00 414/542 |
| 2,557,253 A | * | 6/1951 | Belden | B60P 1/5442 212/180 |
| 2,773,606 A | * | 12/1956 | Shepherd | A01G 23/043 212/74 |
| 2,778,512 A | * | 1/1957 | Strona | B66C 1/24 212/74 |
| 2,927,704 A | * | 3/1960 | Condon | B65G 47/90 212/336 |
| 3,482,716 A | * | 12/1969 | Leadley | B60P 1/54 212/74 |
| 3,768,670 A | * | 10/1973 | Cloud | A61G 19/00 212/225 |
| 3,863,782 A | * | 2/1975 | Sandrock | B60P 1/5442 212/74 |
| 3,899,089 A | * | 8/1975 | Wardlaw | B60P 1/548 212/180 |
| 4,187,048 A | * | 2/1980 | Bohlmann | B60P 1/5442 414/348 |

(Continued)

*Primary Examiner* — Hilary L Gutman
(74) *Attorney, Agent, or Firm* — S&L US IP Attorneys, P.C.; Timothy Marc Shropshire

(57) ABSTRACT

Embodiments of a modular cargo system for use with a vehicle, such as a pickup truck, may include side rails and stanchions securing the side rails to the vehicle. At least one hoop may be provided for connection to either the stanchions or the side rails. Each hoop may include a plurality of legs, a clamp connected to each leg, an elbow connected to each leg opposite the clamp, and a lateral cross bar connected between the elbows. Bed dividers and storage lockers or boxes are disclosed for use with embodiments of a cargo system as applied to a pickup truck. Elevated rails may be attached to the hoops. A cargo loading device for moving cargo into and out of the vehicle is also provided. A cover may enclose a portion of the vehicle, such as the truck bed.

8 Claims, 50 Drawing Sheets

(56) References Cited

U.S. PATENT DOCUMENTS

| | | | | |
|---|---|---|---|---|
| 4,297,071 A * | 10/1981 | Dunbar | B60P 1/5442 | 212/74 |
| 4,930,970 A * | 6/1990 | Sunderland | B60P 1/5442 | 212/227 |
| 5,028,198 A * | 7/1991 | Buhr | B60P 1/5442 | 212/180 |
| 5,062,760 A * | 11/1991 | Samaniego | B60P 1/5442 | 212/322 |
| 5,391,042 A * | 2/1995 | Song | B60P 1/00 | 212/225 |
| 5,486,082 A * | 1/1996 | Feldman | B60P 1/54 | 212/252 |
| 5,718,555 A * | 2/1998 | Swalheim | B60P 1/36 | 414/502 |
| 5,720,400 A * | 2/1998 | Altizer, Sr. | B60P 1/5471 | 212/180 |
| 5,743,702 A * | 4/1998 | Gunderson | B60P 1/5442 | 224/403 |
| 5,862,926 A * | 1/1999 | Johnson | B60P 1/5442 | 212/180 |
| 6,126,379 A * | 10/2000 | Feldman | B60P 1/5442 | 254/4 R |
| 7,011,486 B2 * | 3/2006 | Dyer | B60P 1/54 | 212/180 |
| 7,413,394 B2 * | 8/2008 | Risser | B60P 1/5442 | 212/74 |
| 7,744,333 B2 * | 6/2010 | Chaddock | B60P 1/6481 | 212/306 |
| 8,534,980 B2 * | 9/2013 | Kuramoto | B60P 1/5409 | 212/180 |
| D717,230 S * | 11/2014 | Fichter | D12/414 | |
| D722,007 S * | 2/2015 | Ting | D12/414 | |
| D748,565 S * | 2/2016 | Brown | D12/414 | |
| 2010/0183413 A1 * | 7/2010 | Owens | B60P 1/5442 | 414/542 |
| 2012/0217216 A1 * | 8/2012 | Owens | B60P 1/5423 | 212/277 |
| 2016/0039325 A1 * | 2/2016 | Septimio | B60P 1/5423 | 414/542 |

\* cited by examiner

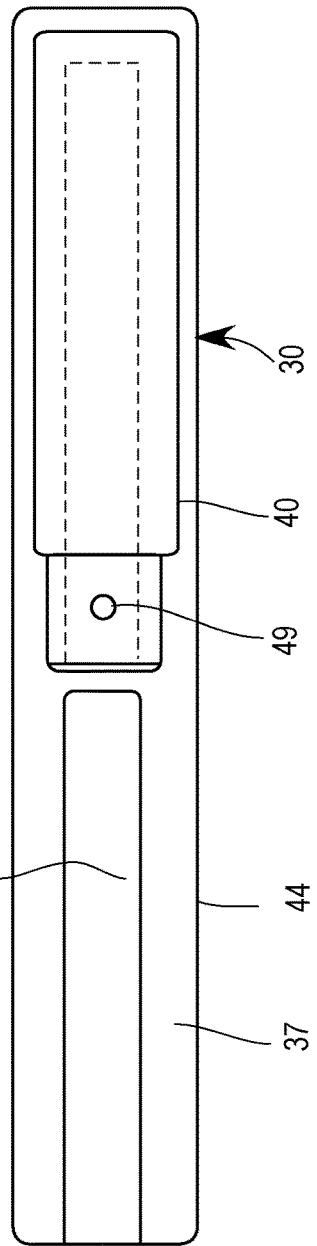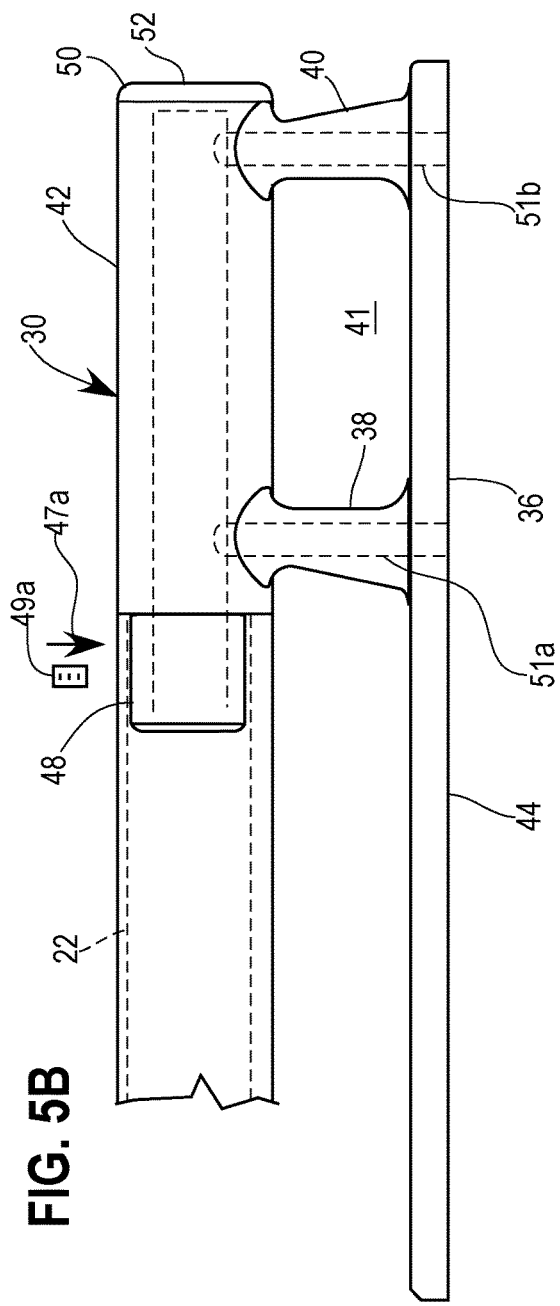

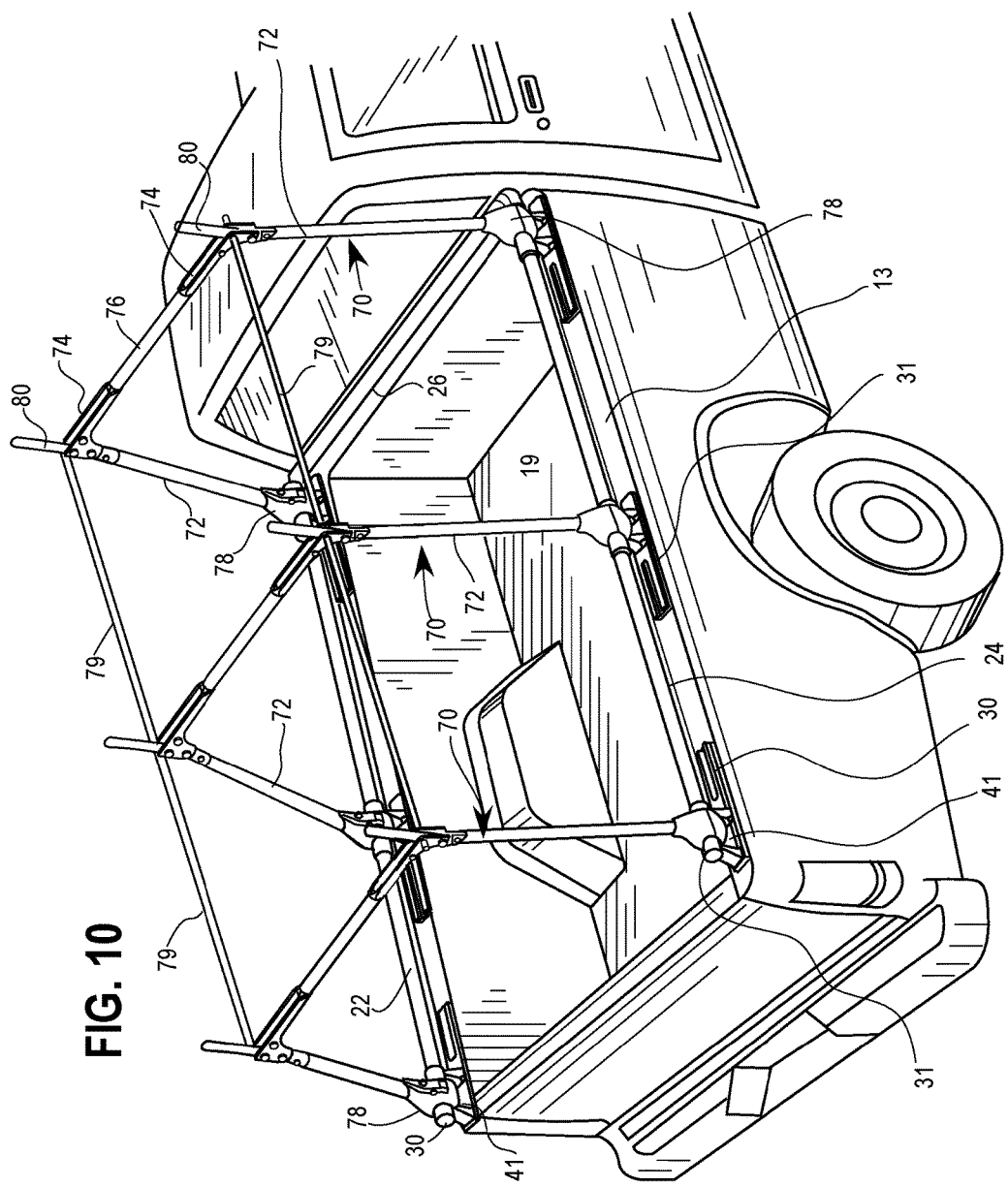

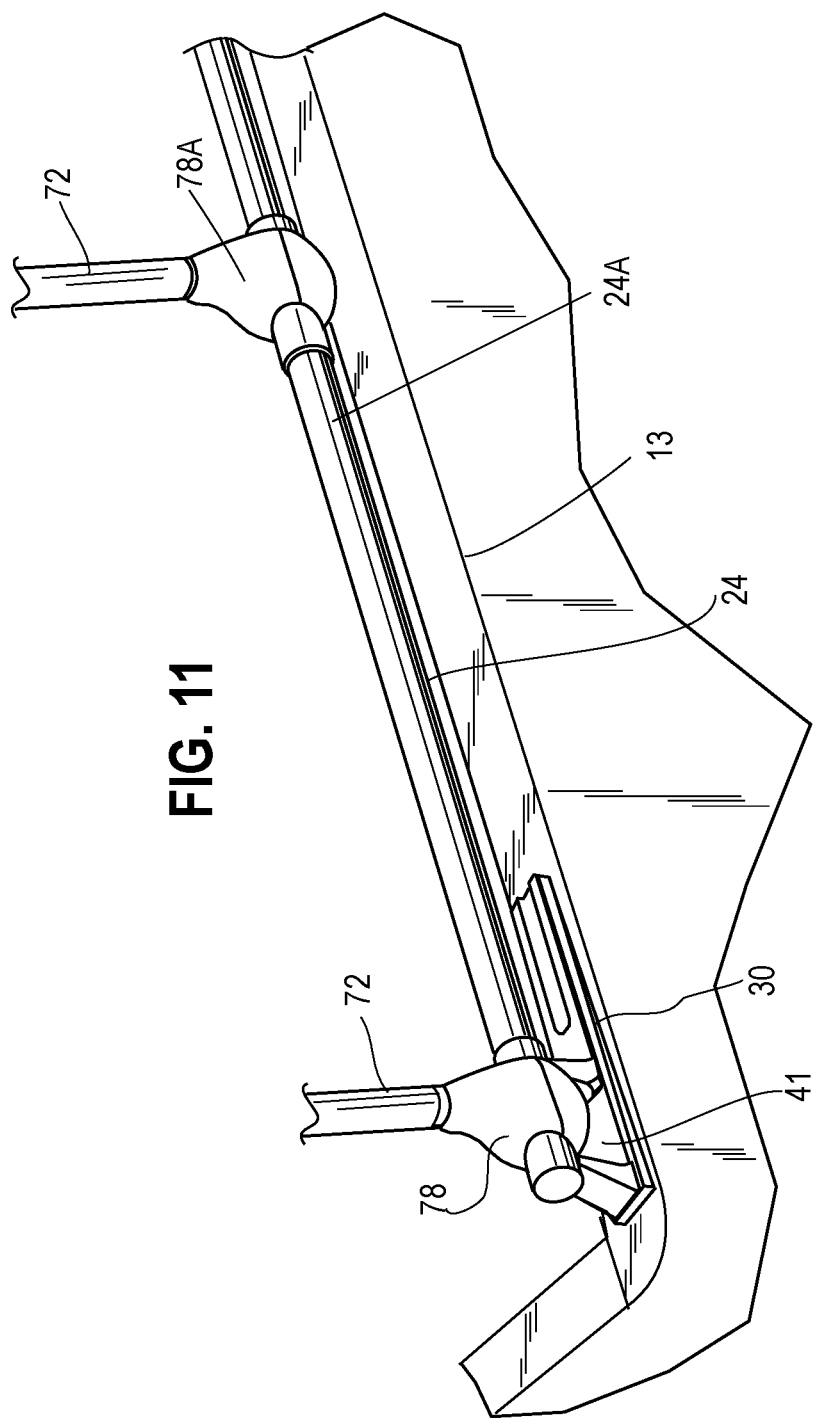

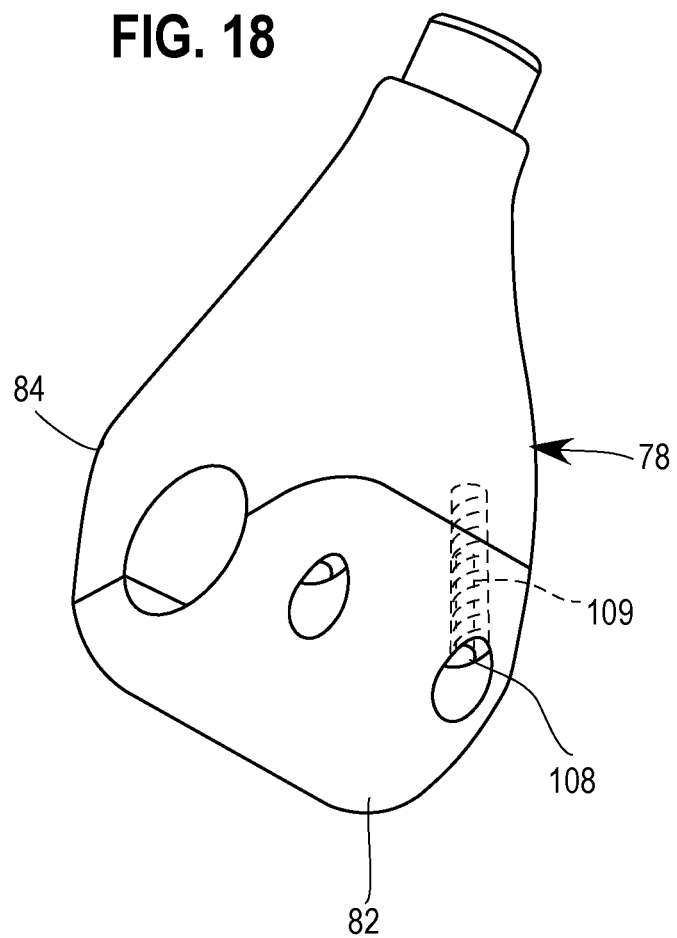

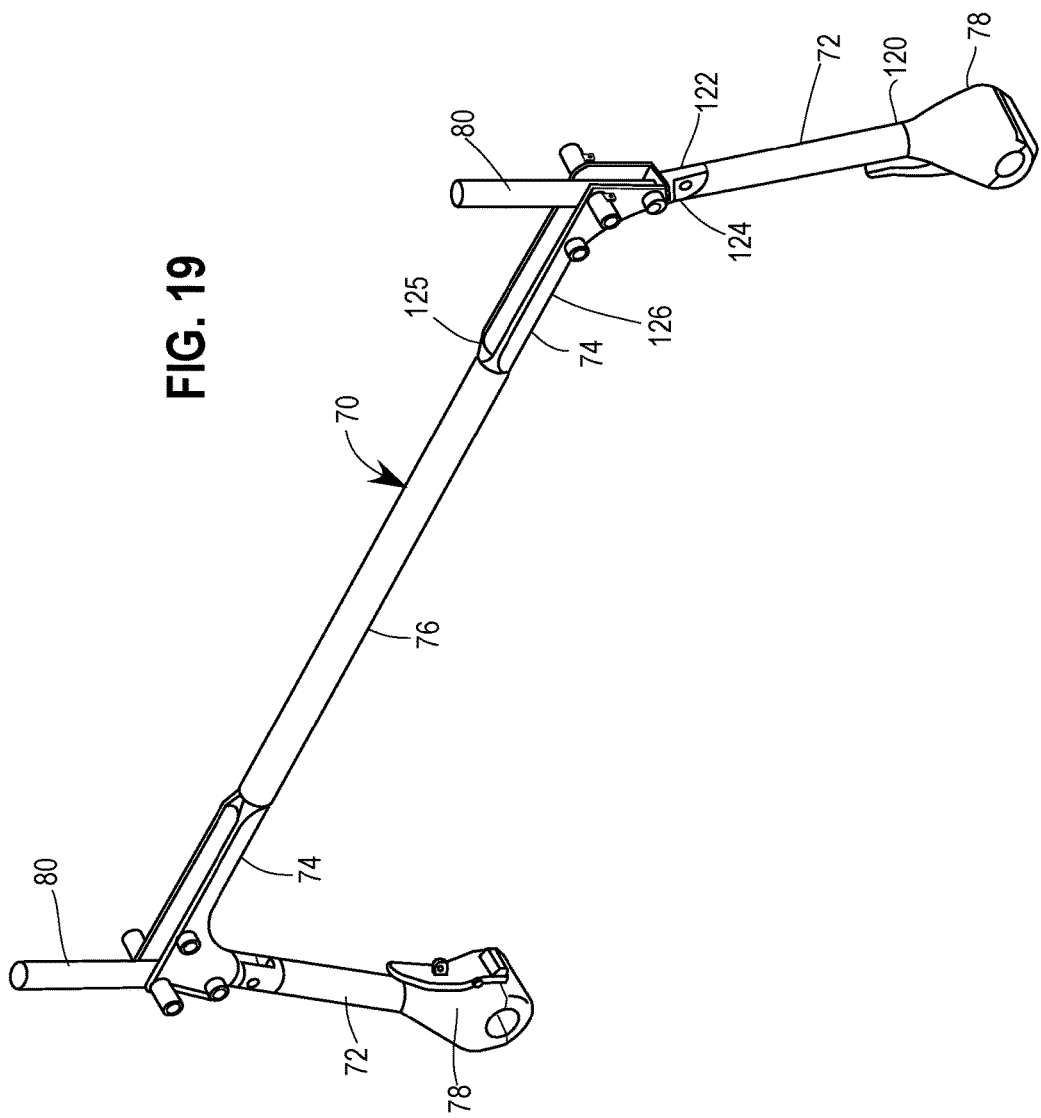

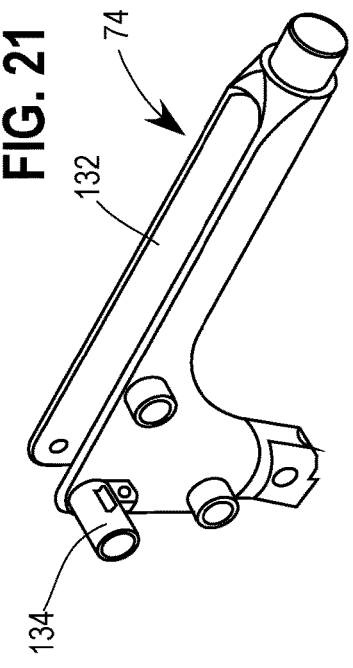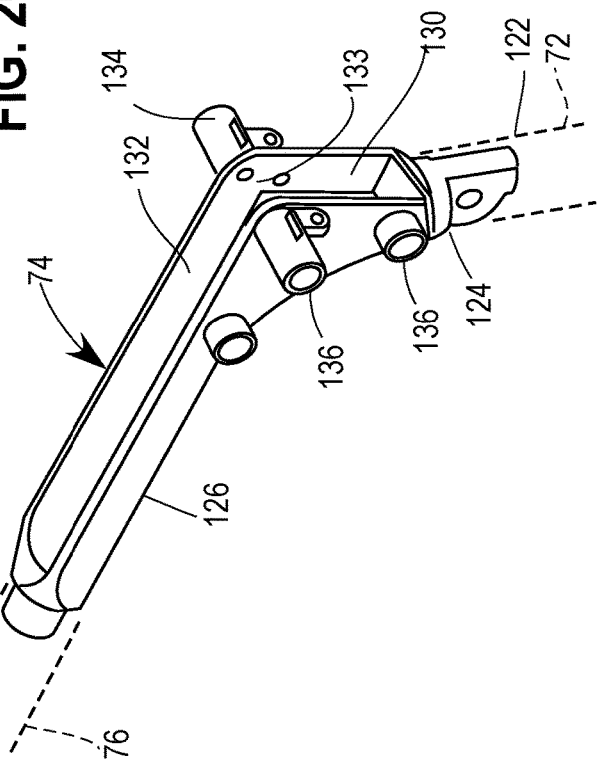

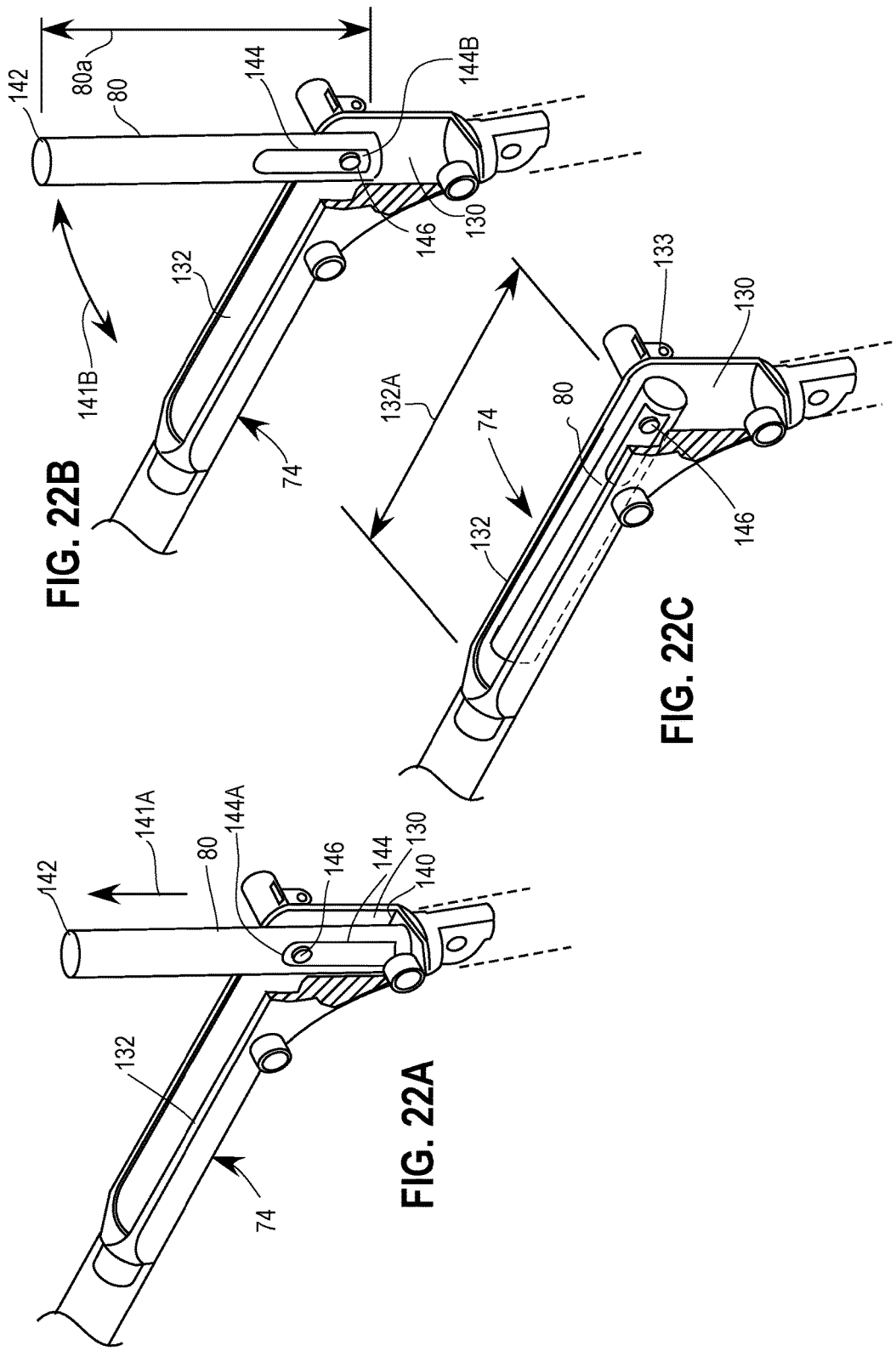

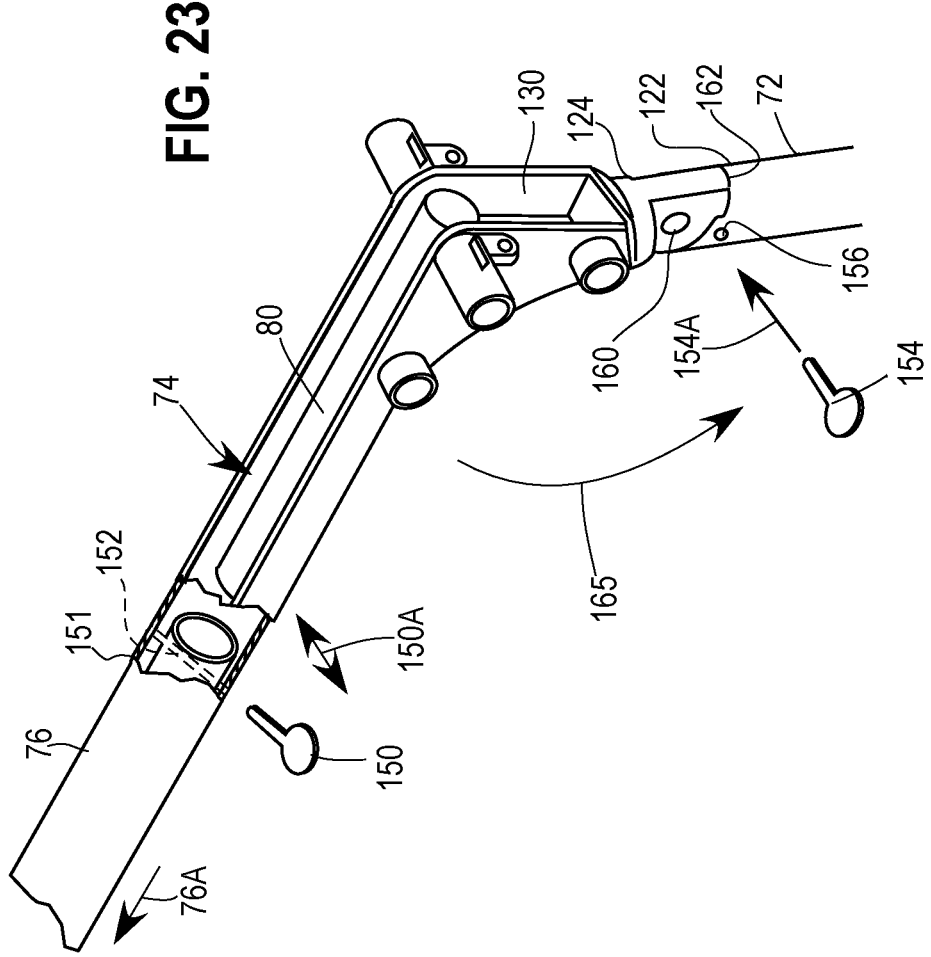

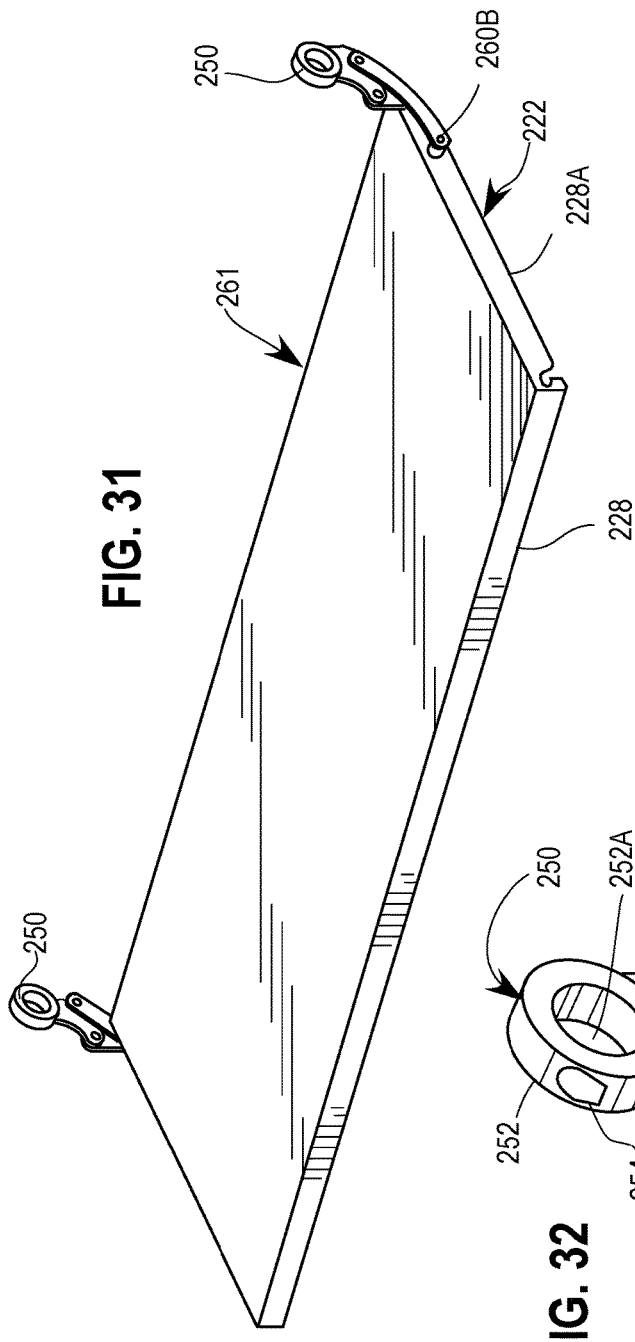
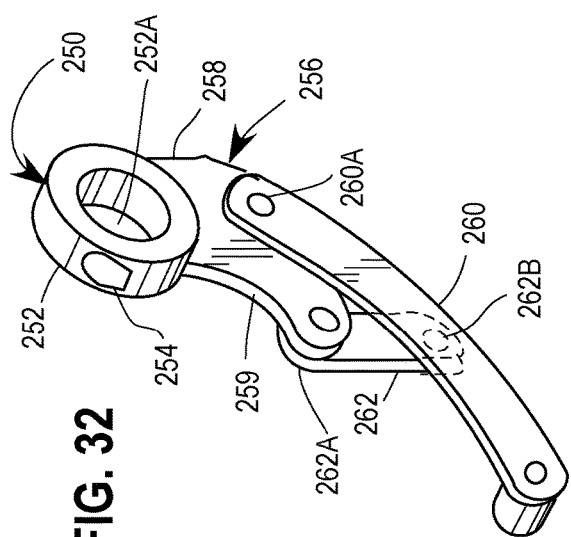

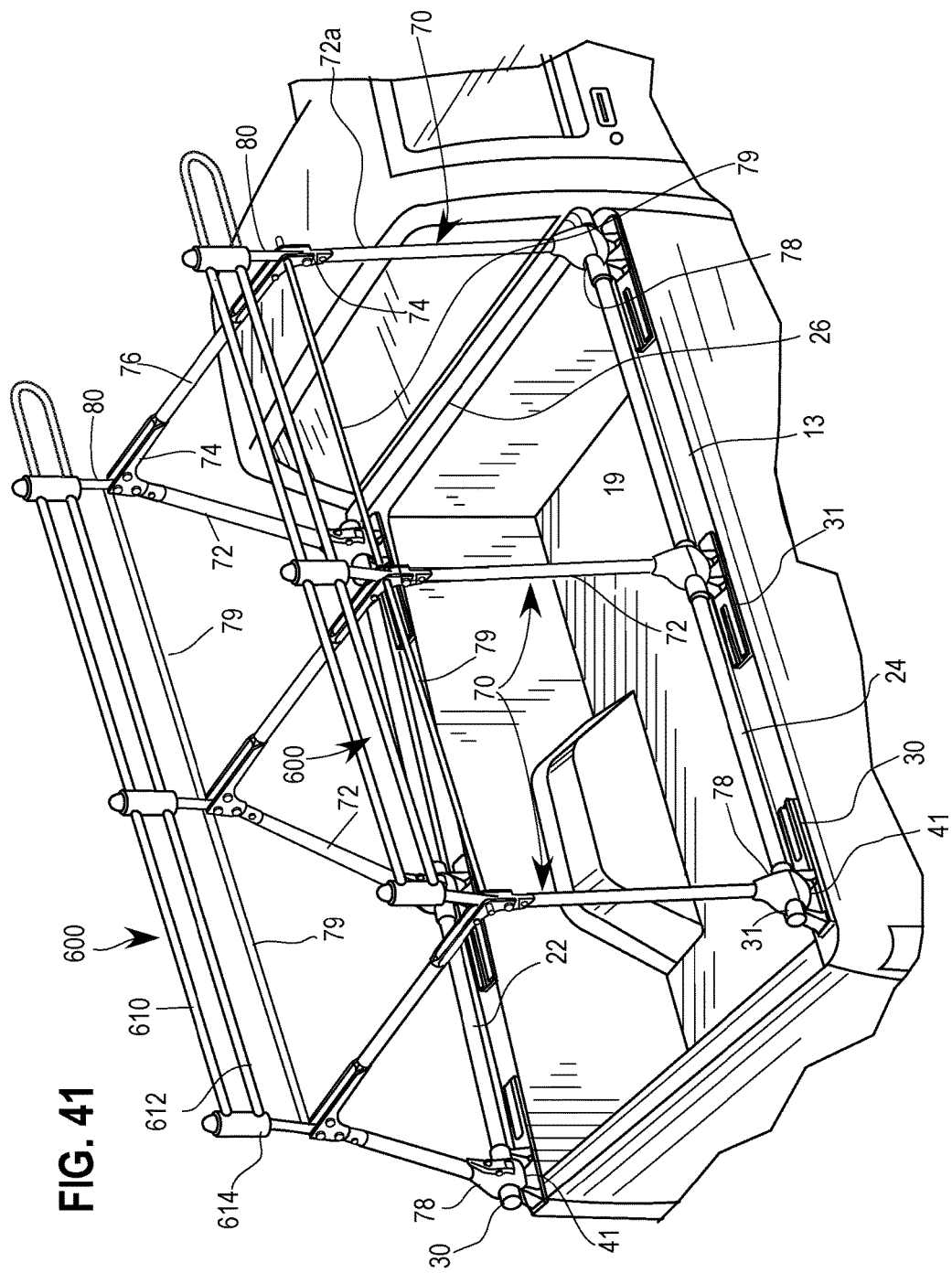

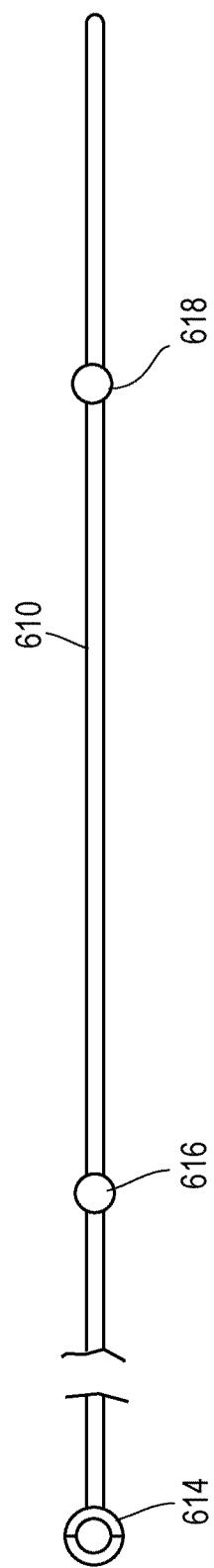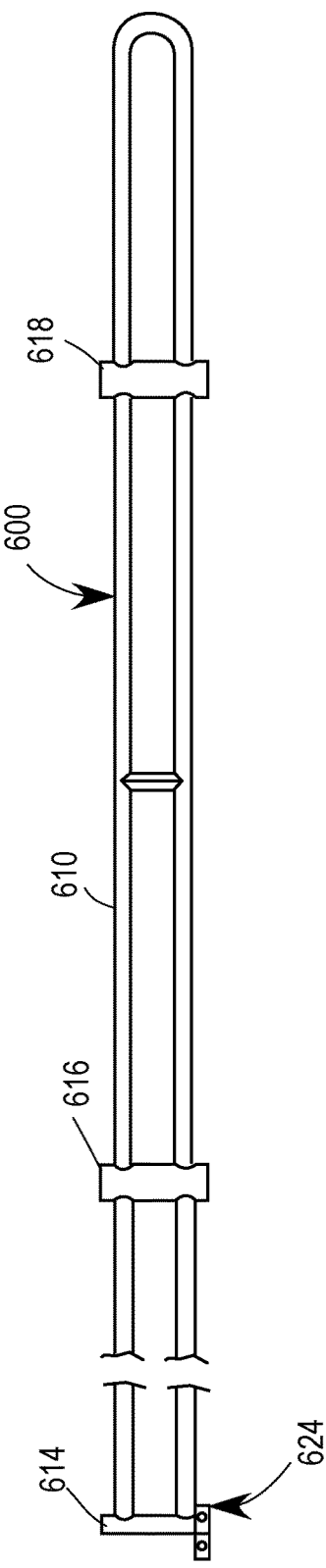
FIG. 43
FIG. 42

UTILITY CARGO SYSTEM FOR VEHICLE

CROSS REFERENCE TO RELATED APPLICATIONS

This application is a continuation-in-part of U.S. patent application Ser. No. 14/582,229 filed on Dec. 24, 2014, which claims priority to U.S. provisional patent application No. 61/921,265 filed Dec. 27, 2013 and U.S. provisional patent application No. 61/935,076 filed Feb. 3, 2014, the entire contents of which are hereby incorporated by reference in their entirety. This application is also a continuation-in-part of U.S. design patent application No. 29/569,981 filed on Jul. 1, 2016, the entire contents of which is hereby incorporated by reference in its entirety.

FIELD OF THE DISCLOSURE

This disclosure relates generally to cargo systems, such as utility racks and rails, as may he used with vehicles such as pickup trucks, vans, boats, and the like.

BACKGROUND

Full-size pickup trucks are generally available with several different types of beds attached. The bed lengths typically specify the distance between the inside of the front end of the bed and the closed tailgate. Some standard bed sizes for long, full-size beds are generally 6.5 ft (2.0 m) or 8 ft (2.4 m) long and compact truck beds are generally 5 ft (1.5 m) long. A typical bed width for full-size truck beds is 48 in (1.2 m) between the wheel wells (minimum width), however widths of full-size truck beds may be between 60 in (1.5 m) and 70 in (1.7 m). Compact truck beds are also available. Most compact truck beds are approximately 50 in (1.3 m) wide. As described herein, references to a longitudinal aspect of a structural part or element refer to the length of the truck bed and references to a lateral aspect of a structure or part refer to the width of the truck bed, unless otherwise stated. References to "inboard" parts or elements refer to items which are nearer or more proximate to the longitudinal centerline of the truck bed. Outboard elements are farther away from inboard elements. Reference to items that are "forward" refer to parts or structures nearer the cab of the truck and "rearward" items refer to parts or structures nearer the rear or tailgate of the truck.

A standard bed in a pickup truck has fender wells on the inside of the bed such that the fenders cannot be seen on the outside of the bed. Other pickup trucks have a flareside or stepside bed where the fenders are provided on the outside of the bed. Sometimes the truck bed has a well-body or a style-side body. The truck bed is enclosed on the sides with body panels, usually made from pressed steel. A hinged rear tailgate is also common. Rear indicators and brake lights are usually fitted to the rear corners of the body in a manner similar to sedan rear lights.

Known truck bed rails presently available may be installed by vehicle operators and dealers along the tops of the truck bed side walls. Many truck beds include stake pocket holes which are used to attach the rail to the truck bed side walls. A stake hole may be a rounded or squared opening along the top of a truck bed side wall. The vehicle operator may place the base of the rail over and into the stake holes and bolts the rails to the bed using bolts and washers. Sometimes, a user will drill mounting holes in the truck bed side walls where the rails should be mounted. Often, a gasket and rubber extender will he added to the bed rail's mount that lets the mount fit into the stake hole of the truck. Once the bed rails have been added to the mount, the rails are bolted onto the truck with an Allen wrench.

Vehicle operators may wish to carry items in their vehicle which may be very long, in some instances longer than the length of the truck bed. Such long items may include lumber, ladders, pipes or other similarly long items. Because these items are too long for pickup truck beds, the vehicle operator may wish to secure them some distance above the truck bed. Accordingly, it may be desirable to have racks which extend a distance above the truck bed, as well as racks which may be secured or stabilized to the cabin roof of the truck.

BRIEF SUMMARY OF THE DISCLOSURE

The following simplified summary of the disclosure provides a basic understanding of some aspects of the invention. This summary is not an extensive overview of the embodiments of the disclosure. It is not intended to neither identify key or critical elements of the embodiments of the disclosure nor to delineate the scope of the disclosure. Its sole purpose is to present some concepts of the various embodiments, in accordance with the disclosure, in a simplified form as a prelude to the more detailed description that is presented later.

Embodiments of a cargo system for use with a vehicle are described herein. The cargo system may include a plurality of stanchions, each stanchion may include a base platform securable to the vehicle, a pair of standposts each projecting away from the base platform, a bar element supported by the pair of standposts, the bar element substantially elongate having a first end and a second end, and a stanchion opening defined as the space between the base platform, the elevated bar element, and the pair of standposts, and the cargo system may further include a plurality of side rails, each side rail secured to the bar element of one of the plurality of stanchions proximate to the first end of the bar element.

Embodiments of a cargo system for use with a vehicle may include a plurality of stanchions securable to the vehicle and a hoop. The hoop may include a pair of legs, each leg substantially elongate and having a terminal end and an upper end opposite of the terminal end, each leg may include an upper leg segment proximate to the upper end, and each leg may be connected one of the plurality stanchions proximate to the terminal end. The hoop may also include a pair of elbows, each elbow having a lateral end and a lower end, each elbow may include a lower elbow segment connectable with the upper leg segment, and at least one elbow may include a rod pivotable within a lateral channel in the stored position and secured in a substantially vertical orientation in the deployed position. The hoop may also include a lateral cross bar substantially elongate and connectable with one of the elbows proximate to the lateral end of the elbow.

Other embodiments of a cargo system for use with a vehicle may include a cargo loader. The cargo loader may include a plurality of stanchions, each stanchion connected to opposing sides of the vehicle. The cargo loader may also include a plurality of hoops, each hoop may include a pair of legs, each leg attached at one end to one of the plurality of stanchions on an opposite side of the vehicle from the other leg. Each hoop may also include a plurality of elbows attached to an opposing end of one of the plurality of legs, and a cross bar connecting a pair of the plurality of elbows. The cargo loader may also include a plurality of cargo loader beam supports, each attached to one of the plurality of hoops, and a cargo loader beam connected with the plurality of cargo loader beam supports and operable to support cargo.

The following description and the annexed drawings set forth certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following description when considered in conjunction with the drawings.

BRIEF DESCRIPTION OF THE FIGURES

FIG. 5A illustrates a top view of an embodiment of a stanchion;

FIG. 5B illustrates a side view of the stanchion of FIG. 5A;

FIG. 10 illustrates a top perspective view of a pickup truck with an embodiment of a cargo system attached thereto, the cargo system including a hoop;

FIG. 11 illustrates a top perspective view of an embodiment of a hoop at the point of attachment with an embodiment of a side rail as attached to a pickup truck;

FIG. 18 illustrates a bottom perspective view of an embodiment of a clamp;

FIG. 19 illustrates a top perspective view of an embodiment of hoop;

FIG. 20 illustrates a first top perspective view of an elbow of a hoop;

FIG. 21 illustrates a second top perspective view an elbow of a hoop;

FIG. 22A illustrates a top perspective view of an elbow of a hoop having an extendable rod in a deployed position, the rod secured in the vertical channel of the elbow;

FIG. 22B illustrates a top perspective view of an elbow of a hoop having an extendable rod in a deployed position, the rod unsecured in the vertical channel of the elbow;

FIG. 22C illustrates a top perspective view of an elbow of a hoop having an extendable rod in a stored position;

FIG. 23 illustrates a top perspective view of an elbow of a hoop having an extendable rod in a lowered position, and showing an embodiment for connecting the elbow with other components of the hoop;

FIG. 31 illustrates a top perspective view of an embodiment of a locker top;

FIG. 32 illustrates a top perspective view of a hinge of the locker top of FIG. 31;

FIG. 41 illustrates a top perspective view of a pickup truck with an embodiment of a cargo system attached thereto, the cargo system including embodiments of hoops with an embodiment of an overhead or elevated rack;

FIG. 42 illustrates a side view of an elevated side rail;

FIG. 43 illustrates a top view of the elevated side rail of FIG. 42;

DETAILED DESCRIPTION

Figure 1:
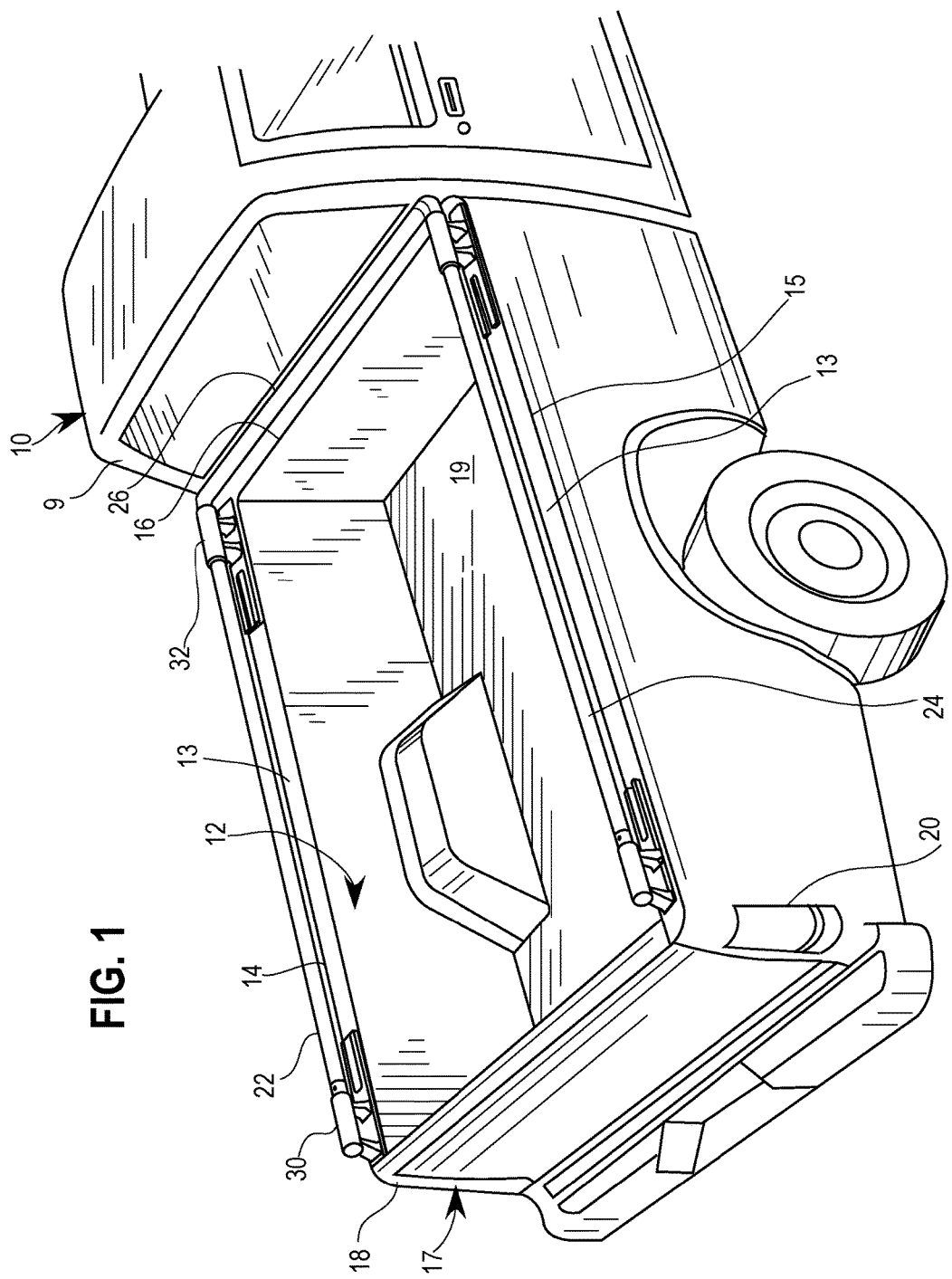
FIG. 1 illustrates a top perspective view of a pickup truck with an embodiment of a cargo system attached thereto.

The following detailed description and the appended drawings describe and illustrate some embodiments of the invention for the purpose of enabling one of ordinary skill in the relevant art to make and use the invention. As such, the detailed description and illustration of these embodiments are purely illustrative in nature and are in no way intended to limit the scope of the invention, or its protection, in any manner. It should also be understood that the drawings are not to scale and in certain instances details have been omitted, which are not necessary for an understanding of the present invention, such as details of fabrication and assembly. In the accompanying drawings, like numerals represent like components.

In one embodiment of the disclosure, a cargo system for use with a vehicle, may include a plurality of stanchions, each stanchion including a base platform securable to the vehicle, a pair of standposts each projecting away from the base platform, a bar element supported by the pair of standposts, the bar element substantially elongate having a first end and a second end, and a stanchion opening defined as the space between the base platform, the elevated bar element, and the pair of standposts, and the cargo system may further include a plurality of side rails, each side rail secured to the bar element of one of the plurality of stanchions proximate to the first end of the bar element.

In further embodiments, the cargo system may include a cabin rail, each end of the cabin rail securable with one of the plurality of stanchions, the cabin rail oriented substantially perpendicular to each of the plurality of side rails. At least one of the plurality of stanchions may include an end cap provided on the second end of the bar element.

The cargo system may include embodiments of a hoop. The hoop may include a pair of legs, each leg substantially elongate and having a terminal end and an upper end opposite of the terminal end, each leg including an upper leg segment proximate to the upper end. Hoops may also include a pair of clamps, each clamp connected to one of the legs proximate to the terminal end, and each clamp including a first jaw having a first inner clamping surface, a second jaw movable with respect to the first jaw and having a second inner clamping surface, and a clamp locking mechanism for releasably securing the first jaw and the second jaw together. Hoops may also include a pair of elbows, each elbow having a lateral end and a lower end, each elbow including a lower elbow segment connectable with the upper leg segment. Hoops may further include a lateral cross bar, the lateral cross bar substantially elongate, each end of the lateral cross bar connectable with one of the elbows proximate to the lateral end of the elbow. The first and second inner clamping surfaces of the clamps may be securable about the upper bar element of the stanchion between the first and second standposts, and the first and second inner clamping surfaces may have a conforming profile with an outer surface of the clamping portion of the upper bar element. The first and second inner clamping surfaces of the clamps may be securable about a side rail, and the first and second inner clamping surfaces may have a conforming profile with an outer surface of the side rail of the upper bar element. The clamp locking mechanism for each clamp may include a pivotable lever connected to the first jaw and pivotable with respect to the first jaw, a loop connected to the pivotable lever, and a hook connected to the second jaw and positioned such that as the first and second jaws are closed the loop may forcibly pressed against the hook as the lever is pivoted away from the second jaw thereby forcing the first and second jaws together. Each elbow may be pivotably connectable with one of the leg segments. At least one elbow may include a rod pivotable between a stored and a deployed position, the rod positioned substantially within a lateral channel in the stored position, and the rod secured in a substantially vertical orientation in the deployed position. The elbow may further include a cross channel pin extending across a confluent channel region between the lateral channel and a vertical channel, and the rod may further include a thru slot, the channel pin extending through the thru slot. The cargo system may further include an upper hoop bar, the upper hoop bar substantially elongate and attachable at each end with an elbow, the upper hoop bar oriented substantially parallel to at least one of the side rails when attached to elbows on each end of the upper hoop bar, and each elbow may include a cross pin projecting from the elbow, each end of the upper hoop bar having a mouth matable with the cross pin.

Embodiments of a cargo system may also include a pair of elevated rails. Each elevated rail may include at least one elongate rail oriented substantially parallel to at least one side rail, at least one rod sleeve dimensioned to internally receive a rod in its deployed position, and a rod securing mechanism for securing the rod within the at least one rod sleeve.

Embodiments of a cargo system may further include a bed divider, and the bed divider may include a cross bed bar, the cross bed bar substantially elongate, and a plurality of bed divider clamps, each bed divider clamp attached to an end of the cross bed bar, the be divider clamps operable to attach to a side rail. The cargo system may also include a locker top including a pair of hinges connectable with the cabin side rail, the locker top, the bed of the pickup truck, and the bed divider defining an interior space, the locker top pivotable between an open position and a closed position. In various embodiments of the cargo system, the side rails may have a substantially cylindrical profile.

Other embodiments of a cargo system for use with a vehicle may include a cargo loader. The cargo loader may include a plurality of stanchions, each stanchion connected to opposing sides of the vehicle. The cargo loader may also include a plurality of hoops, each hoop may include a pair of legs, each leg attached at one end to one of the plurality of stanchions on an opposite side of the vehicle from the other leg. Each hoop may also include a plurality of elbows attached to an opposing end of one of the plurality of legs, and a cross bar connecting a pair of the plurality of elbows. The cargo loader may also include a plurality of cargo loader beam supports, each attached to one of the plurality of hoops, and a cargo loader beam connected with the plurality of cargo loader beam supports and operable to support cargo.

In further embodiments, the cargo loader beam may be movable with respect to the plurality of hoops. The cargo loader beam may be an I beam, and the cargo loader may further include a plurality of wheels, at least one wheel provided on either side of the cargo loader beam. The cargo loader beam may be movable in the longitudinal direction of the vehicle. The cargo system may further include a beam sleeve attached to one of the plurality of hoops proximate a longitudinal end of the cargo loader beam, the beam sleeve may include a housing and a cavity defined within the housing, and the cavity may be aligned with the direction of movement of the cargo loader beam and dimensioned to receive a portion of the beam as it moves towards the beam sleeve. The cargo system further include a plurality of sleeve supports connecting the beam sleeve with one of the hoops. The plurality of hoops may be composed of rails with substantially cylindrical profiles. The rails may have a diameter of about 3 inches and the cargo loader beam may support cargo up to about 1500 lbs.

Additional embodiments of a cargo system for use with a vehicle may include a plurality of stanchions with at least one stanchion attached to each side of the vehicle, a plurality of side rails with each side rail connected to at least one of the plurality of stanchions and provided proximate to one of the sides of the vehicle; and at least one hoop including a pair of legs each attached to either one of the side rails or one of the stanchions, a plurality of elbows each attached to an opposing end of one of the legs, and a cross bar between two elbows.

In embodiments of the cargo system, the at least one hoop may be provided proximate to a front end of the vehicle and the system may further include a headache rack attached the at least one hoop. The headache rack may be attached to each of the legs of the at least one hoop. The headache rack may include a rack cutout so as to provide clearance space between the headache rack and attachment point between the legs and the side rails or stanchion. The at least one hoop may be at least two hoops and the system may include a cover secured over the at least two hoops. The system may include elevated rails secured to the at least two hoops over the cover. Each of the stanchions may include an eyelet, and the system may include an eyelet cross bar connected between opposing stanchions at the eyelet of those stanchions. The system may include a deployable seat having a back supportable by the eyelet cross bar.

With reference to FIG. 1, a vehicle 10 for which embodiments of a cargo system may be utilized with may include a pickup truck having a truck bed 12, as illustrated in the figures. Pickup truck bed 12 may be substantially composed of a left bed sidewall 14, a right bed sidewall 15, and a cabin-side or cabside wall 16. Truck bed 12 may further include a draw-down gate 18 which may be opened by the vehicle operator in order to facilitate the insertion or removal of items to be stored in truck bed 12. Vehicle 10 may also include taillights 20 controlled by a taillight control system 21. Embodiments of a cargo system are illustrated in the figures as applied or attached to a pickup truck 10 having a truck bed 12, but it should be understood and appreciated by those of ordinary skill in the art that embodiments of cargo systems disclosed herein may be suitably attached or utilized with other motor and non-motor vehicles, including for instance vans, carriages, trucks without truck beds, trucks with covered or enclosed truck beds, or other known or to be developed vehicles.

As illustrated, a cargo system may include a first side rail 22, a second side rail 24, and a cab side rail 26. These side rails may be mounted along a top edge 13 of truck bed side walls 14, 15. Furthermore, side rails 22, 24 may be mounted on side walls 14, 15 by a plurality of stanchions 30, 32. In order to permitting the sliding and interexchange of components of the cargo system, including for instance the various embodiments of clamps disclosed herein, rails 22, 24, 26 may be substantially cylindrical, however the other shapes are also contemplated within the scope of the disclosure. Additionally, the cylindrical rails 22. 24, 26 may be at least partially hollow such that there is a distinct inner and outer diameter, at least for instance near the ends of the rails.

Figure 2:
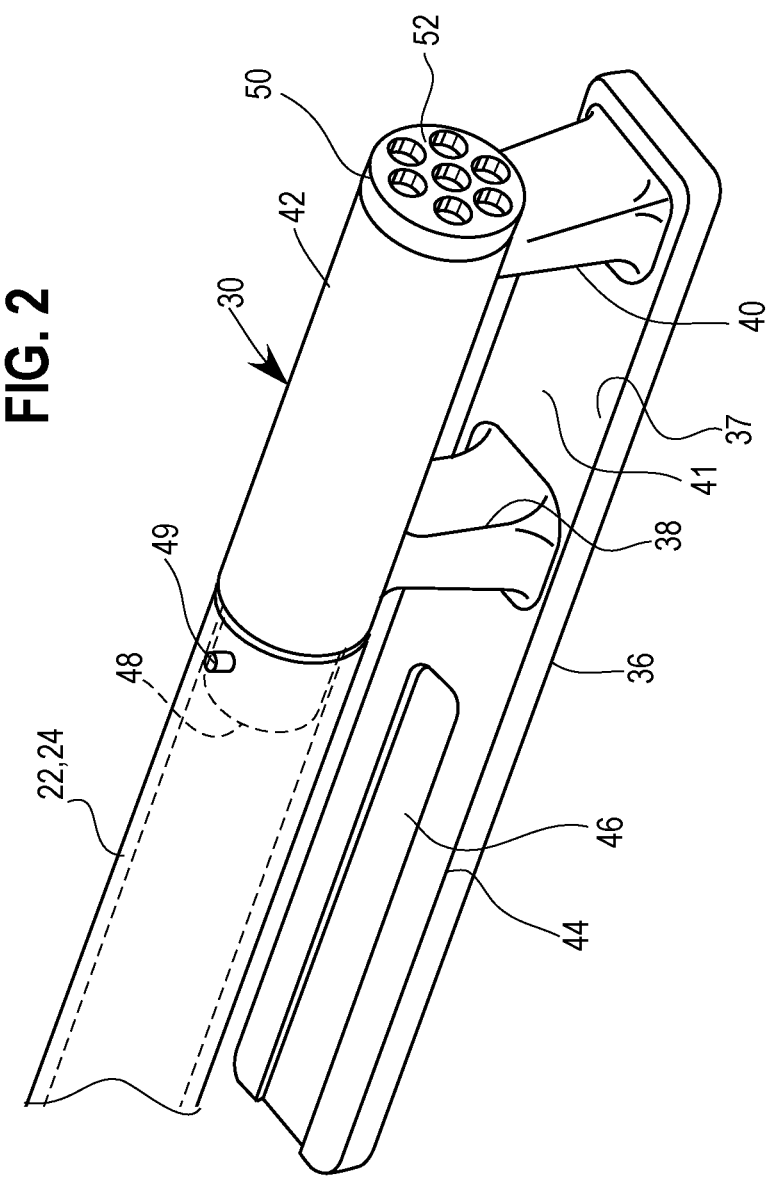
FIG. 2 illustrates a prospective view of an embodiment of a stanchion.

FIG. 2 illustrates a stanchion 30, which in some embodiments may be the rear stanchion 30 which may be distinct from the forward stanchion 32. While in some embodiments stanchions are interchangeable, in other embodiments one or more rear stanchions 30 may be distinctly designed from forward stanchions 32. Stanchion 30 may include a base platform 36, a fore end standpost 38, and a rear end standpost 40. Standposts 38, 40 may support an elevated bar element 42 provided at an elevated distance from the top surface 37 of base platform 36. Base platform 36 may further include a platform extension 44 which may itself include a channel 46, which may be substantially centered within extension 44. Elevated bar element 42 may be substantially elongate having opposed ends, including a rail side end 48 and opposing tail side end which may include an end cap 50. Rail side end 48 may be attached to one of the side rails 22, 24. FIG. 1, for instance, illustrates first side rail 22 attached to stanchion 30, and second side rail 22 attached is stanchion substantially the same as stanchion 30. At or proximate to rail side end 48, a securing element 49 may be included to attach rail 22 or 24 to stanchion 30. Securing element 49 may be a pin, nut and bolt, set screw fitting, welding, or another similar securing device. As shown, rail side end 48 may include a projecting portion having a diameter with a smaller diameter than an inner diameter for side rail 22, 24, and thus side rail 22, 24 may slid over the projecting portion of rail side end 48. On the opposing end of elevated bar element 42 may be end cap 50, various embodiments of which are further discussed herein, including solid surface end caps, end caps with a light reflecting face 52, caps with incorporated lights, and other embodiments.

Figure 3:
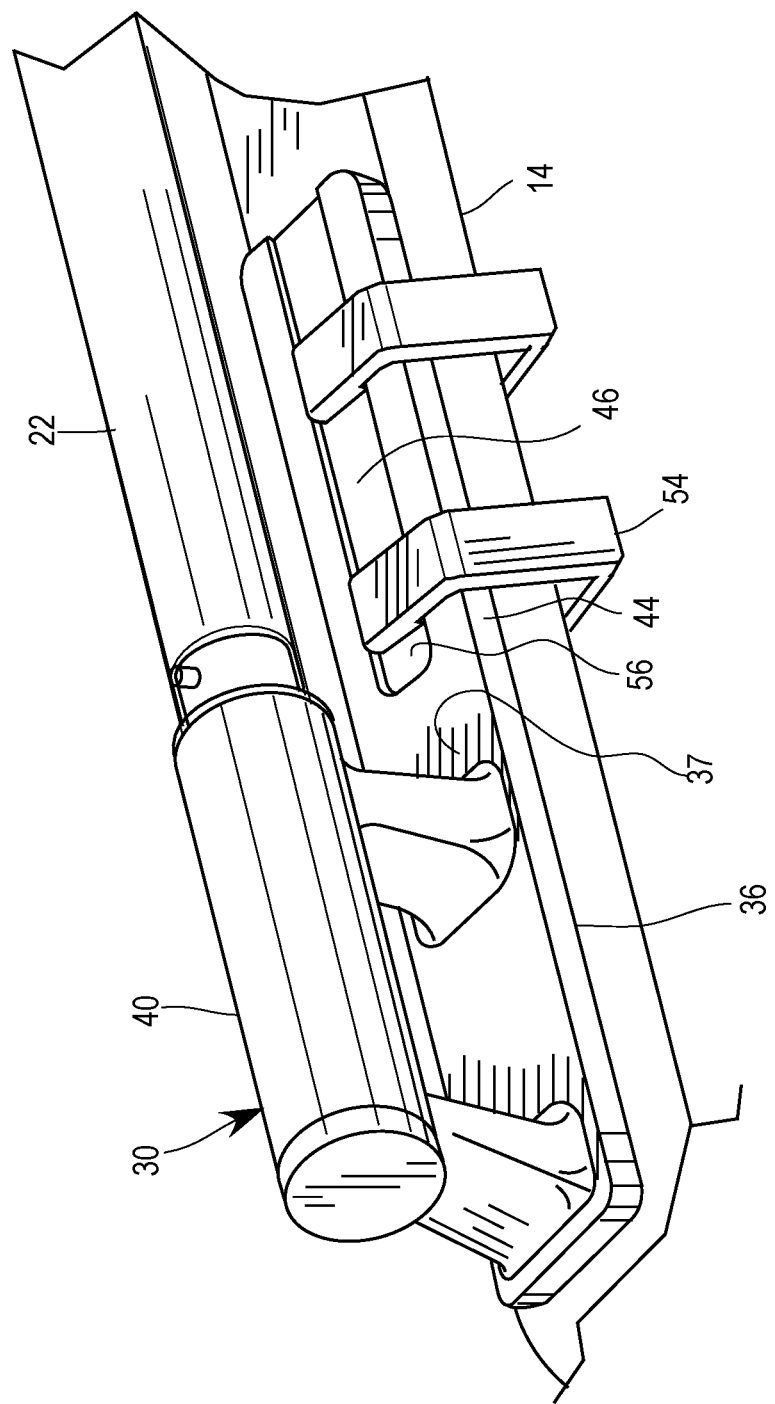
FIG. 3 illustrates a prospective view of an embodiment of a clamp-on attachment mechanism for use with an embodiment of a stanchion.
Figure 4:
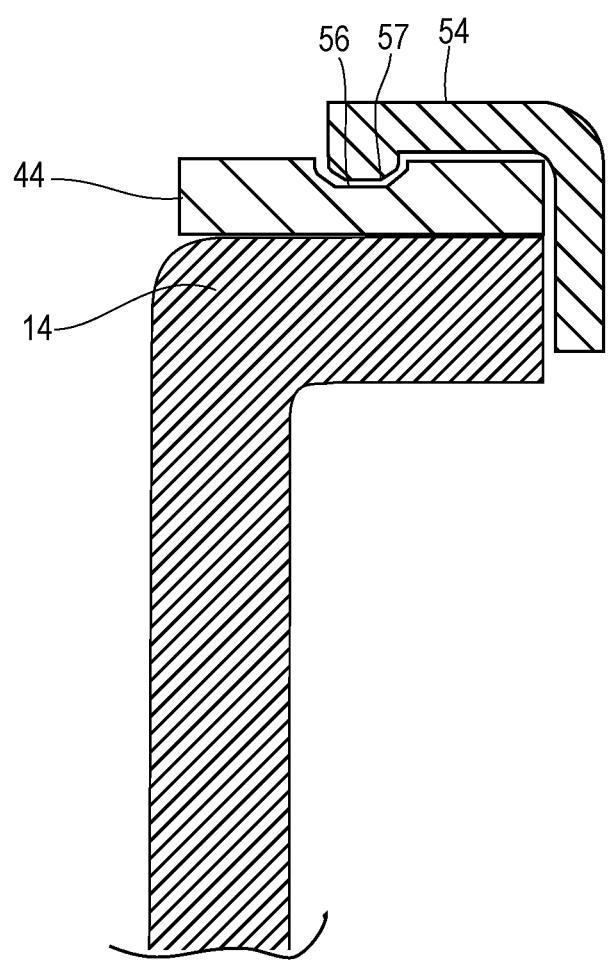
FIG. 4 illustrates a side elevation view of an embodiment of a clam-on attachment mechanism for use with an embodiment of a stanchion.

FIGS. 3 and 4 illustrate an embodiment of rearward stanchion 30 including clamps 54 which may be attached to the sidewall 14 of truck bed 12. Clamps 54 may have depending tab-like elements 56 that are matable within channel 46 of base platform 36. It is contemplated that stanchions 30, 32 may be attached to sidewalls 14, 15, 16 by known or to be discovered securing devices or methods, including screws and adhesive material. However clamps 54 may be utilized in order to effectively secure stanchions 30, 32 while allowing stanchions to be easily removable, and to prevent unnecessary or unintentional damage to truck bed 12. Alternatively, clamps 54 may be utilized in addition to known or to be discovered securing devices or methods. As particularly shown in FIG. 4, clamp 54 may include a clamp jaw 57 with a depending tab 56. Depending tab 56 may mate within channel 46 of platform extension 44. For reference, cab 9 and sidewall 14 are also illustrated in FIG. 4.

FIGS. 5A and 5B further illustrate embodiments of stanchion 30. In this embodiment, stanchion 30 is shown to include channels 51A, 51B internally disposed through standposts 38, 40. Accordingly, stanchion 30 may be attached to the bed sidewalk via a bolt system which may cooperate with a threaded knot in channels 51A, 51B. Additionally, set screw 49A may be inserted into set screw hole 49, as illustrated by arrow 47A, thereby securing side rail 22 with end 48 of upper bar element 42.

Figure 6:
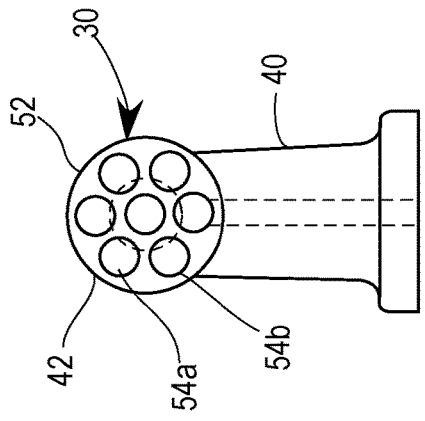
FIG. 6 illustrates a rear view of an embodiment of a stanchion.
Figure 7:
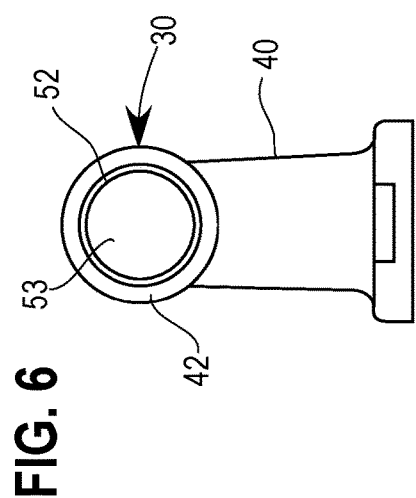
FIG. 7 illustrates a rear view of an embodiment of a stanchion.
Figure 8:
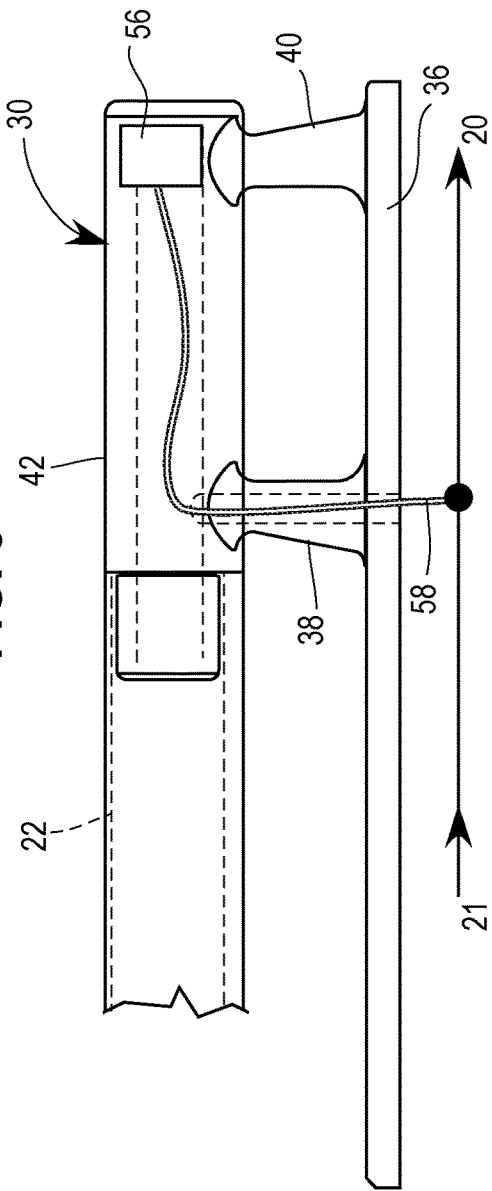
FIG. 8 illustrates a side view of a stanchion with an electronic system.

FIGS. 6-8 illustrate embodiments of end caps 52 for use with embodiments of stanchions 30. In the embodiment illustrated in FIG. 6, the opposed end of elevated bar element is relatively uniform surface. At least a portion of an end surface region 53 may be light reflective such that when light strikes that surface region 53, said light reflects back to the source. This reflective feature may, for instance, improve safety that vehicle 10 may be more easily identified at night by headlights from another vehicle approaching vehicle 10 from the rear. FIG. 7 illustrates an embodiment of end cap 52 including a plurality of lights 54A, 54B, which may be LEDs or other known or to discovered electrically operated lights. With reference to FIG. 8, a light system 56 is shown as may be utilized with a rearward stanchion 30 which may have lights 54A, 54B. As part of light system 56, stanchion 30 may be electrically coupled via electrical line 58 to light control line from a light controller 21 to taillight 20. Light controller 21 may be manually operable by the vehicle operator, or alternatively light controller 21 may be synched with taillight 20 such that illuminations of taillight 20 are matched by illuminations of end cap lights 54A, 54B. In additional embodiments, one or more additional side rails such as cabin rail 26 may be attached at or proximate to end cap 50 thereby providing a side rail, similar to cabin rail 26 for instance, extending across a tailgate for instance between two stanchions 30 provided at or proximate to the rear of vehicle 10.

Figure 9B:
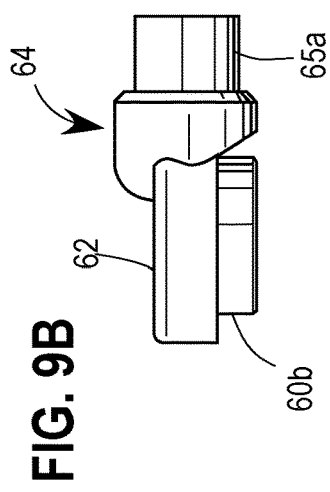
FIG. 9B illustrates the end unit of the rail of FIG. 9A.
Figure 9A:
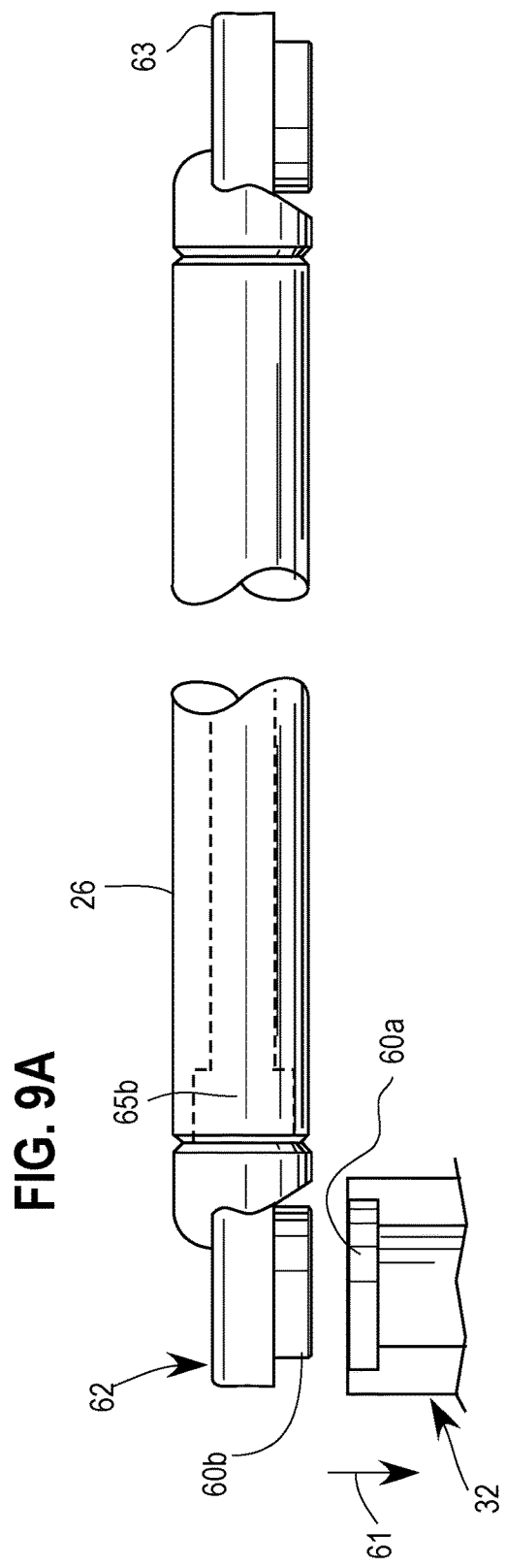
FIG. 9A illustrates a side view of an embodiment of a cab-side rail.

FIGS. 9A and 9B show embodiments of the cargo system proximate to cab side rail 26 and forward stanchions 32. As previously discussed, stanchions 30 and 32 may be interchangeable in some embodiments, while in other embodiments stanchions 30 and 32 are uniquely designed. Additionally, some components of forward stanchions 32 may be utilized with rear stanchions 30, and vice versa. Forward stanchions 32 may include a coupler element 60A which may be complementary to coupler element 60B at or proximate to a terminal end 62 of cab side rail 26. Furthermore, coupler elements 60A, 60B when combined may be attached by screws, bolts, or other known or to be discovered fasteners. Couple element 6013 may be fitted into coupler element 60A of forward stanchion 32, as illustrated for instance by arrow 61. Opposing terminal end 63 may have a similar coupler for the right side, forward stanchion (illustrated without reference numerals in FIG. 1). In some embodiments, end unit 64 may be independent of cab side rail 26. Complementary couplers 65A may also operate in conjunction with couples 65B in cab side rail 26. Screws, bolts, or other fixing elements may be combined with couples 65A, 65B.

Generally referring now to FIGS. 10-26, embodiments of hoops, clamps, and associated components are provided which may be included as part of a cargo system in accordance with the disclosure. FIG. 10 illustrates a plurality of hoops 70 mounted on, or attached to, side rails 22, 24. Three hoops 70 are provided in the illustrated embodiment, including two end hoops which are substantially similar, and a middle hoop sharing several common characteristics as the end hoops. It should be understood and appreciated that in some embodiments all hoops 70 are substantially identical and interchangeable, while in other embodiments all three hoops 70 have unique characteristics or components from one another, and while in yet additional embodiments two hoops 70 may be substantially identical while a third hoop 70 may have unique characteristics or components. Additionally, the illustrated embodiment shows three hoops 70, however it should be appreciated that fewer or greater hoops 70 are contemplated within the disclosure.

Hoops 70 may generally include two legs 72, an elbow 74 connectable with each leg, a lateral cross bar 76 provided between adjacent elbows, and clamps 78 for releasably connecting each leg to a side rail 22, 24. Elbows 74 are generally provided to connect adjacent legs 72 with a lateral cross bar 76. In some embodiments, hoops 70 may generally be described as "U Shaped" however it should be understood and appreciated that a variety of shapes of configurations are contemplated in accordance with the disclosure. Upper hoops bars 79 may also be provided and may generally be connected with a first elbow 78 of a first hoop 70 with a second elbow 78 of a second hoop 70. Additionally, a rod 80 may be provided in one or more elbows 74. Rod 80 may be pivotable between a stored position and a deployed position, with the stored position generally disposing the rod 80 within elbow 74 while the deployed position generally positions the rod 80 upwards in a substantially vertical orientation. Further details of various embodiments of hoops 70 and their associated components are further described herein.

FIG. 11 illustrates embodiments of clamps 78, 78A as may be utilized for connecting one or more rods 72 to side rails 22, 24. As illustrated, in some embodiments clamp 78 may be attached to upper bar element 42 of a stanchion 30. Accordingly, clamp jaws may extend within and through a stanchion opening 41, defined as the opening between base platform 36, upper bar element 42, and standposts 38, 40. The distance between base platform 36 and upper bar element 42, which may be defined as the clamp jaw clearance height, should be sufficient to permit the clamp jaws to extend through opening 41, and in one embodiment the distance between base platform 36 and upper bar element 42 may be approximately 2 inches. As illustrated, clamp 78A may be alternatively attached directly to a side rail 24A. In one embodiment, clamps 78 for end hoops 70 are connected to stanchions 30, while the clamp 78A for the middle hoop 70 is attached to a side rail 24A.

Figure 12:
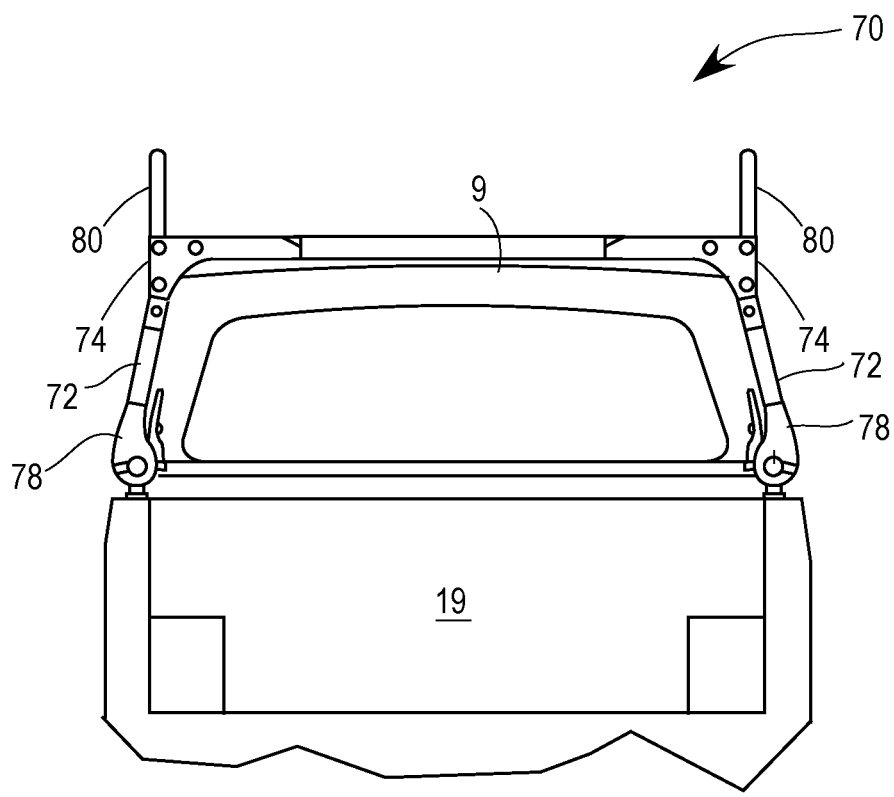
FIG. 12 illustrates a rear view of an embodiment of a hoop attached to an embodiment of side rails.

FIG. 12 shows one embodiment of hoop 70 for a rear view as attached to a pickup truck bed 12. The height of hoop 70, as defined by the distance from the base of hoop 70 proximate to clamps 78, is substantially higher than the height of the passenger cabin 9 of the vehicle. It should be appreciated, however, that other heights are contemplated as various embodiments of the cargo system may be desired by the vehicle operator. For instance, the hoop height may be approximately the same as the height of the passenger cabin 9, while in other embodiments the hoop height may be less than the passenger cabin 9. Additionally, legs 72 may be oriented at an inward angle such that the distance between corresponding elbows 74 of a hoop is less than the distance between corresponding clamps 78 of a hoop. This angle is illustrated in contrast, for instance, to the substantially vertical orientation of rods 80. As will be further discussed herein, legs 72 may be pivotable at their connection point with elbow 74 such that legs 72 may fold into a position that is substantially parallel with an attached lateral cross bar 76. This pivoting feature allows the vehicle operator to easily store each hoop 70 in a compact area.

Figure 14:
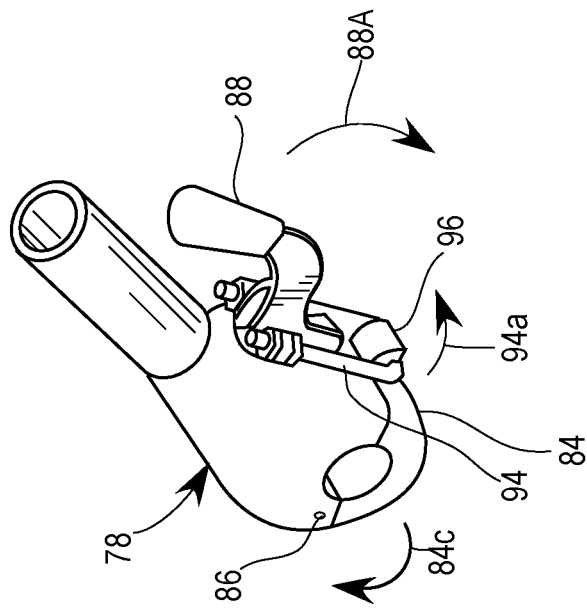
FIG. 14 illustrates a top perspective view of the clamp of FIG. 13 in a closed position and unattached from a side rail.
Figure 13:
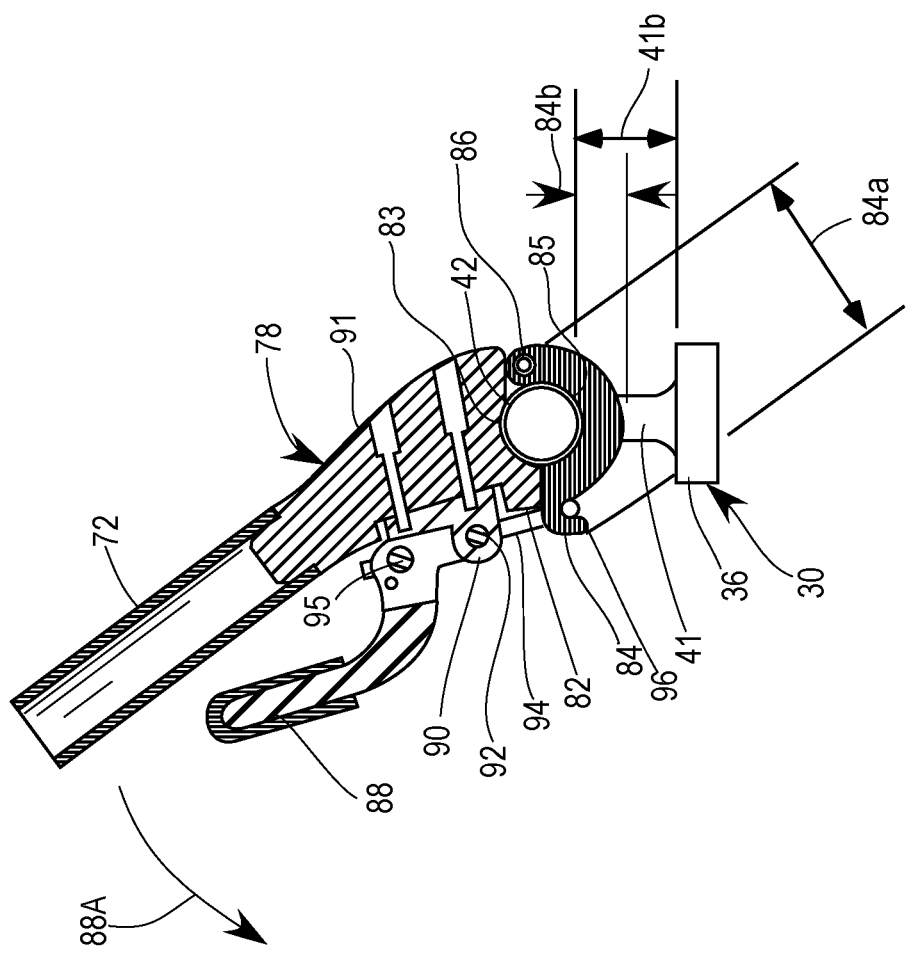
FIG. 13 illustrates a side cross-sectional view of a clamp attached to an embodiment of a side rail.

A first embodiment of a clamp 78 is illustrated in FIGS. 13 and 14. In this embodiment, clamp 78 is integrally connected to a leg 72. Clamp 78 may include a pair of locking clamps 82, 84 hinged together above a pivot point 86. A first clamp jaw 82 may be stationary while a second clamp jaw 84 may be pivotable about pivot point 86. First clamp jaw 82 may include a first clamping surface 83 and second clamp jaw may include a second clamping surface 85 opposed to the first clamping surface such that as clamp jaws 82, 84 close around either upper bar element 42 of stanchion 30 or one of the side rails 22, 24, the clamping surfaces 83, 85 are conformingly shaped to the outer surface of the upper bar element or rail to be clamped and can snuggly fit around either the upper bar element or rail to be clamped.

FIG. 13 demonstrates an embodiment where clamp 78 is attached to upper bar element 42 of a stanchion 30. Second, pivotable clamp jaw 84 may have a defined jaw span 84a between a first end of clamp jaw 84 proximate a hook 96 and a second end of clamp jaw 84 proximate pivot point 86. Furthermore, a jaw distance 84b may be defined as the thickness of second, pivotable jaw 84 which can be measured as the distance from the inner clamping surface 85 and a directly adjacent outer surface of clamp 84 in an orthogonal direction. Accordingly, jaw distance 84b may be less than the clamp jaw clearance height in order to permit jaws 82, 84 to close around the to-be clamped surface, and yet jaw span 84a may be larger than the clamp jaw clearance height 41B such that should pivotable jaw 84 become detached during operation, then clamp 78 still generally remains in space since it is trapped within station space 81.

Various mechanisms may be provided to close and lock jaws 82, 84 and, indeed, the difference in the locking mechanisms is at least one such difference between the embodiments of clamps 78 illustrated between FIGS. 13 and 18.

In one clamp locking mechanism embodiment, as shown in FIGS. 13 and 14, clamp 78 may include a release lever 88 pivotable about a clamp release pivot point 92. In this embodiment, in order to release jaw 84 from jaw 82, a user may move release lever 88 away from the clamp body 91. Accordingly, the release lever operates about a release pivot point 92, appropriately fixed to clamp body 91. Clamp 82 may further include a hook and loop subset whereby lever 88 operates on loop 94, and loop 94 may extend about hook 96.

Hook 96 may be fanned at or proximate to the end of pivotable jaw 84. Loop 94 may be pivotally mounted to lever 88 a lever pivot point 95. Lever 88 may be movable in a release direction 88A and loop 94 may be movable towards the pivotable jaw 84 and hook 96. A terminal end of loop 94 may be thereafter swung away from the hook and released from hook 96. The hook and loop subset may thereby establish a compression, friction grip established by jaw surfaces 83, 85 on the upper bar element 42 of stanchion 30. Clamp 78 may be removed from the clamped surface by moving lever in direction 88A followed by moving loop 94 away from hook 96, as illustrated by arrow 94A. As loop 94 is moved in direction 94A away from hook 96, pivotable jaw 94 may move about pivot point 96 away from stationary jaw 82 thereby permitting the release of clamp 78. Polypropylene or another material may be provided in order to facilitate a stabilized connection between loop 94 and hook 96 when the jaws are in the closed position.

Figure 15:
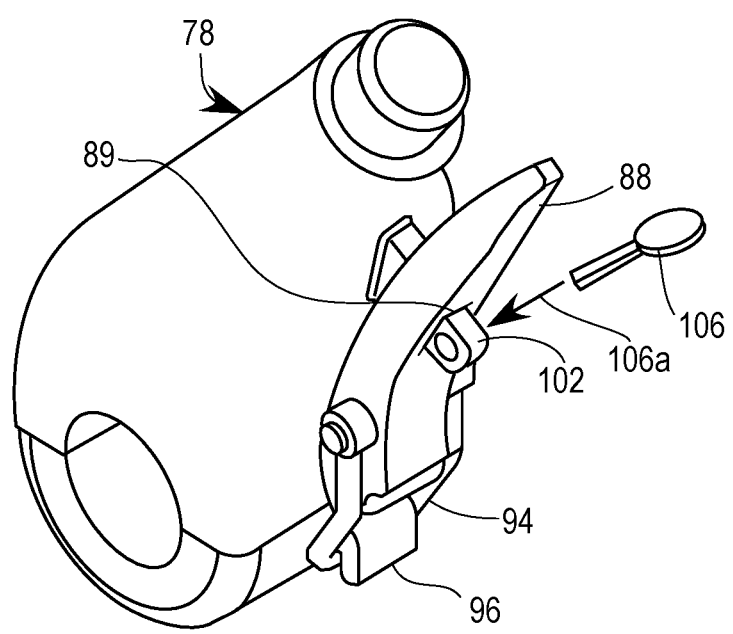
FIG. 15 illustrates a top perspective view of an embodiment of a clamp.
Figure 17:
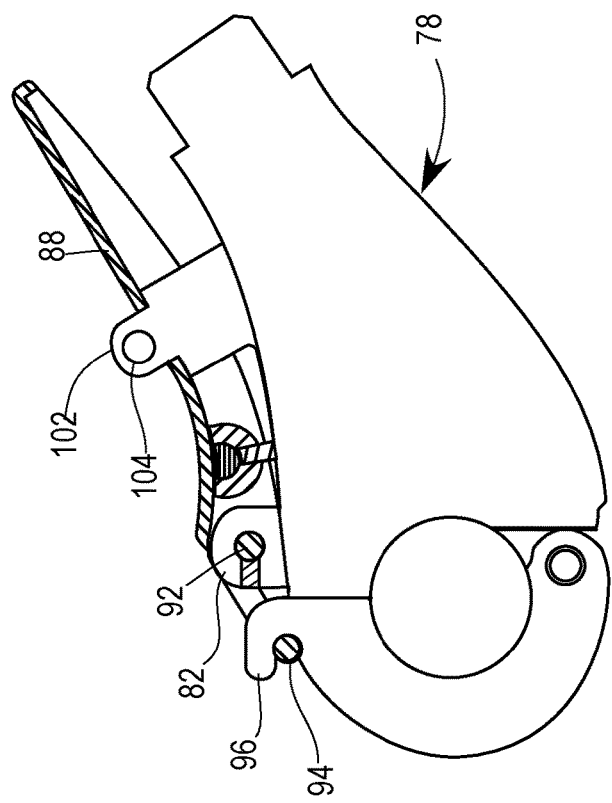
FIG. 17 illustrates a rear view of an embodiment of a clamp.
Figure 16:
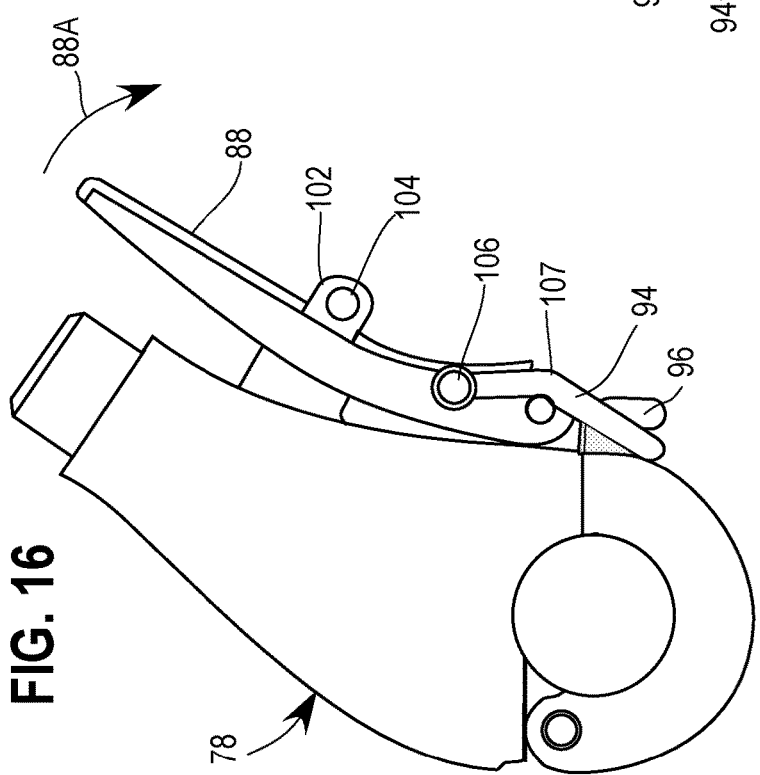
FIG. 16 illustrates a front view of the clamp of FIG. 15.

FIGS. 15-17 illustrate clamp 78 with another embodiment of a locking mechanism. Release lever 88 may include a lock stand passage 89, and a lock stand bar 102 may extend through lock stand passage 89. Proximate to a distal end of lock stand bar 102 may include a lock stand passage 104 dimensioned to receive a key 106, which may be insertable into lock stand passage 104 such that insertion of key 106 prevents the removal of lock stand 102 from lock stand passage 89 thereby securing lever 88. In some embodiments loop 94 may dog-legged as evidence by an angle at a transition point 107 for loop 94. Furthermore, loop 94 may be hinged a loop hinge point 106 proximate to a lower end of lever 88. Thus, as lever 88 is moved in direction 88A, loop 94 may swing out of hook 96 and further rotated in direction 94A.

FIG. 18 illustrates an additional embodiment of clamp 78 with an additional embodiment of a locking mechanism. Clamp jaws 82, 84 may be attached to one another, by one or more threadable connectors 109 provided in one or more internally threaded passages 108. A plurality of threadable connectors 109 and passages 108 may be provided to firmly secure jaws 82, 84 together, and a jaw pivot point may or may not be provided in such an embodiment.

As discussed above, other cross section shapes or profiles are contemplated for rails 22, 24, 26 as well as upper bar element 42, including for instance a square or triangular cross section. Thus, clamping surfaces 83, 85 may be conformingly shaped as is appropriate for the surface they will be clamped to. Furthermore, as rails 22, 24, 26 may not necessarily have conforming cross sectional shapes or profiles with each other or with upper bar element 42, the conforming jaw profiles defined by jaw surfaces 83, 85 may be uniquely provided for each unique surface shape to be attached to. However, in some embodiments all profiles may be substantially the same with one another in order to facilitate interchangeability of clamped-on components such as hoop 70. Additional clamped-on components are disclosed herein, and it should be understood that clamps associated with other clamped-on components may be interchangeable between various clamped-on components. For instance, a hoop clamp 78 may be usable with, or substantially the same as, bed divider clamp 226 (see FIG. 28) and vice versa. Embodiments which permit interchangeability of clamp types with clamped-on components will benefit from reduced manufacturing costs.

FIG. 19 shows an embodiment of a hoop 70 unattached from truck bed 12. As previously described, embodiments of hoop 70 may include a pair of legs 72 each connected to an elbow 74, each elbow 74 connected by a lateral cross bar 76, and each leg 72 connected to a rail 22, 24 or stanchion 30 by a clamp 78. Each elbow 74 may include a rod 80 pivotable between a stored position and a deployed position. Legs 72 may be attached to clamps 78 a terminal end 120 of the leg. Lengths of legs 72 may be expandable in some embodiments by adding additional segments to extend the tube segments of respective legs 72. Otherwise, cargo systems may be manufactured with various predetermined lengths and vehicle operators may purchase their desired lengths according to the requirements of the cargo system, dimensions of their vehicle 10, and other similar criteria. Cargo systems may also be custom ordered by the vehicle operator. Similarly, rails 22, 24, 26 may be extendable by providing longer rails, cutting the rails to size, or providing rail-to-rail inserts for the tube segments of the rails.

Each leg 72 may substantially elongate with a terminal end 120 defined at or proximate to clamp 78 and an upper end having an upper leg segment 122 connectable with a lower elbow segment 124 of elbow 74. A lateral elbow segment 126 may be defined at or proximate to a lateral end 125 of lower elbow segment 124. In some embodiments elbow 74 is substantially oriented at 90 degrees, while in other embodiments such as the illustrated embodiments, the elbow segment is obtuse in consideration of the inward angling of legs 72. It should also be appreciated that lateral elements, such as lateral bar 74, may be substantially horizontal in some embodiments, however some lateral components may be tilted with respect to the horizon especially, for instance, if one leg 72 has a greater length than another leg 72 of a hoop 70.

FIGS. 20 and 21 illustrate various viewpoints of elbows 74 without rod 80. Elbow 74 may include a lateral channel 132 a substantially vertical channel 130, with the channels having a confluent channel region 133 defined at or proximate to the corner or apex of elbow 74. In the illustrated embodiment the corner of elbow 74 is shown as substantially 90 degrees, but it should be appreciated that the disclosure is not limited to 90 degrees and varying angles are contemplated within the disclosure. A rod locking mechanism may be provided in order to lock rod 80 in either the stored position or the deployed position. One or more thumb screw locks 136 may be provided as part of the rod locking mechanism. In some embodiments, lower elbow segment 124 and upper terminable end 122 of leg 72 are pivotably attached such that leg 72 may pivot about a leg pivot axis, provided at or proximate to the area where lower elbow segment 124 and upper terminable end 122 are joined. This pivoting may facilitate legs 72 to fold up or collapse against lateral bar 76 thereby facilitating easy storage of hoop 70 when not in use. Elbow 74 may further include a longitudinally projecting stub 134 which may be utilized for attachment with an upper hoop bar 79. FIG. 21 shows an embodiment of elbow 74 with a singular stub 134, while FIG. 20 illustrates an embodiment of elbow 72 with dual, opposing stubs. An embodiment with dual opposing stubs may be particular useful in three hoop 70 cargo systems, with dual opposing stub elbows provided for the center hoop, and single stub elbows provided for end hoops.

FIGS. 22A-22C illustrate rod 80 included with elbow 74, and more particularly FIG. 22A illustrates rod 80 in a deployed position, FIG. 22C illustrates rod 80 in a stored position, and FIG. 22B illustrates a transition position of rod 80 between the deployed and stored positions, as demonstrated by arrows 141A and 141B. Rod 80 may have an elongated thru slot 144 extending through a portion of rod 80. In a stored position, at least a portion of rod 80 may be secured within lateral channel 132, while in the deployed position at least a portion of rod 80 may be secured in vertical channel 130. As part of a rod locking mechanism, provided to secure rod 80 within the respective channels, a cross channel pin 146 may be fixed in elbow 74 and may extend through the thru channel slot 144 proximate to the confluent region 133 of channels 130, 132. As rod 80 moves, channel slot 144 also moves over cross channel pin 146. Said another way, although cross channel pin 146 remains stationary, cross channel pin 146 may be said to move along thru channel 146 as rod 80 is moved.

In the deployed position, as rod 80 is moved from the stored position to the deployed position, it may be moved completely downward to the end of vertical channel 110 thereby retaining rod 80 in a substantially vertical orientation. Thus, in the deployed position cross channel pin 146 may be positioned at or proximate to the top 144A of slot 144 thereby providing upper stability to rod 80 while lower stability may be provided by the position of rod 80 in channel 110. In some embodiments the rod length 80A is less than the lateral channel length 132A, thereby permitting rod 80 to be substantially encompassed by lateral channel 132 in the stored position.

FIG. 23 illustrates connections between elbow 74 and leg 72, between elbow 74 and lateral cross bar 76, and associated pivoting features of these connections. Terminal end 151 of elbow may have a complementary mated fit with lateral cross bar 76. In order to keep cross bar 76 attached to elbow 74, a locking bore or passage 152 may be dimensioned to receive a locking key 150. As key 150 is inserted into bore passage 152, illustrated in the figure by arrow 150A, lateral cross member 76 may be secured with elbow 74. Similarly, as key 150 is removed then lateral cross bar 76 may be removed as illustrated by arrow 76A. At the lower end 124 of elbow, a pivotal coupling may be established with upper end 122 of hoop leg 72. Elbow 74 may have a plate-like stem 162 extending from its lower vertical elbow segment. Stem 162 may have a locking passage and a pivot pin may be placed through the end upper end 122 of hoop leg 72 into the locking bore. As the pin is withdrawn from locking bore 162, elbow 74 may freely swing downward as illustrated by arrow 165. Elbow 74 may be secured with hoop leg 72 by an additional key 1 cC operating in conjunction with key bar 156. Key 154 may be moved into key bar 156, as illustrated by arrow 154A, thereby locking the lower vertical segment 124 of elbow 74 into the upper segment 122 of hoop leg 72. Accordingly, there may be complementary couplers between elbow 74 and upper bar terminal ends 122 of hoop leg 72. It should be appreciated that, generally speaking, vertical channel may be oriented substantially vertically while the proximately positioned leg 72 will be angled in some embodiments. In contrast, lateral channel may be substantially aligned with the orientation of the connected lateral cross bar 76, which may be a substantially horizontal orientation.

Figure 24:
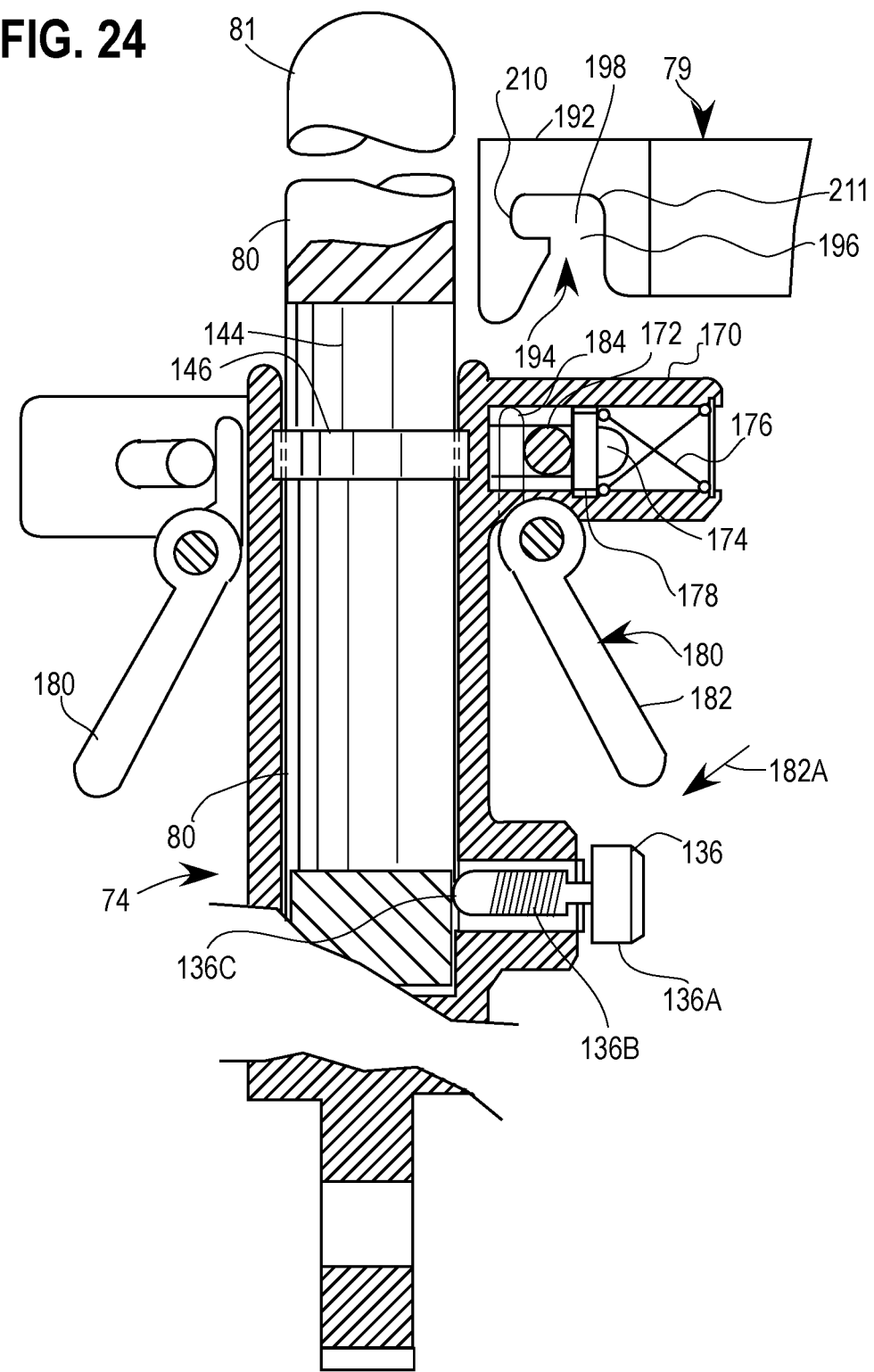
FIG. 24 illustrates a side cross sectional view of an embodiment of an elbow.

Elbow 74 may be a substantially right angle elbow that, accordingly, defines a common plane formed by lateral elbow portion and the vertical elbow portion. When key 154 is withdrawn for key way 156, elbow 74 is rotatable within the common plane defined by lateral extension of elbow 74 and leg 72. With the clamp 78 loosened, and key 156 removed, hoop 70 may be collapsible and storable, for instance within truck bed 12. Various known or to be developed locking mechanism may be accordingly utilized for locking hoop legs 72 with elbows including, for example, spring clip locks, pin locks, thumb screw locks, or complementary detents. A spring clip lock is typically a cotter pin. A nut and bolt, with or without a locking nit, may also be used. A pin lock is a lock having a cylindrical bolt which moves into a lock passage, which locks one system to another system by inserting the cylindrical bolt into the lock bore. A thumb screw lock is generally shown in FIG. 24. A detent would involve just the end of the thumb screw lock 136 in FIG. 24 and a small complementary cavity in the other locking element. The protruding detent is complementary to the cavity detent. An elbow member- to-upper loop leg locking system can be used with these features. Similarly, the extendable rod 80 may have a rod-to-elbow locking system With reference now to FIG. 24, a cross sectional view of an embodiment of an elbow 74 is illustrated. In FIG. 24, rod 80 is provided in a deployed, substantially vertical orientation and its lower end is captured in the open mouth tube formed in the lower leg segment of elbow 74. A thumb screw lock 136 may secure rod 80 to elbow 74 in one of the elbow channels. Thumb screw lock may include a user-actuatable surface 136A which, when turned, may cause the bolt to move on threads 136B and to friction compress the contact point 136C against rod 80. As one alternative to a thumb screw, contact 136C may be a complementary set of detents. Rod 80 may include a distal end which may be rounded.

Elbow 74 may further include at least one stub 170 with a laterally movable cross pin 172. Cross pin 172 may be longitudinally biased on one direction by a spring or bias system 176. Other systems to bias the pin 172 to one longitudinal end or the other longitudinal end of the cross pin slot 174 may be used. The bias spring may be outboard of the stub 170. Bias 176 acts on movable pad 178 to keep cross pin 172 at one end of the cross pin slot 174. Pin 172 can be moved to the other end of the cross pin slot 174 by pin actuator surface 184 of lever release 180. In the illustrated embodiment, release lever 180 has a pivot intermediate pin cam surface 184 and a user actuatable surface 182. Other designs of the release lever 180 may be provided as long as when the user exerts force on the release, cross pin 172 moves to the other end of the cross pin slot 174, against the force of bias spring 176. Lever leg 180 moves in direction 182A and pin 172 moves to the right in FIG. 24. Another pin release system may bias cross pin 172 to the right, and use a level lever release acting on the right side of cross pin 172 to force the pin against a right-side directed bias. The bias may be spring, air or water pressure, a leaf spring or a coil spring.

Cross pin 172 may be sized to fit into a pin capture opening formed by open mouth 194, having a wide mouth dimension, leading to a narrow throat 196, with a narrower dimension (but sufficiently sized to pass pin 172 there through), and leading to a cross pin capture slot 198 which may permit the cross pin to move longitudinally in the slot 198. When the cross pin 172 is at slot edge surface 210, the elbow may be locked onto the upper bar 79 of the rack and cargo system. When the cross pin is moved by the user to slot edge or surface 211, the upper bar 79 can be moved upward and withdrawn from the stub 170. The pin capture opening formed by spatial elements 194, 196, 198 is defined by a stem 192 at terminal end 190 of upper bar 79.

Pin capture opening 125 may have an open mouth with a mouth span 194, a narrow throat 196 and a cross pin capture slot 198. Narrow throat 196 may have a smaller dimension or smaller span compared with the larger mouth span 194. Pin capture slot 198 is at least dimensionally sized to retain cross pin 172 therein. Further, cross pin capture slot 198 may extend longitudinally such that cross pin 192 can move forward and back with cross pin capture slot 198. In operation, the user forces terminal end 190 and specifically stem 192 down into the longitudinal slot formed in the longitudinally extending stub 170. The cross pin snaps into the pin capture opening due to the bias on the cross pin. Alternatively, the cross pin may extend inboard (or outboard) of the stub (inboard being towards the truck bed interior) and the cross pin would, in that case, still enter into mouth 94 through narrow throat 196, and into cross pin capture slot 198. In order to release the terminal end 190 and stem 192 from longitudinal stub 170 of elbow 174, the user may move user actuatable surface 182 in direction 182A, and pin actuator surface 184 moves cross pin 72 in slot 174 and also moves the cross pin 172 within cross pin capture slot 198.

Cross pin capture slot 198 may have a pin capture region, as shown in the left section of FIG. 24 (near surface 210) and a release region opposite the capture region. Capture region for pin capture slot 198 may be defined near surface 210. Release region may be formed by surface 211. When cross pin 172 is adjacent release region 211, the upper bar 79 can be lifted away from the vertical stub of elbow 72. Therefore, the cross pin 172 may have a resting position in the pin capture opening 198 generally adjacent capture region surface 210. In a user actuated position when cross pin 172 is adjacent release edge 211, the user can withdraw stem 192 from longitudinal stub 170 by lifting up bar 79. To lock cross pin 172 into cross pin capture slot 198, the user may release user actuatable surface 182 in a direction opposite arrow 182A, cross pin 172 ends up contacting opening edge surface 210 thereby locking the pin in the forward end of the capture region. A mirror of the lock and capture system shown in FIG. 24 is provided on the left side of elbow 74 shown in FIG. 24. Also, some elbows may only have a single longitudinal stub, such as the forward-most elbow and rearward-most elbow.

Figure 25:
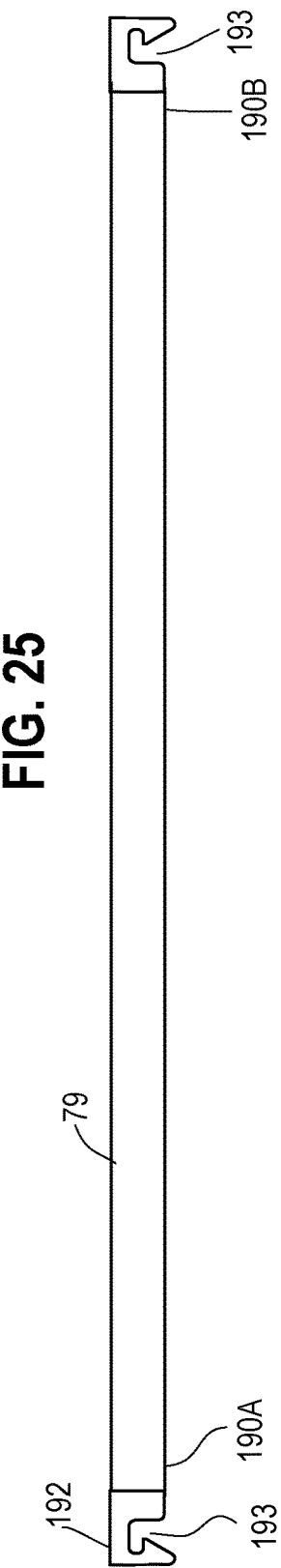
FIG. 25 illustrates a side view of an upper bar of a hoop.
Figure 26:
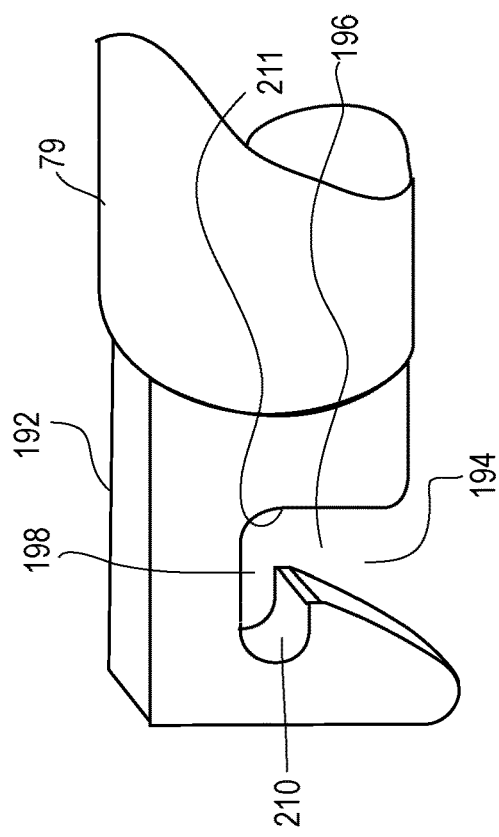
FIG. 26 illustrates the a stem provided on an end of the upper bar of FIG. 25.

FIGS. 25 and 26 illustrate embodiments of an upper rack bar 79. Stem 192 may be a longitudinally extending plate extending form the terminal ends of the upper rack bar 79. Generally, upper bars 79 may be tubes and stem 192 is a singular extending plate. Stem 192 defines the open mouth 194, narrow throat 196, and cross pin capture slot 198. FIG. 25 shows elongated upper bar 79 having at terminal end 192 the pin capture opening 193 at left terminal end 190A and pin capture opening 193 at right side terminal end 190B. The pin capture openings 193 are complementary to the size and shape of cross pin 192. The cross pin is either biased forward or biased aft and the cross pin moves within the pin capture opening 193 and the cross pin slot 174.

Turning generally to FIGS. 27-39, embodiments of cargo systems are shown and described which may include inter-bed components including, for instance, bed dividers and storage boxes. These inter-bed components may be included as part of an embodiment of a cargo system, used with other components such as hoops 70 disclosed outside these figures.

Figure 27:
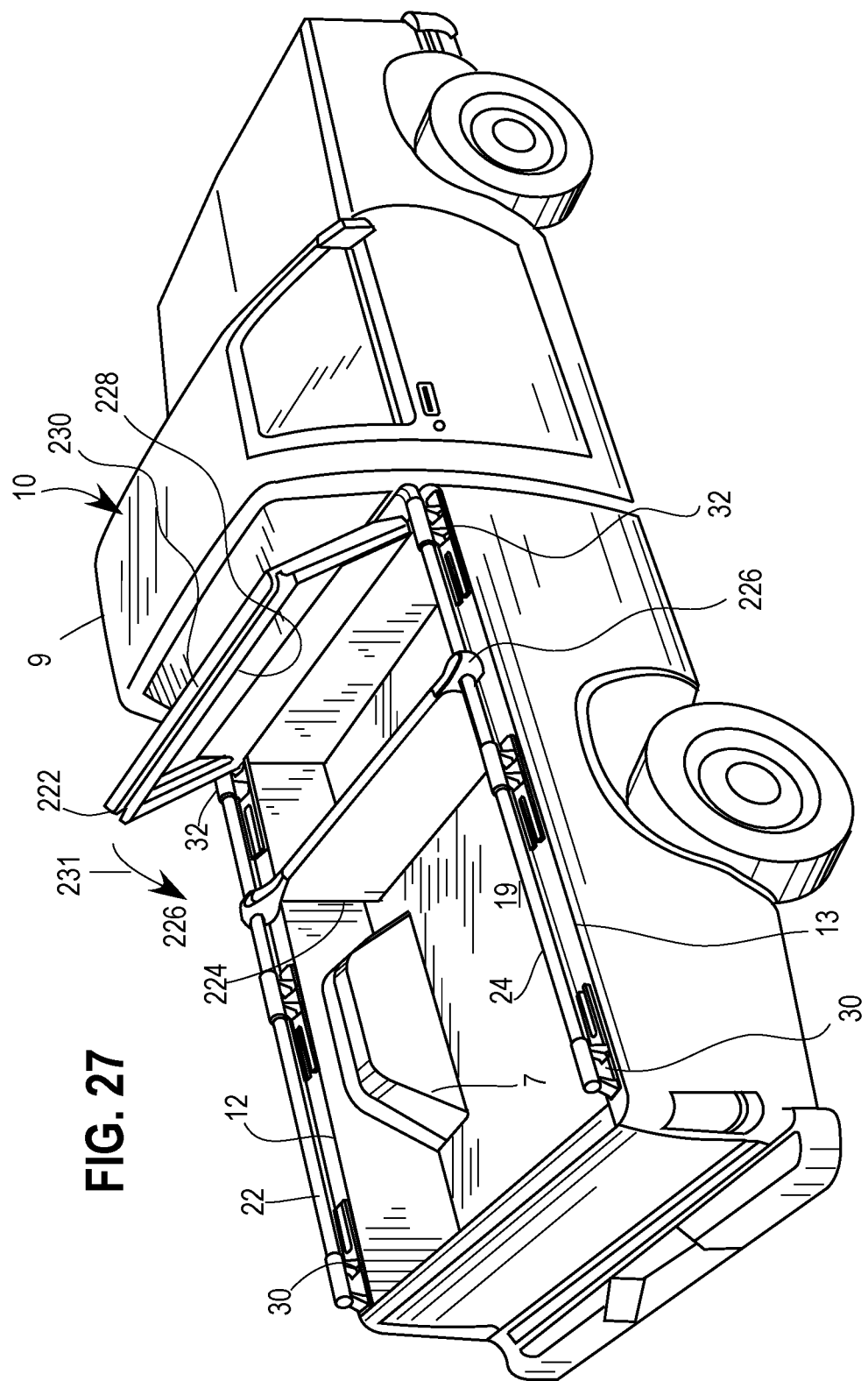
FIG. 27 illustrates a top perspective view of a pickup truck with an embodiment of a cargo system attached thereto, the cargo system including an embodiment of a crossover box shown in an open position.
Figure 30:
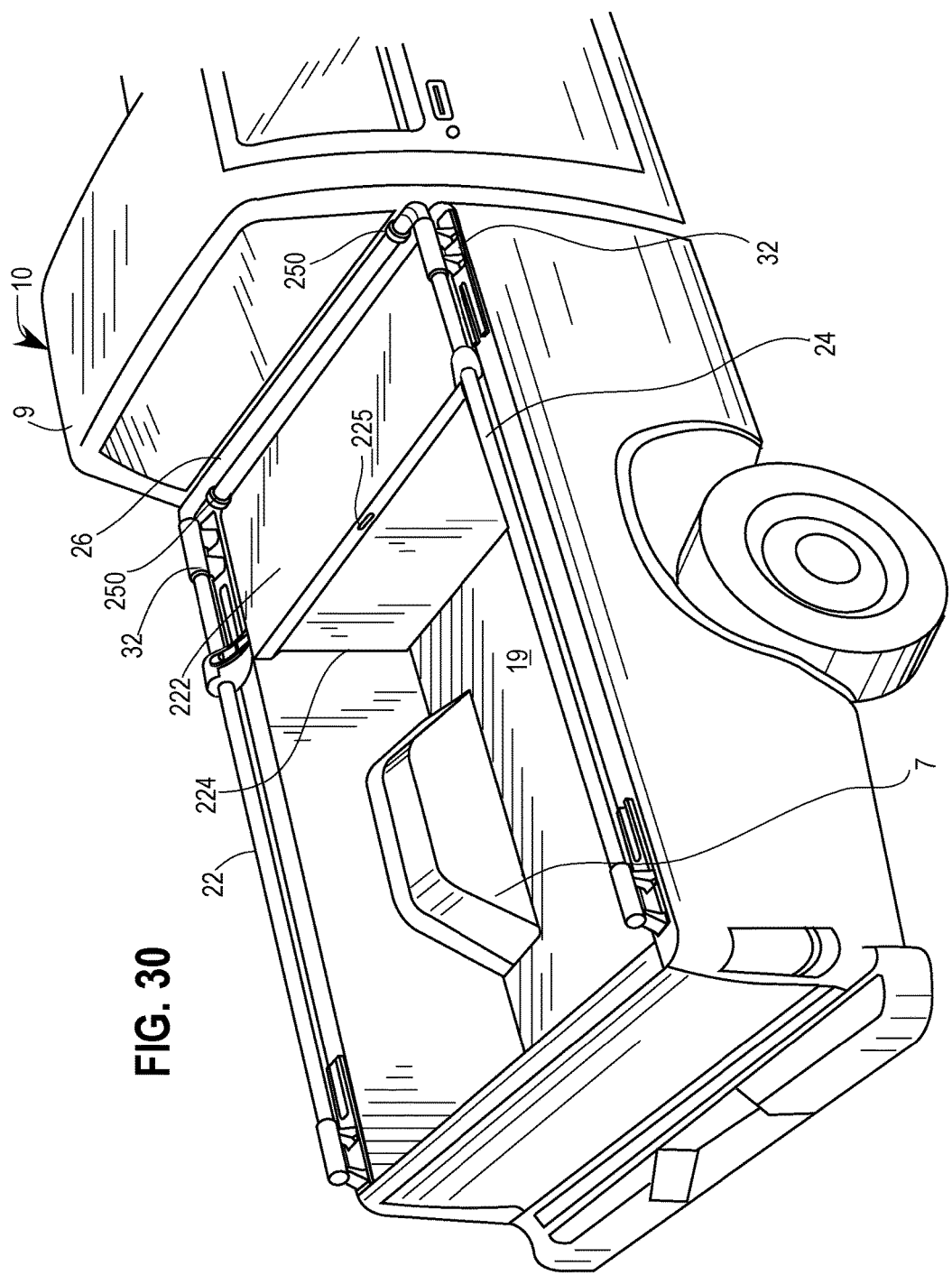
FIG. 30 illustrates a top perspective view of a pickup truck with an embodiment of a cargo system attached thereto, the cargo system including an embodiment of a crossover box shown in a closed position.

Beginning with FIGS. 27 and 30, a cargo system is illustrated including a truck bed divider and locker. FIG. 27 shows the locker top 222 in an open position and FIG. 30 shows locker top 222 in a closed position contacting and closing an interior truck bed space 6 with truck bed divider 224. In operation, when locker top 222 mates with bed divider 224, truck bed interior space 6 is segmented from truck bed divider space 19, and segregated space 6 is separately secured and locked. Therefore, third parties cannot gain access to locker box space 6 unless they have access codes or keys to open diagrammatically illustrated lock system 230.

FIG. 30 shows that locker top 222 may be attached via hinges 250 to cab side rail 26. As discussed earlier in connection with FIGS. 9A, 9B, the forward most stanchions 32 may have a fore end coupler on the forward most end of the elevated bar element of the stanchions. The stanchion elevated bar element may be elevated above the stanchion base platform by standposts as previously described. Additionally, FIGS. 9A, 9B describe the cab side rail having, at its terminal ends, a corner rail end coupler that mates with the fore end couplers on each forward stanchion. As also explained in connection with earlier figures, stanchions 30, 32 are adopted to mount to left and right side rails in an elevated manner above truck bed sidewalls 12, 13.

FIG. 27 shows a laterally extending cross bed bar 225 which is spaced away from cab side rail 26 (FIG. 32) at a predetermined longitudinal distance. In the illustrated embodiment, clamp systems 226 are utilized to attach the terminal ends of the cross bed bar 225 to side rails 22, 24. The attachment mechanism may include one or more clamps described previously in connection with FIGS. 13 through 18. In one embodiment, the locker top could have a longitudinal span less than the height of the cab-side truck bed wall. If the cross bed bar was removed, the shortened lock top can be stored next to the cab-side truck bed wall. Some variation in longitudinal span can take into account the elevation of the cab-side rail.

Locker top 222 may have, along its forward edge region, one or more locker top hinges 250 as shown FIG. 30. The longitudinal span of locker top 222 may be substantially the same as the predetermined longitudinal distance between bed divider (bar 225 and panel 224) and the front cab side rail 26. One or more hinges 250 (FIG. 30) permit locker top 222 to swing from a vertically open top position shown in FIG. 27 to a closed and potentially locked horizontal position in FIG. 30. In a closed position, the locker top encloses interior truck bed space 6 which is defined by the truck bed sidewalls 12, 13, the fore end truck bed wall and the bed divider system 225, 224. A lock system 230 (diagrammatically illustrated) may be utilized by the user to lock locker top 222 to cross bed bar 225.

Figure 28:
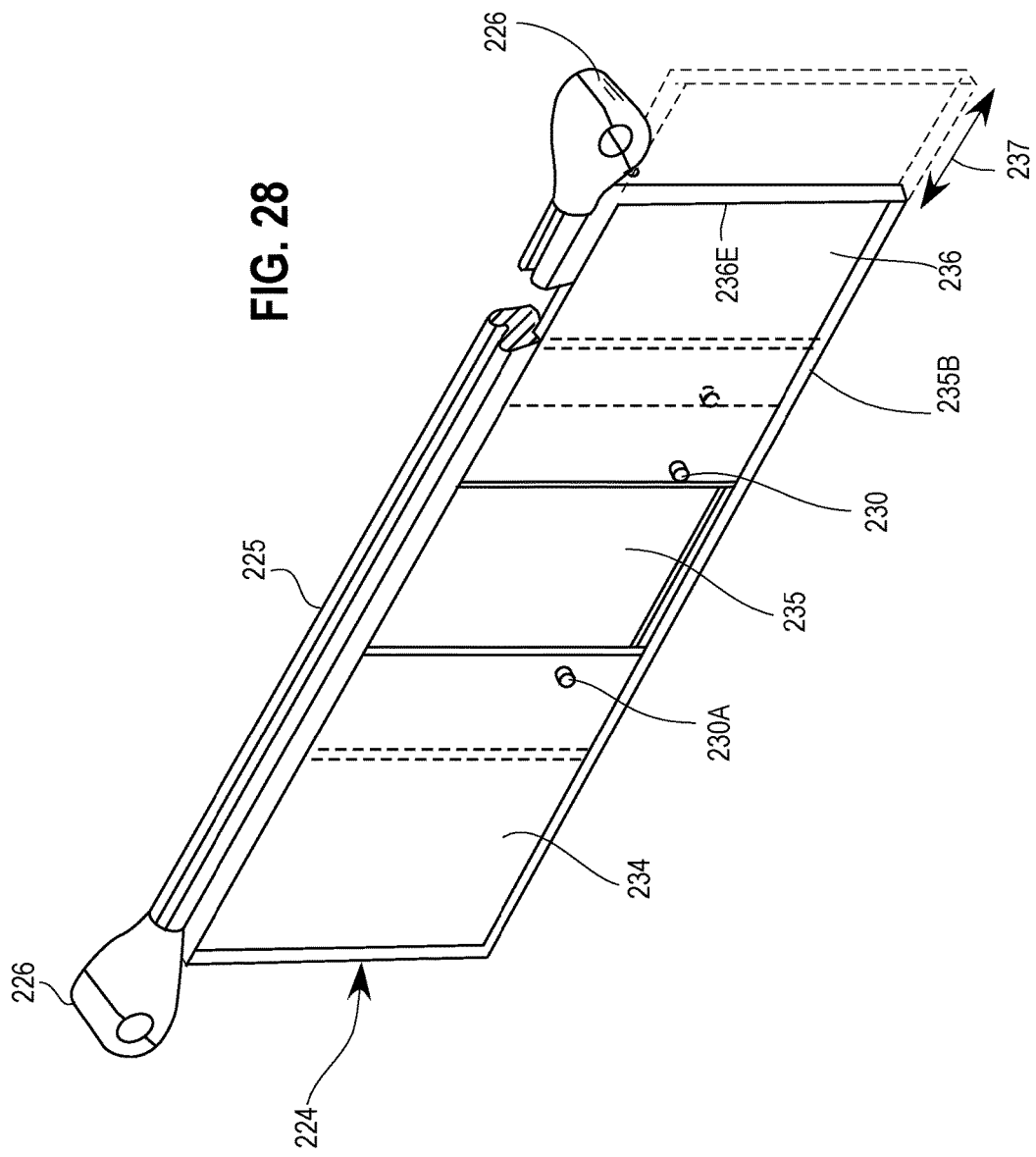
FIG. 28 illustrates a top perspective view of embodiments of side panels as may be part of a truck bed divider.

FIG. 28 shows an embodiment of cross bed bar 225 and certain bed divider panels which may be movably attached or may be fixed on the lower region of cross bed bar 225. The bed divider can have a single, fixed panel attached to the cross bed bar 225. In the illustrated embodiment of FIG. 28, the truck bed divider panel 224 has a stationary mid panel section 235. Mid panel section 235 may be fixed to the lower end regions or lower edge of cross bed bar 225. Additionally, two movable side panel sections 234, 236 may be provided. The side panel sections 234, 236 move in a guide (shown in FIG. 29) in the lower region of cross bed bar 225. Particularly in FIG. 28, movable side panel 226 may move as shown by arrow 237 and as illustrated by the dashed lines in the figure. In addition, FIG. 28 shows that a fixation element such as a lock system 230A may be utilized to lock the movable extending panels 234, 236 with respect to the stationary panel 235. In this manner, divided out truck bed space 6 (FIG. 27) is securable from intrusion by third parties because the panels are fixed together. Possible fixation elements may include screws, nut and bolt sets, set screws, pin locks, etc.

Figure 29:
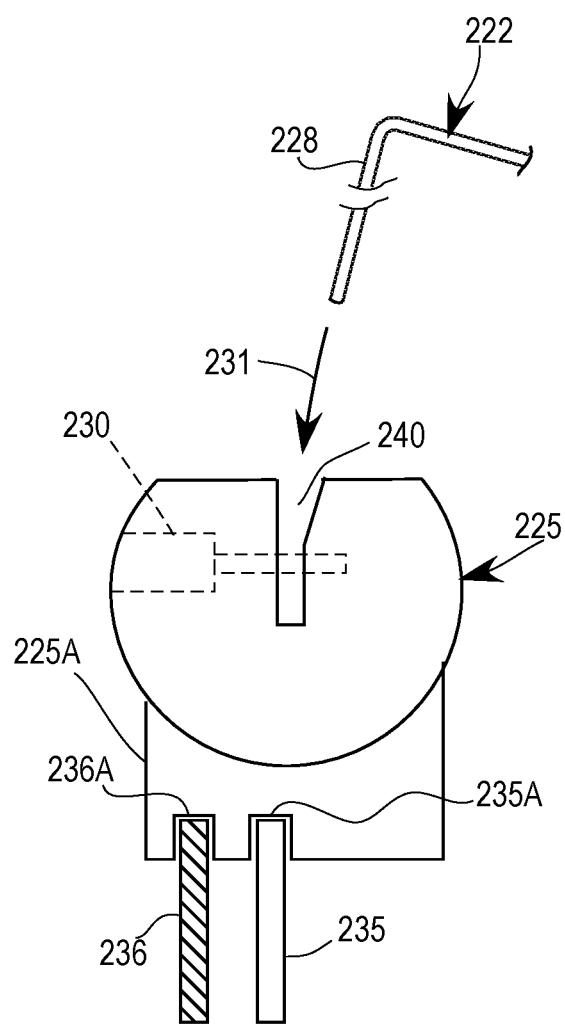
FIG. 29 illustrates a front perspective view of a cross bed bar as may be part of a truck bed divider.

FIG. 29 shows an embodiment of the cross bed bar 225 having a cavity 240 along upper rail bar edge within which extends a depending lip 228 of locker top 222. The locker top 222 can be moved as shown by arrow 231 downward towards the cross bed bar such that the depending edge lip 228 of the locker top fits within cavity 240. A lock system 230 embodiment is illustrated which extends through depending edge 228 of the locker top and through a portion of the cross bed bar 225. Cross bed bar 225 may also have a depending structure 225A which forms guide channels 236A and 235A. Stationary panel section 235 may be mounted in a fixed manner in channel 235A. The side edge of panel 235 is shown in the figure. Movable side panel 236 may be movably mounted in guide channel 236A. Movable side panel 236 is illustrated in cross-section.

Embodiments of truck bed dividers may include a single movable panel utilized in conjunction with a single fixed panel, or may include one or more movable panels, or may include a stationary mid panel and two opposing movable panels as provided in the embodiment shown in FIG. 28. Also, a lower guide plate 235 may be mounted on the truck bed 12 floor such that some panels move both in the upper guide channels 236A (guide channel 235A for the stationary mid panel) and the lower guide plate. The fixed panel 235 may be fixed in both the upper and lower guides and, as such is supported at the top and bottom. The lower guide elements 235A support the bottom edges of all the panels. Plate element 235 may be attached to the floor of the truck bed. Depending front edge 228 of locker top 222 must be large enough to engage the lock system 230 and fit tight into the channel in the cross bed bar to prevent debris and water from intruding within segmented bed space 6.

FIG. 31 shows that locker top 222 has front edge 228 and depending side edges 228A which may exclude debris, dust and water from segmented truck bed space 6. The depth of edges 228, 228A should be greater than the distance between the elevated bar elements of the stanchions and the stanchion base platform. In this manner, a secured space may be provided in segmented truck bed region 6 by the truck bed divider and locker top. As previously discussed, the clamp systems 226 may be the same or substantially similar to the various clamps discussed above in connection with FIGS. 13-18. Other connections may be used. The movable panel sections 234, 236 are adopted to move within the guide channels 236A and vertical panel edges 236E abut truck sidewalls 12, 13. As discussed later, edge 236E (FIG. 28) may include rubber seals or plastic seals or other flexible elements to exclude debris, dust and water from the segmented truck space 6.

FIG. 32 shows a detail of the locker top hinge 250. Hinge 250 may include a rail sleeve 252 which has a passage 252A there through. The size of passage 252A may match or compliment the cross sectional dimension and shape of the cab side rail 26 (FIG. 30). The rail can be any defined shape or profile. Rail sleeve 252 may be a split sleeve and the sleeve halves may be attached to friction compress and mount on rail 26 in any reasonable manner such as by a bolt and nut, threaded passage way and threaded bolt. An attachment passageway 254 is shown in FIG. 32. Hinge 250 may have a depending stem 256 with a forward extending plate 259. Depending stem 256 may have a depending plate region 258 attached to the rail sleeve 252. Hinge 250 may also include a first hinge swing arm 260. The first hinge swing arm 260 is pivotally attached at point 260A to the depending stem 256. One end of the first swing arm 260 is attached to the depending stern 256. The other end of swing arm 260 is attached at pivot point 260B to the locker top forward edge region 261 shown in FIG. 31. Locker top hinge 250 has a second hinge swing arm 262. One end of the second hinge swing arm 262 is pivotally attached at pivot point 262A to an end of the forward extending plate 259 of depending stem 258. The other end of the second swing arm 262 is pivotally attached at point 262B to a mid section of the first swing arm 260. It should be noted that with respect to the foregoing description of the locker top hinge, the term "forward extending" when taken in relationship to the pickup truck cabin, is actually a rearward extending plate. The forward end of the hinge may attach to the cab rail. The rearward end of the hinge may attach to the forward edge regions of the locker top. In other words, as shown in FIGS. 30 and 31, locker top hinge 250 may extend from a forward position on cab side rail 26 to a rearward position defined by depending stem 256 and rearwardly extending plate 259, and the first hinge swing arm 260 may extend rearwardly therefrom.

Figure 33:
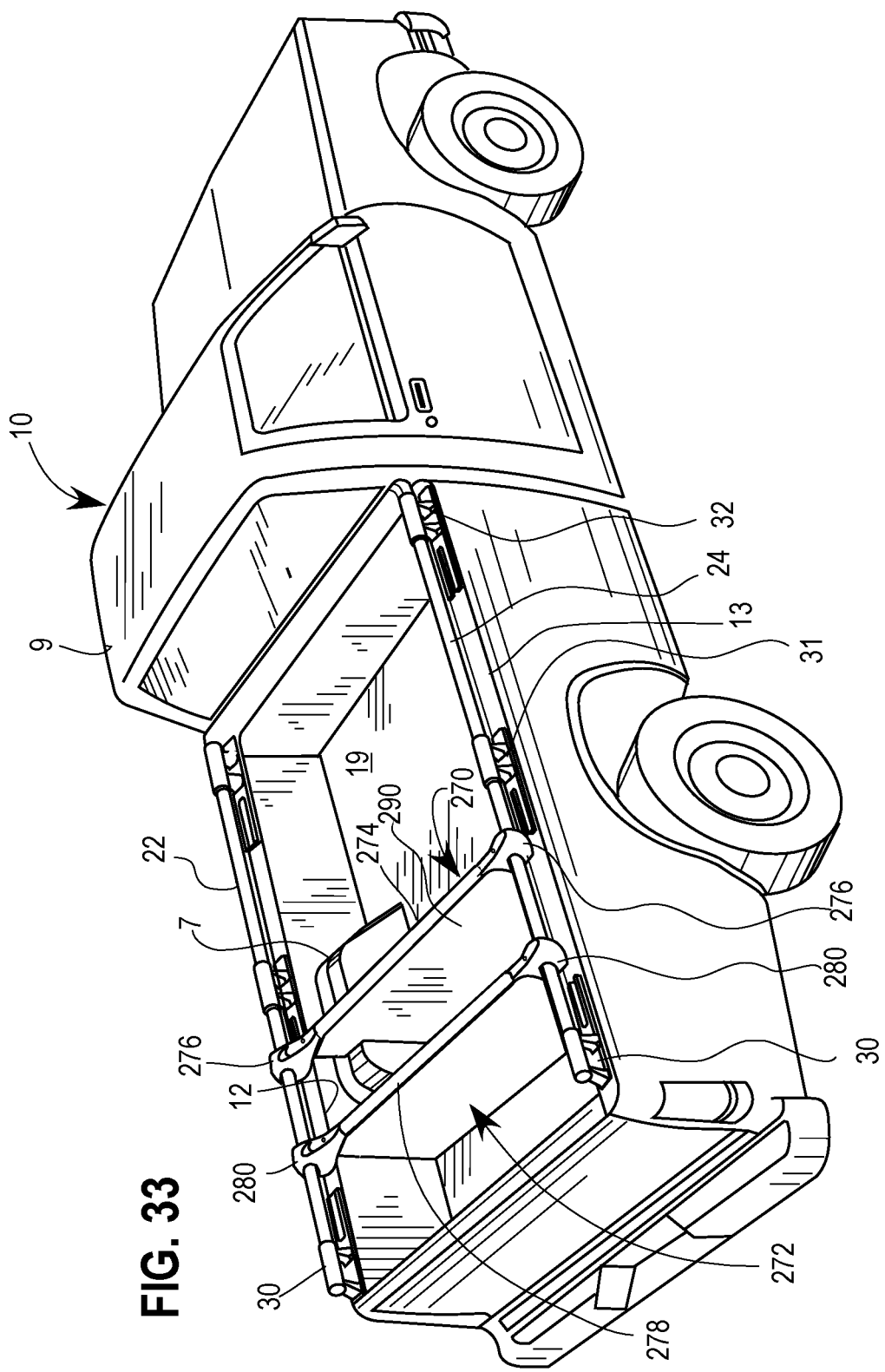
FIG. 33 illustrates a top perspective view of a pickup truck with an embodiment of a cargo system attached thereto, the cargo system including a first embodiment of a bed divider and a second embodiment of a bed divider.

FIG. 33 diagrammatically illustrates a truck bed divider system that may have several similar components as described above in connection with the truck bed divider and locker top system shown and discussed in conjunction with FIGS. 27 and 30. For example, the truck bed divider 270 may include a laterally extending cross bed bar 274. The truck bed divider 270 can be used separately and independent of second truck bed divider 272. With respect to truck bed divider 270, cross bed bar 274 includes connectors at or proximate to its terminal ends to the left and right side rails 22, 24. The connectors can be one or more of the clamps shown and discussed earlier in connection with FIGS. 13-18.

Truck bed divider 270 may feature a lateral span substantially similar to the truck bed lateral span defined between left and right truck bed sidewalls 12, 13. With respect to truck bed divider 272, the bed divider panel 293 may span the entire truck bed lateral span. Truck bed divider panel 232 may be mounted in a fixed manner at the lower edge of laterally extending cross bed bar 278. In another embodiment, bed divider panel 293 can be a triple panel system as shown and discussed earlier in connection with FIG. 28. The bed divider panel 290 may also be constructed slightly differently than the bed divider panel solid piece 293 shown in FIG. 33 or the three piece bed divider panel discussed earlier in connection with FIG. 28.

Figure 34:
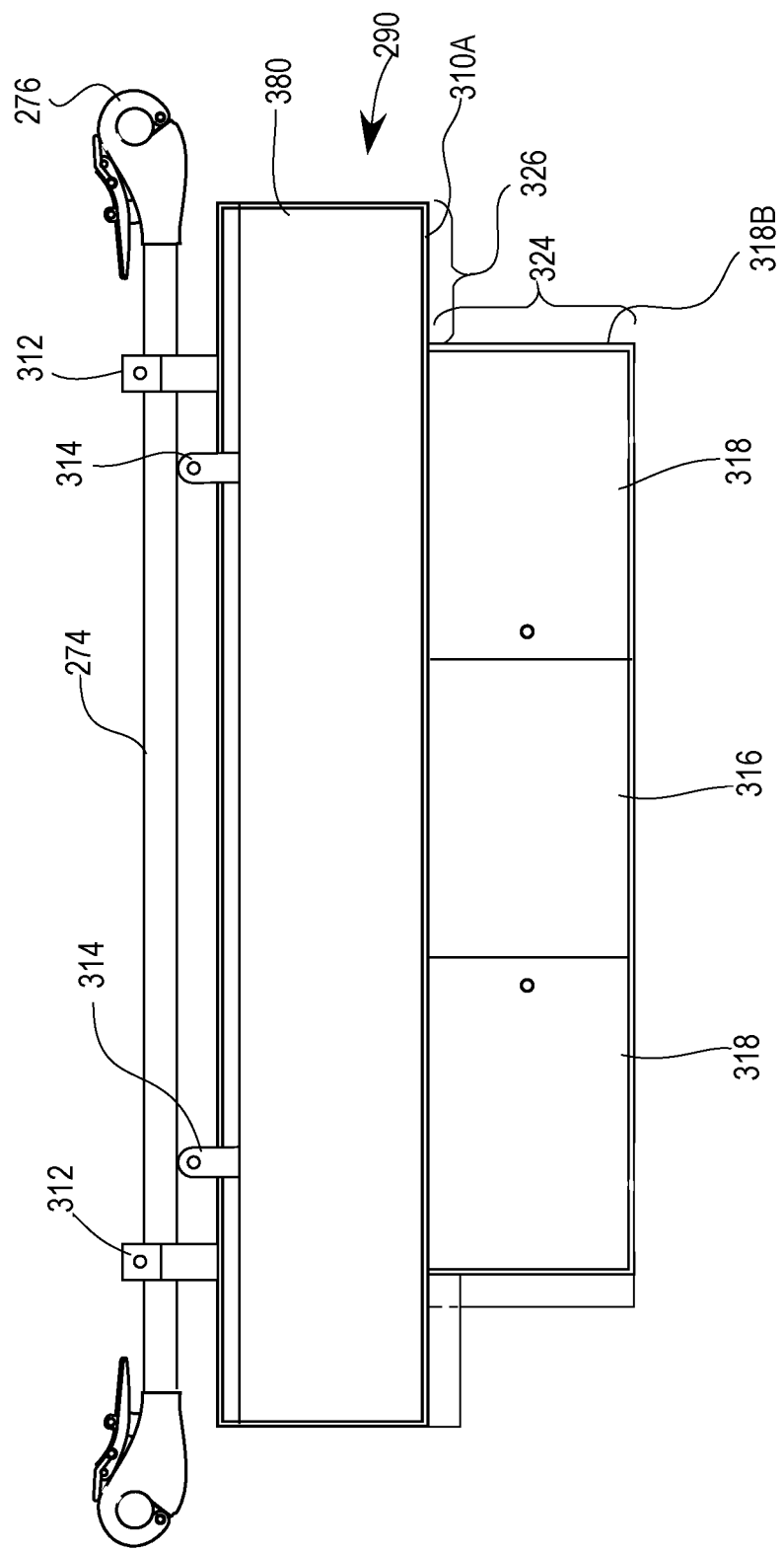
FIG. 34 illustrates a front view of an embodiment of a bed divider.

With reference to FIG. 34, panel 290 may be designed to mate and couple to the side-step well in the truck bed. Divider panel 290 may have an upper fixed lateral panel 310 which may be fixed to the cross bed bar 274. Mounts 312 on the left and right side of cross bed bar 274 may operate to fix the upper lateral panel 310 to bar 274. Additional mounts 314 are also utilizable for stability. The lower edge 310A of the fixed upper panel 310 has a plurality of guides similar to the guides shown in connection with FIG. 29 and guides 236A, 235A on cross bed bar 225. In this manner, the bed divider 290 in FIG. 34 has a stationary lower mid panel section 316 and movable lower panel sections 318, which can adjust to the left and right of the lateral span for truck bed 19 (see FIG. 33) to accommodate the side-step wells in the truck bed. Additionally, the exposed side edges or ends 318B of movable panels 318 may include rubber, plastic or other compressible edge material 324 to seal bed divider panels 318 against the side-step wells 7 of pickup truck 10. Further, the exposed lower edge of the fixed upper panel 310 may include sealed element 326 of rubber, plastic, foam or other material to seal the bed divider 290 onto side-step wells 7 of pickup truck 10. Also, as discussed previously, the attachment mechanism for the cross bed bar is shown as clamp 276 in FIG. 34.

Figure 35:
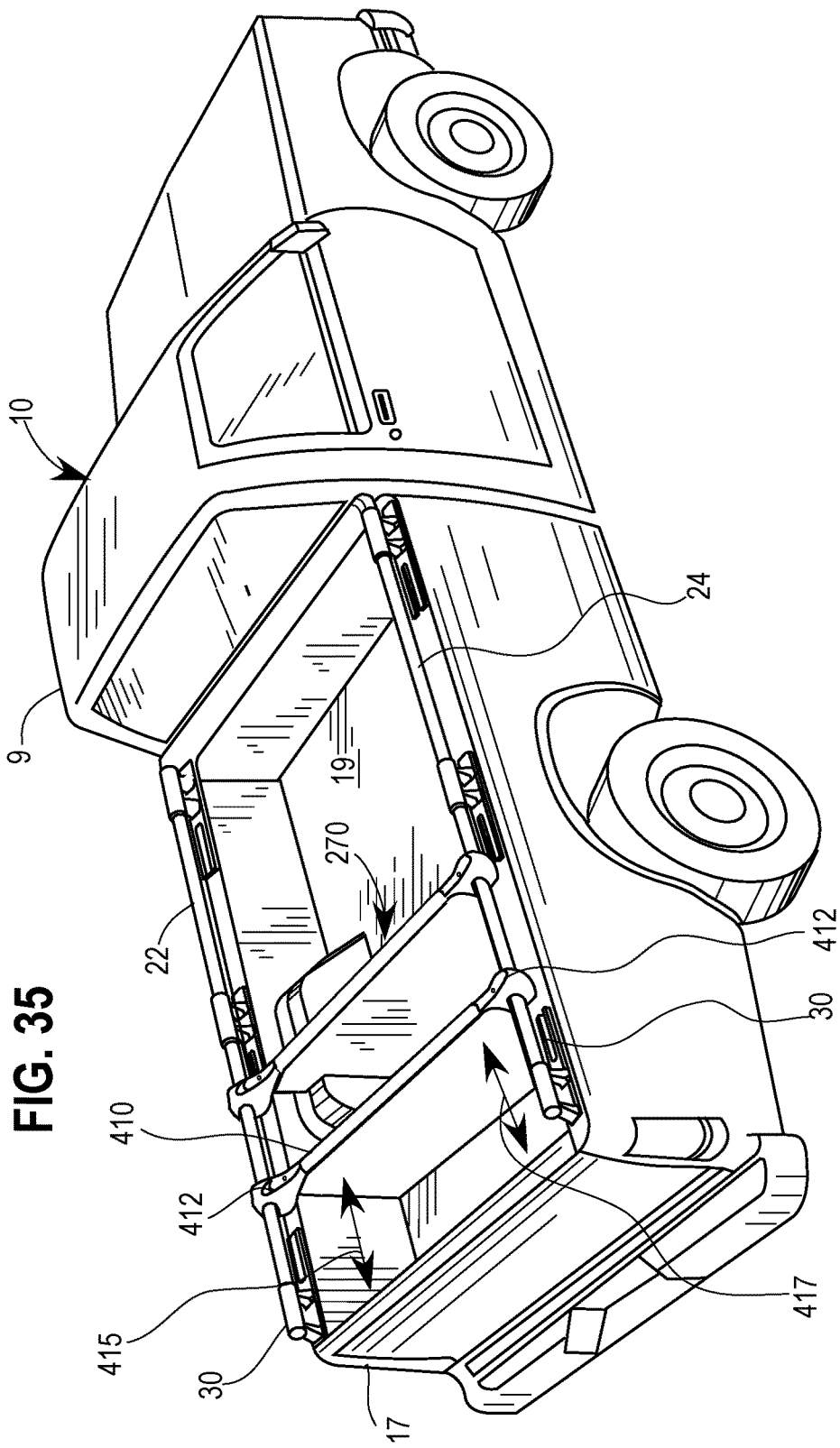
FIG. 35 illustrates a top perspective view of a pickup truck with an embodiment of a cargo system attached thereto, the cargo system including a first embodiment of a bed divider and a second embodiment of a bed divider, the figure demonstrating the movable nature of at least one of the truck bed dividers between a first and second bed divider position.

FIG. 35 shows a truck bed divider that can be positioned at an oblique angle with respect to the side walls 12, 13 of pickup truck 10, which is also to say that it may be positioned not orthogonal to the rear end of the truck. In the illustrated embodiment of FIG. 35, bed divider 410 may be attached via clamps or any other attachment mechanisms 412 to side rails 22, 24. Truck bed divider 410 is shown at an oblique angle with respect to sidewalls 12, 13 of pickup truck 10 where the distance 415 to the rear tailgate of the truck is smaller than rear distance 417. In this manner, the vehicle operator can obliquely adjust the truck bed dividers and trap and fix materials and items (such as barrels or canisters) against the tailgate of pickup truck 10 typically found at rear end 17 of the truck and the bed divider. Objects may be attached between bed dividers cross bars, such as a slack tarpaulin, to permit placing items of cargo therein.

Figure 36:
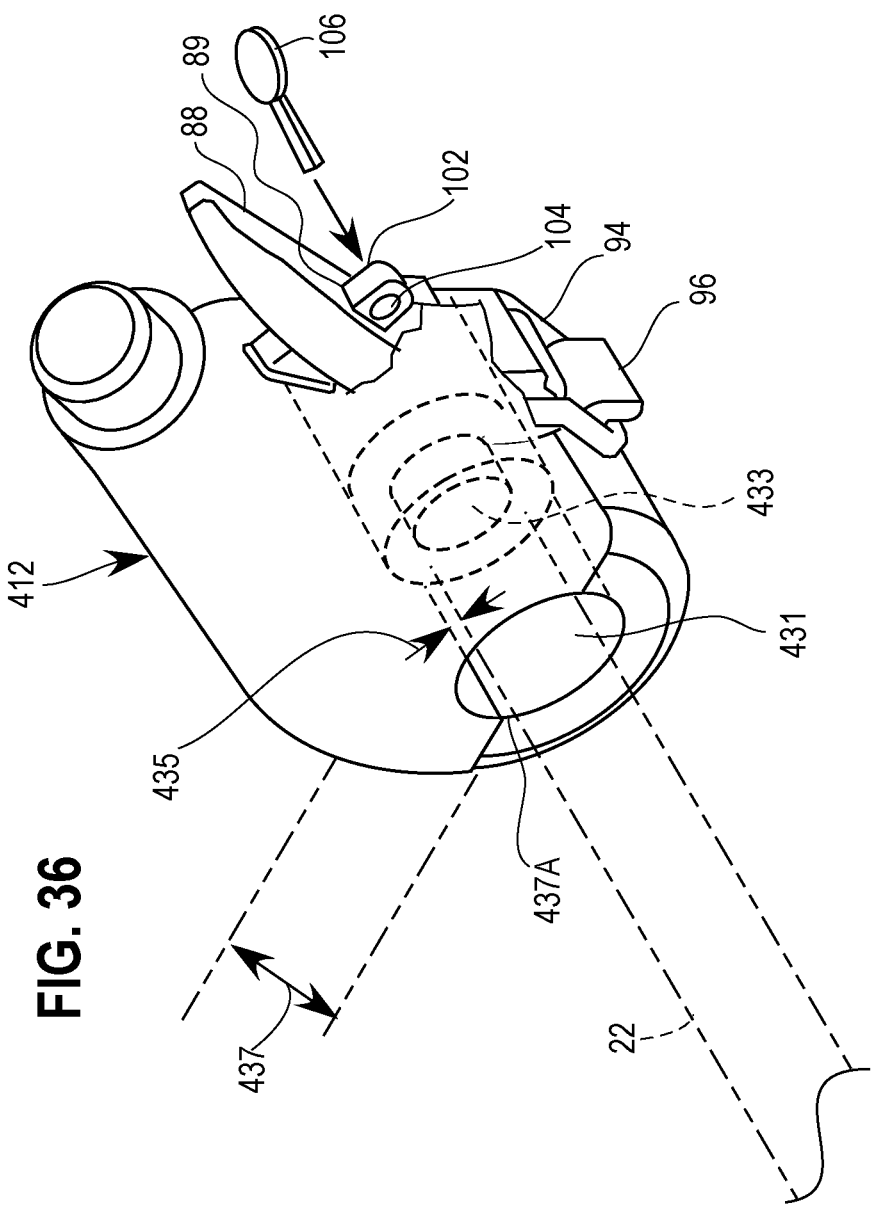
FIG. 36 illustrates a top perspective view of an embodiment of a clamp operable to facilitating an oblique position of an embodiment of a truck bed divider.

FIG. 36 illustrates an oblique rail clamp 412 utilized to provide the obliquely adjustable truck bed divider 410. Many of the features of clamp 412 are discussed earlier in connection with clamp 78. However, in FIG. 36, the oblique clamp 412 may include a smaller diameter interior rail passageway 433 which matches the cross dimensional size of rail 22, 24. The smaller diameter interior rail passageway 433 has a small longitudinal span compared to the balance of the longitudinal span of the clamp-rail passage. Oblique clamp 412 also defines in its interior, a larger cross sectional rail passage 431. In other words, small passage 433 matches the size of rail 22, 24 whereas large passage 431 is much larger than small rail passage 433. When oblique clamp 412 is mounted on rail 22, a space 435 is established between rail 22 and the interior surface of large rail passage 431.

Since the small passage 433 clamps onto rail 22 with a compression friction grip, the clamp 412 and the attached cross bed bar can be moved or swung with respect to the axial centerline of rail 2.2 thereby creating an angle in larger diameter space 435. The angled space permitted by oblique clamp 412 is defined by the size of radial size of space 435 immediately next to step up 435A at the small rail passage 433 and the longitudinal length 437 of the space 435 in the interior of oblique clamp 412. In other words, clamp 412 can be twisted such that the forward end 437A is adjacent to or contacts rail 22. In this manner, the cross bed bar 410 in FIG. 35 can be angled at an oblique angle with respect to rear end 17 of pickup truck 10.

Figure 37:
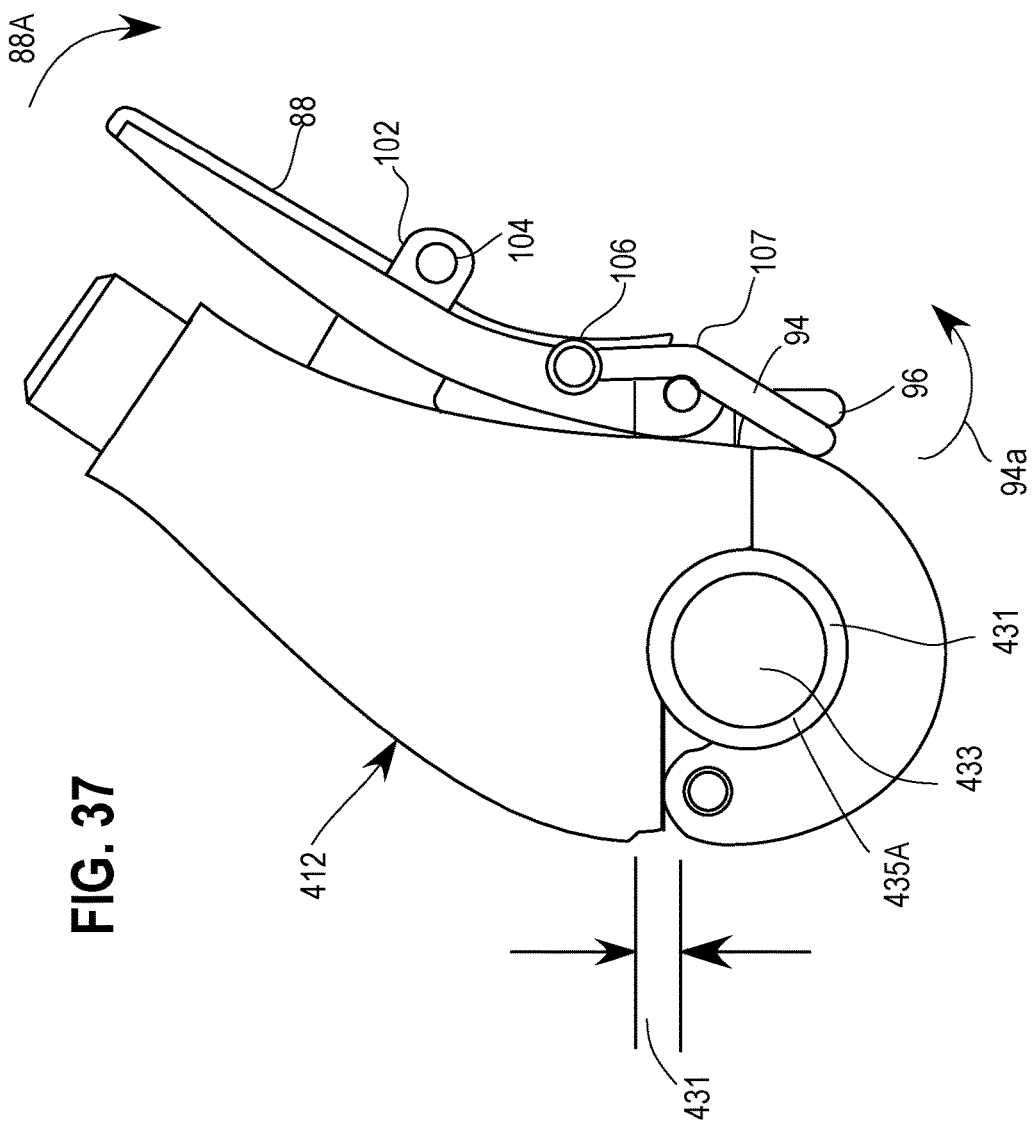
FIG. 37 illustrates a front view of an embodiment of the clamp of FIG. 36.

FIG. 37 shows a different view of oblique clamp 412. The step surface 435A is shown between the smaller radial space 433 and the larger radial passage 431. The size differential 437 between these two radial passages 433, 431 is also illustrated in FIG. 37.

Figure 38:
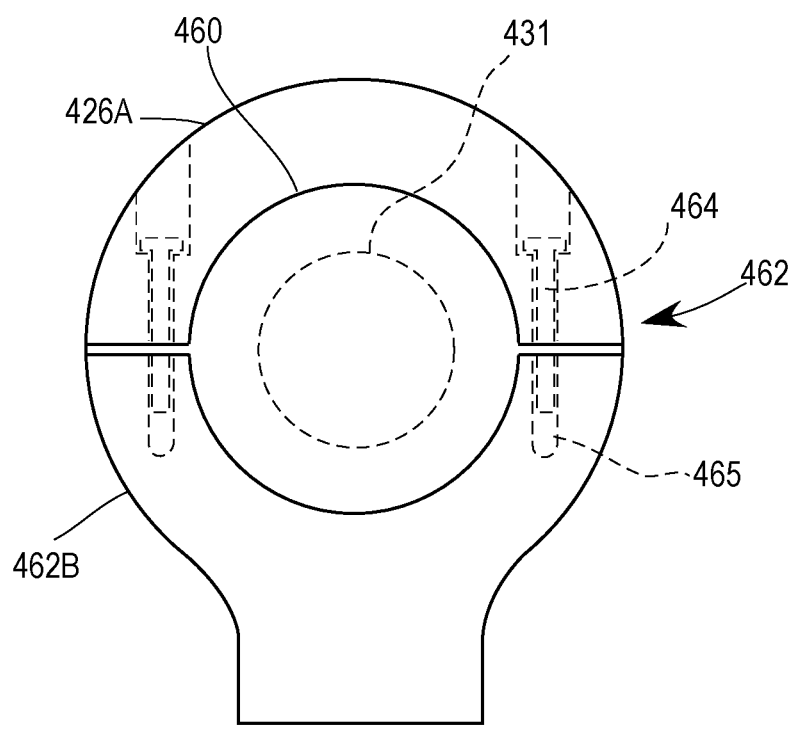
FIG. 38 illustrates a front view of an embodiment of a clamp.

FIG. 38 illustrates a clamp 462 with split clamp jaw segments which may be threadably attached together. Clamp 462 has clamp jaw members 462A and 462B. Clamp jaw members 462A and 462B may be attached together via threaded bolt or screw 464 which connects with threaded passageway 465 or a nut in the passageway. In this manner, there may be no lever and no release lever as shown in FIGS. 13-14. Split clamp 462 can be used on the cross bed bars rather than the lever release clamp shown in FIG. 27, 30 or 35. Additionally, FIG. 38 optionally shows a small radial passage 431 which may convert the split clamp into the oblique clamp. With a small radial rail passage 431, the clamp is an oblique clamp. If small radial rail passage 431 is eliminated, then clamp 462 is a common clamp described earlier.

Figure 39:
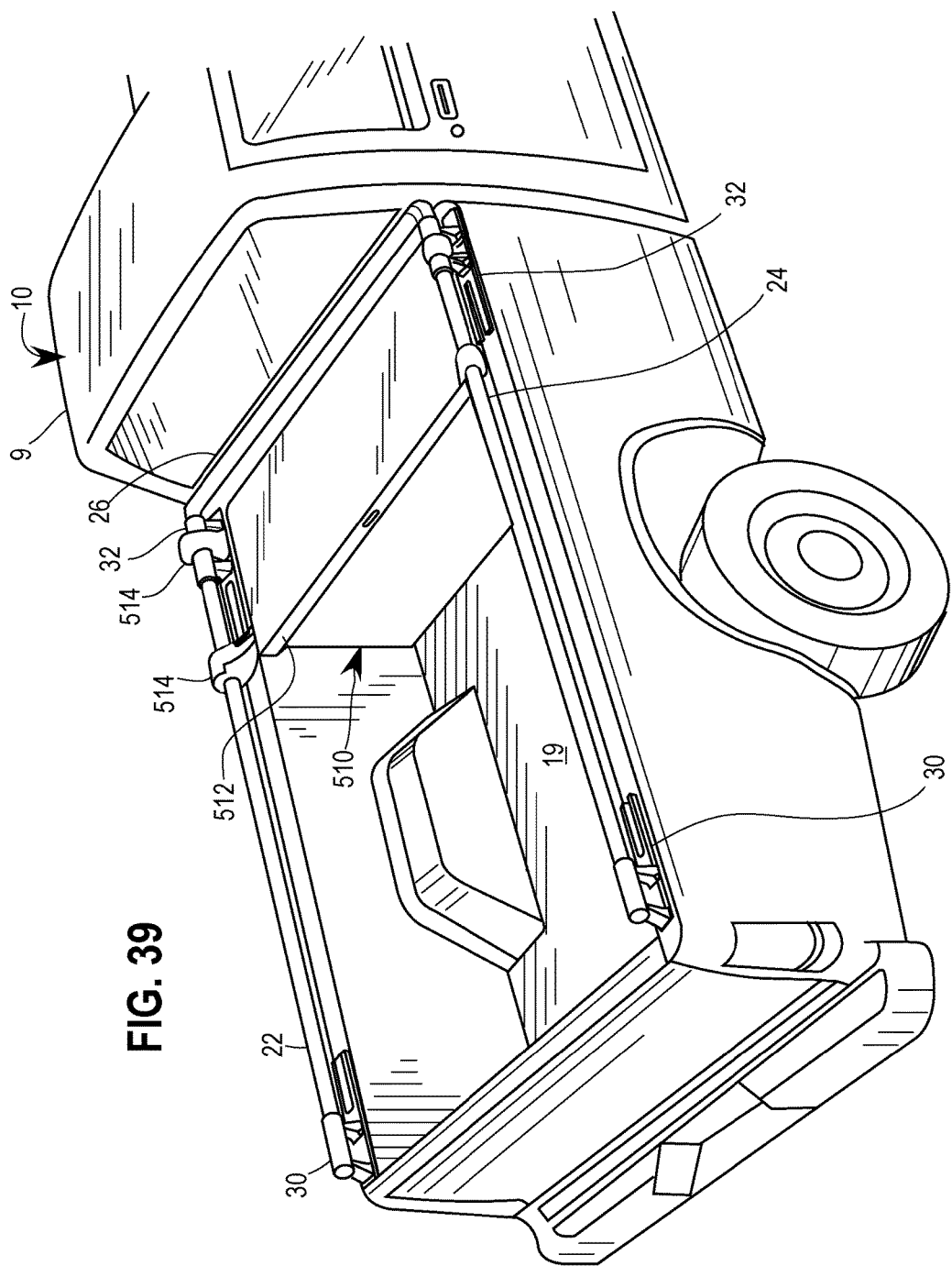
FIG. 39 illustrates a top perspective view of a pickup truck with an embodiment of a cargo system attached thereto, the cargo system including an embodiment of a crossover box.

FIG. 39 illustrates an embodiment of crossover box 510 for a pickup truck bed. Cross over box 510 may have a box lid 512. Crossover box 510 may be mounted on cross bed bars (not shown). The cross bed bars may be attached via clamps 514 to the left and right rail 22, 24. In this manner, the cargo system can easily accommodate a crossover box 510.

Figure 40:
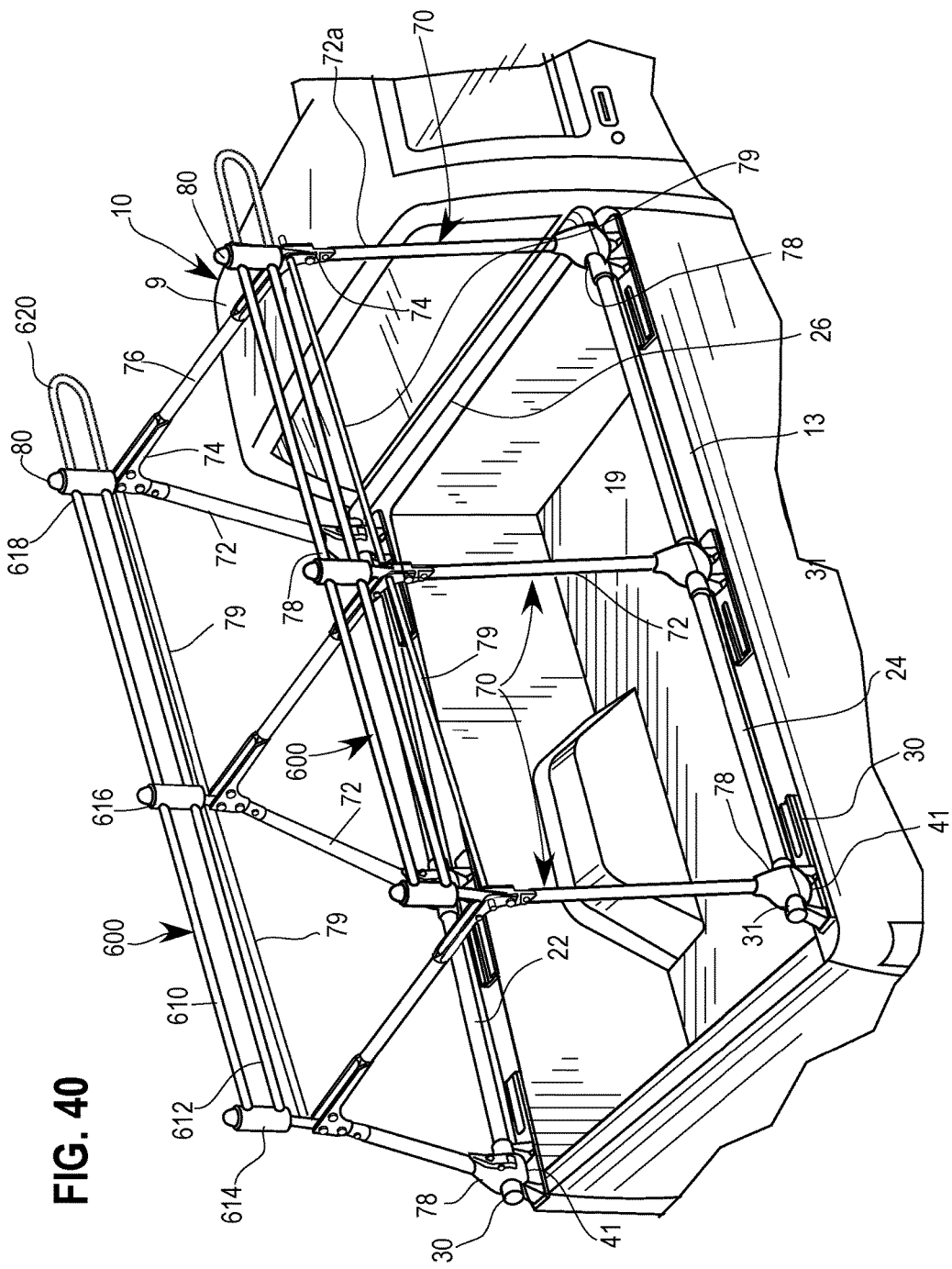
FIG. 40 illustrates a top perspective view of a pickup truck with an embodiment of a cargo system attached thereto, the cargo system including embodiments of hoops with an embodiment of an overhead or elevated rack.
Figure 44:
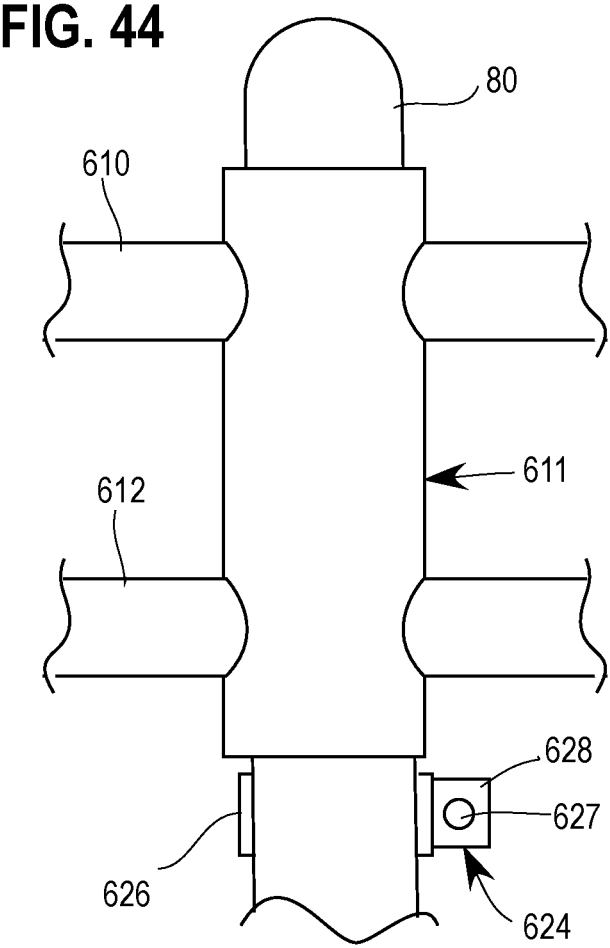
FIG. 44 illustrates a first side view of an embodiment of an attachment for elevated side rails.
Figure 45:
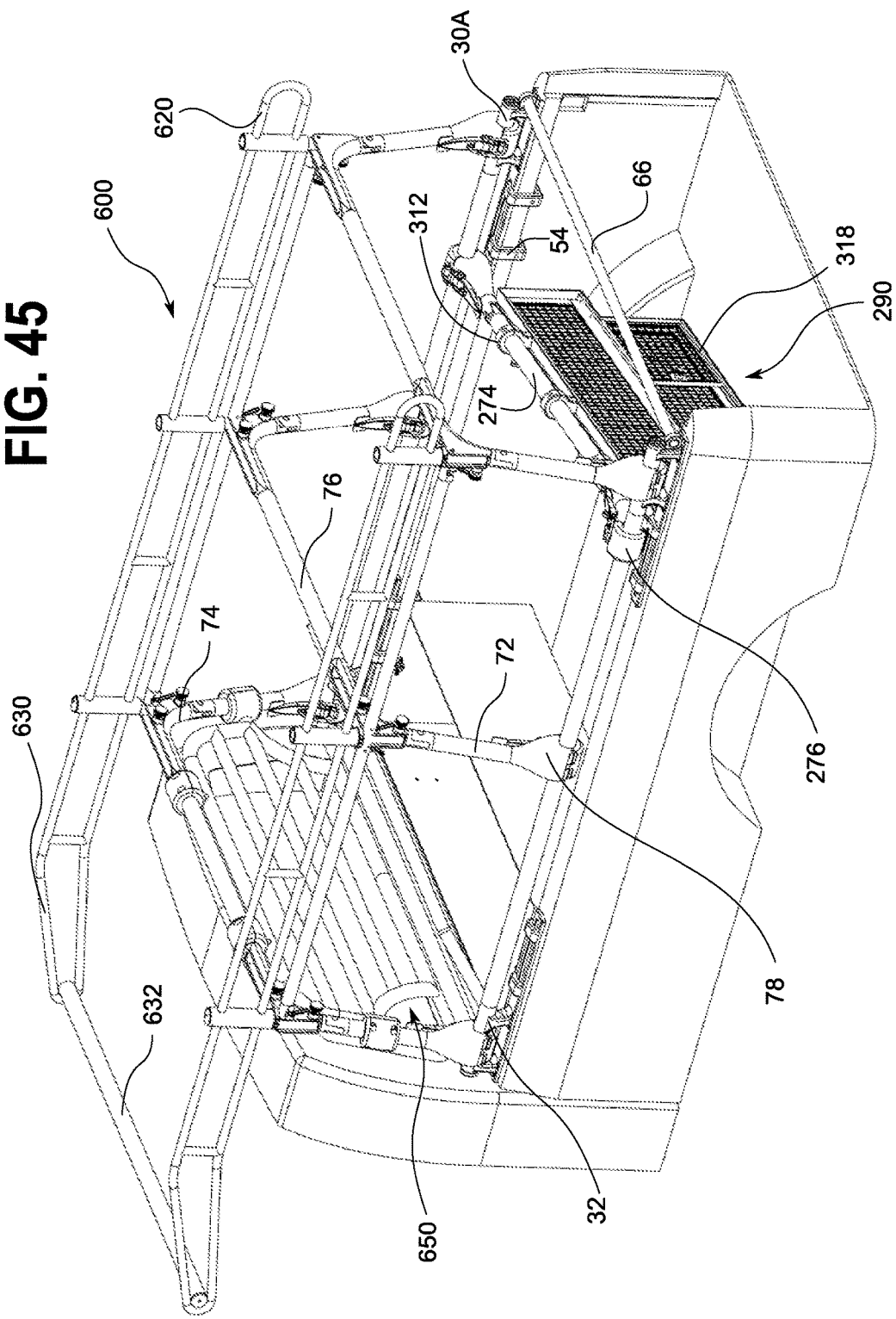
FIG. 45 illustrates a top perspective view of a pickup truck with an embodiment of a cargo system attached thereto, the cargo system including embodiments of elevated rails, a bed divider, a crossover box, and a headache rack.
Figure 46:
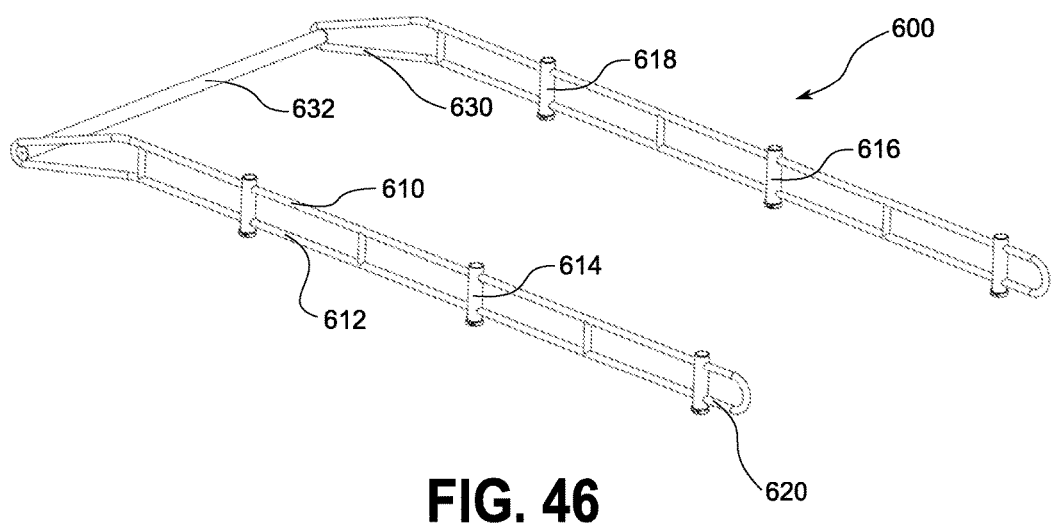
FIG. 46 illustrates a perspective view of an embodiment of elevated sky rails.

FIGS. 40-44 illustrate embodiments of elevated rails 600 as may be included in embodiments of a cargo system. Generally, each set of elevated rails 600 may include a top rail 610 and a bottom rail 612 substantially parallel to top rail 610. When installed as part of a cargo system, the elevated rails 600 may elongate along the truck bed 12 above, for instance, left and right side walls. A bent rail end 620 may be provided proximate to a forward end (as illustrated in FIG. 40), proximate to rearward end of the vehicle (as illustrated in FIGS. 45 and 46), or on both ends. Bent rail ends 620 join top and bottom rails 610, 612 thereby creating a particularly useful handle for the vehicle operator to grasp as he or she is maneuvering the cargo system.

Elevated rails 600 may be secured into place through insertion of rods 80 from one or more elbows 74 of one or more hoops 70 into rod sleeves 611, 614, 616, 618. Different embodiments of rod sleeves 611, 614, 616, 618 are disclosed herein. A securing collars 624 is one such attachment mechanism for securing a rod sleeve with a rod 80. Securing collars may be connected at a base of a rod sleeve 611, 614, 616, 618 and may be tightened by a tightening mechanism in order to secure the rod 80 within the sleeve. In this respect, collar 624 may be comprised of two conforming collar halves 626, each having a collar aperture provided on a protruding collar tab 628. A fastener 627 such as a nut and bolt may be provided through collar aperture 627 and tightened in order to press-fit each collar half 626 together, thereby securing rod 80 from removal from sleeve 611, 614, 616, 618. As illustrated, rod 80 may protrude from the top of the sleeve as inserted, or alternatively the sleeve may fully encompass the distal end of the inserted rod 80. It should be appreciated that elevated rails 600 may be designed for accommodating rods from three hoops 70, and yet function perfectly well if only two hoops 70 are included as part of the active embodiment of the cargo system.

FIG. 45 depicts an embodiment of a cargo system. With reference to FIGS. 45 and 46, elevated rails 600 may include bent rail ends 620 proximate to the rearward end of the vehicle. Providing bent rail ends 620 proximate the rearward of the vehicle may permit a user of the cargo system to grasp bent rail ends 620 while entering and exiting the vehicle as well as manipulating components of the cargo system. As shown in this embodiment, an extension portion 630 of elevated rails is provided which may extend over at least a portion of the cabin. An extension cross bar 632 may be provided at the forward end of sky rails 600. Extension portion 630 may be partially angled such that the distal, forward end of extension portion 630 may be closer to the vehicle than the rest of extension portion 630. By angling the distal end of extension portion 630, extension cross bar 632 may have a height substantially similar as the lateral cross bars 76 thereby permitting an object, such as a ladder for instance, to lie flat along the lateral cross bars 76 and the extension cross bar 632.

Figure 47:
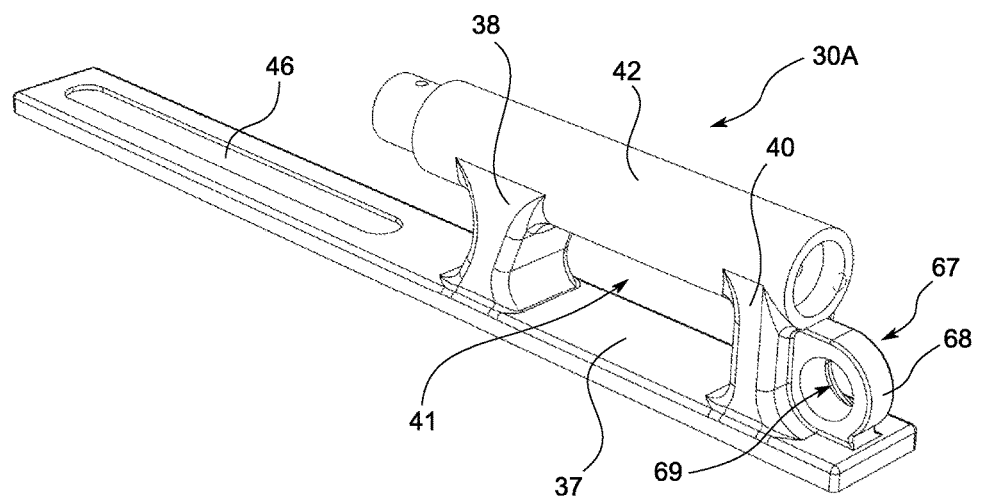
FIG. 47 illustrates a perspective view of an embodiment of a stanchion.

FIGS. 45 and 47 depict another embodiment of a stanchion 30A for use with a cargo system. Stanchion 30A may include an eyelet 67 including an eyelet perimeter 68 with an eyelet aperture 69 defined within the eyelet perimeter 68. Eyelet perimeter 68 may be extruded from a portion of stanchion 30A, such as top surface 37 of the base platform as well as one of the standposts 38, 40. In the illustrated embodiment, eyelet 67 is depicted as proximate to the rear end of stanchion 30A, although the front end proximate to channel 46 is also contemplated as a positioning. Eyelet aperture 69 may be utilized to secure cargo, such as providing an anchor point from which to tie down cargo carried by the vehicle, using twine or rope for instance. Eyelet aperture 69 may also accommodate an eyelet cross bar 66, which may be secured between opposing stanchions 30A.

Figure 48:
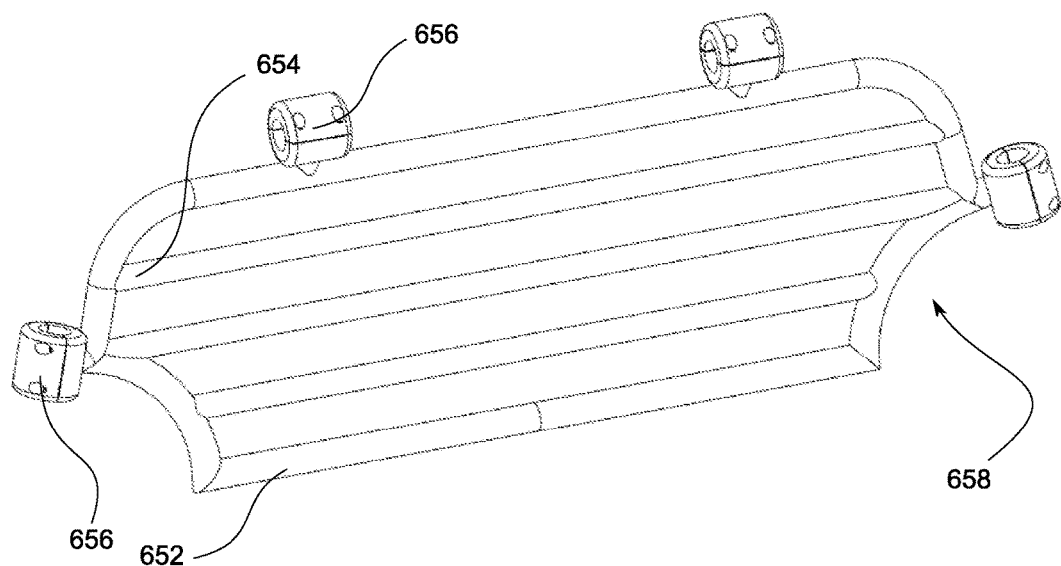
FIG. 48 illustrates a perspective view of an embodiment of a headache rack.
Figure 49:
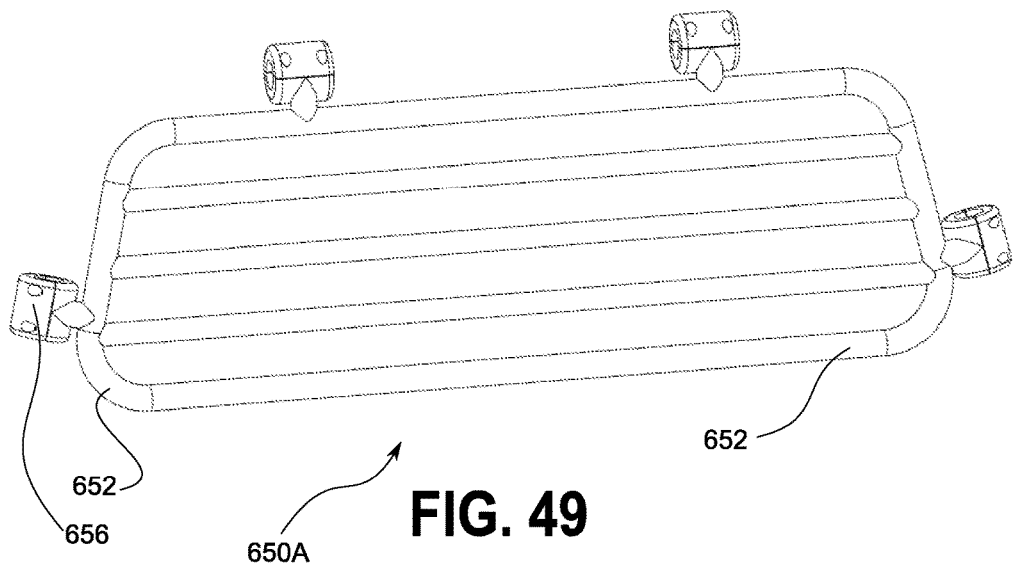
FIG. 49 illustrates a perspective view of another embodiment of a headache rack.
Figure 50A:
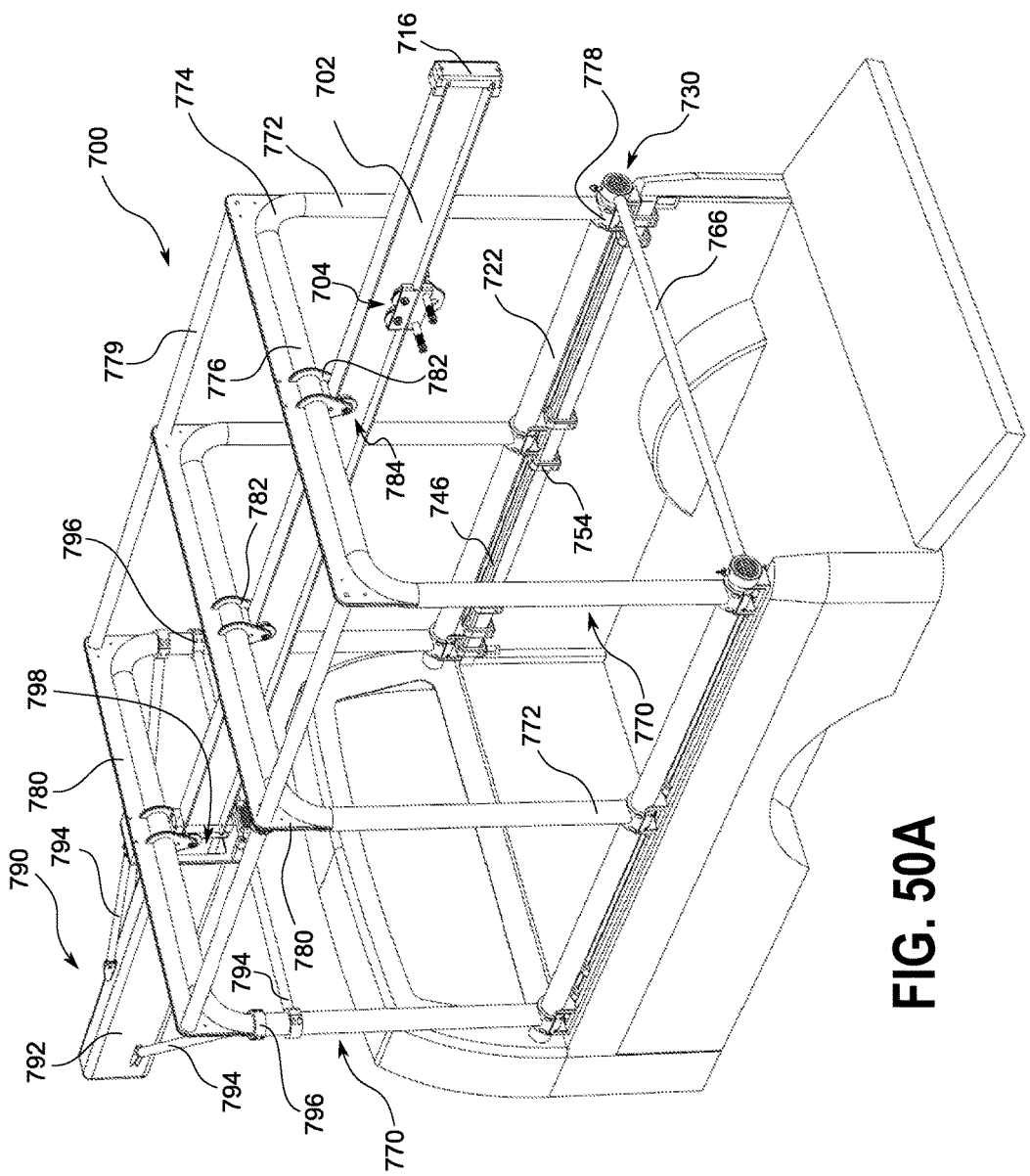
FIG. 50A illustrates a top perspective view of a pickup truck with an embodiment of a cargo system attached thereto, the cargo system including an embodiment of a cargo loader.
Figure 50B:
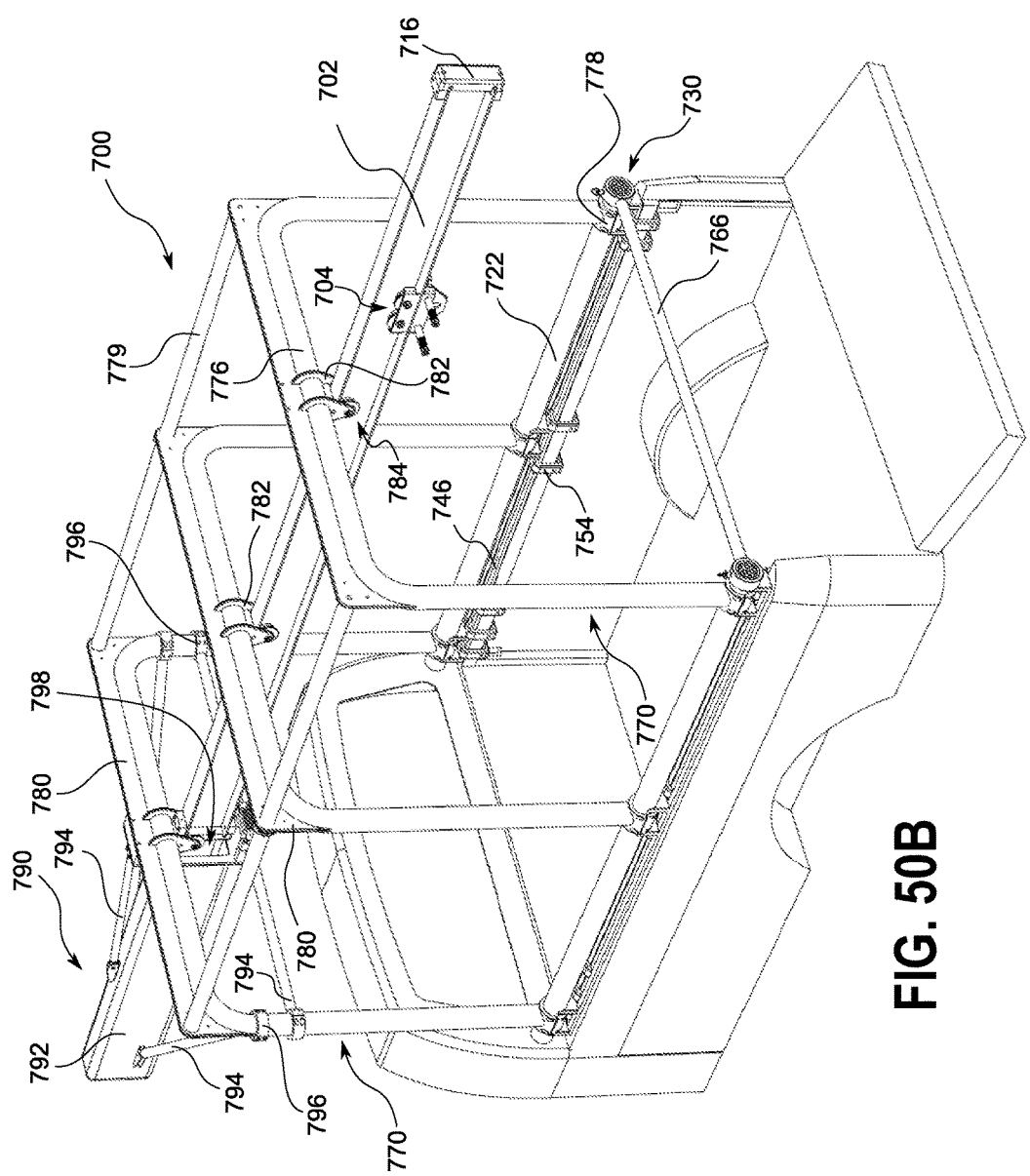
FIG. 50B illustrates a top perspective view of a pickup truck with an embodiment of a cargo system attached thereto, the cargo system including an embodiment of a cargo loader.

FIGS. 48 and 49 illustrate embodiments of cabin guards or headache racks 650 usable in embodiments of the cargo systems disclosed herein. The embodiment of rack 650 shown in FIG. 48 is also shown in FIG. 45. Rack 650 may include a perimeter rack bar 652 at the outer edge of rack 650. Perimeter bar 652 be extruded or otherwise manufactured from a single bar, or in other embodiments perimeter rack bar 652 may be a plurality of bars joined together. A plurality of rack cross bars 654 may be provided and spaced so as to restrict large, heavy items passing through perimeter rack bar 652 thereby protecting the vehicle's cabin from cargo. Three rack cross bars 654 are shown in the illustrated embodiments, but as a few as one rack cross bar 654 is contemplated within the disclosure, and substantially more than three rack cross bars 654 is also contemplated. Rack cross bars 654 may or may not be equally spaced from one another. Rack connectors or clamps 656 are provided at or proximate to the rack perimeter bar 652. In the illustrated embodiment, rack clamps 656 are securable to a hoop 70. Rack clamps 656 may include one or more side rack clamps each connectable to leg 72. Rack clamps 656 may include one or more upper rack clamps each connectable to elbow 74, lateral cross bar 76, or both. Perimeter bar 652 may be dimensioned to include a rack cutout 658, which in the illustrated embodiment is inwardly arcuate. Rack cutout 658 may permit clearance from rack 650 and other modular components of the cargo system, such as a stanchion 32 or hoop clamp 78.

With reference now to FIGS. 50A-53, a cargo loader 700 may he included in embodiments of a cargo system. Cargo loader 700 may be provided for the loading, lifting, or manipulation of heavy objects weighing hundreds or thousands of pounds. Cargo loader 700 may include a cargo loader beam or brace 702 supported by a plurality of cargoloader hoops 770, which may be connected to the vehicle at one or more cargo loader stanchions 730. As with hoop 70 embodiments described herein, cargo loader hoop 770 may include a pair of cargo loader hoop legs 772, a cargo loader hoop elbow 774, and a cargo loader hoop cross bar 776. Cargo loader hoop clamps 778 may be provided to connect cargo loader hoops 770 either to cargo loader stanchions 730 or cargo loader side rails 722. A reinforcing plate 780 may be provided on one or more of the cargo loader hoops 770in order to increase the strength of the cargo loader hoop.

Cargo loader beam 702 may be an elongate member having end caps 716 on one or both ends. Ends caps 716 may be rubber, or another compressible material, and substantially cover the elongate ends of beam 702. A cargo supporter 704 may be attachable to beam 702. Cargo supporter 704 may include a handle 706 and a plurality of wheels 708 to permit the cargo supporter 704 to traverse along beam 702. In the illustrated embodiment, cargo loader beam 702 is an I-beam, however other cross-section dimensions are contemplated within the disclosure. One or more wheels 708 may be provided on either side of beam 702 permitting the cargo supporter 704 to roll along the bottom edge of beam 702. An attachment point 710 may be provided on an underside of the cargo supporter 704. Cargo may be connected directly to attachment point 710, or a cargo controlling attachment 712 may be connected to attachment point 710. A rope, cord, chain, or other attachment similar attachment 714 may be connected between cargo controlling attachment 712 and a piece of cargo. In another embodiment, rope 714 may be directly connected to attachment point 710. A piece of cargo may, accordingly, be attached, directly or indirectly, to cargo supporter 704 and may traverse along beam 702 either towards or away from the vehicle.

Cargo loader beam supports 782 may be provided on one or more of the cargo loader hoop cross bars 776. The cargo loader beam supports 782 may include a plurality of wheels, at least one wheel 784 provided on either side of the beam 702, so as to permit the beam 702 to roll in the longitudinal direction of the vehicle. Accordingly, cargo connected to beam cargo supporter 704 may be moved towards or away from the vehicle either by moving cargo loader 704 along the beam or by moving beam 702 itself. In embodiments where beam 702 is an I-beam, the beam may be sufficiently dimensioned to permit cargo supporter wheels 708 to pass beam supports 782 without contact or interference.

A cargo beam housing 790 may be provided proximate to a longitudinal end of cargo beam 702. In the illustrated embodiment, cargo beam housing 790 may connected to the cargo loader hoop 770 proximate to the vehicle cabin. Cargo beam housing 790 may include a sleeve 792 having an interior space defining a housing cavity 798, which may be dimensioned to accommodate at least a portion of beam 702 entering into cavity 798. Sleeve 792 may be positioned within the longitudinal movement path of beam 702 so as to permit beam 702 to slide along beam supports 782 towards and into sleeve 792. Sleeve 792 may be open on either end so as to permit beam 702 to pass through cavity 798, or sleeve may be open only on the end proximate beam 702 as shown in the illustrated embodiment.

Figure 51:
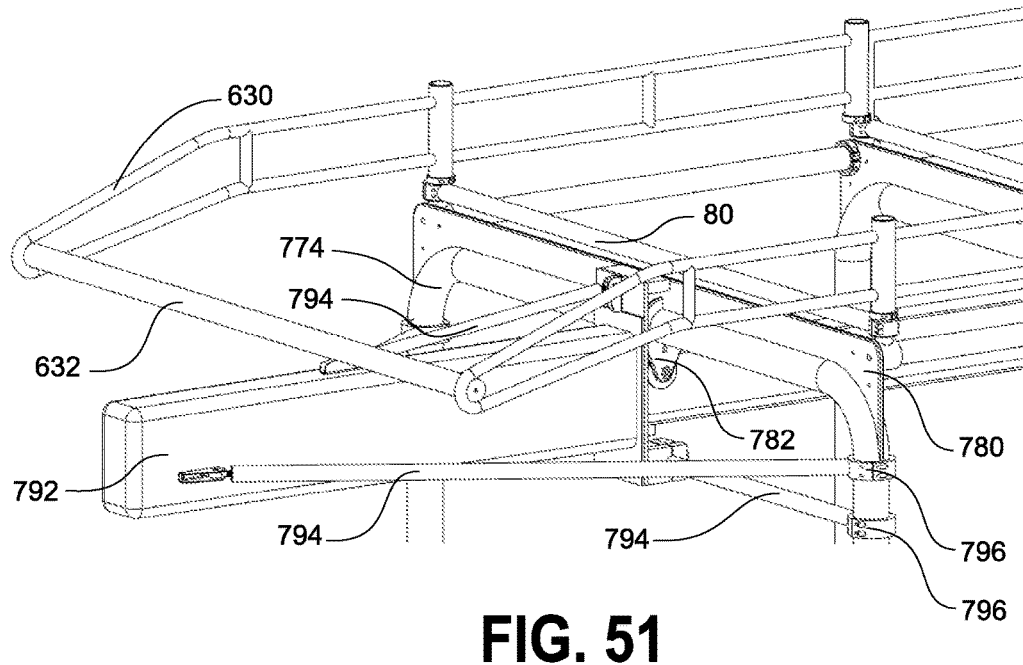
FIG. 51 illustrates a front perspective view of a portion of an embodiment of a cargo loader with an embodiment of elevated rails attached thereto.

A plurality of sleeve supports 794 may be provided to securely hold sleeve 792 on cargo loader hoop 770. Sleeve supports 794 may include clamps 796 for securely attaching to a portion of cargo loader hoop 770, such as one of the legs 772 or cross bars 776. In the illustrated embodiment, two sets of sleeve supports 794 are utilized. A first set of supports 794 are diagonally connected between legs 772 and a distal end of sleeve 792. A second set of sleeve supports 794 are laterally connected between a proximate end of sleeve 792 and legs 772. A third sleeve support 794 may be attached between a top side or top surface of sleeve 790 and a portion of hoop 770, such as plate 780 as shown in FIG. 51. Sleeve supports 794 may be pivotably attached to their connection points on sleeve 792.

Clamps 754 may be utilized to secure cargo loader stanchions 730 to the truck bed side wall. Stanchions 730 may include platform extensions 744 having a channel 746 dimensioned to accommodate the end of a clamp 754. Platform extension 744 may run along a portion of the truck bed side wall, or in some embodiments extension 744 may run along substantially the entire length of side wall 744 and between other stanchions 730/732. A cargo loader stanchion cross bar 766 may also be provided between cargo loader stanchions 730.

Embodiments of cargo loader 700 may be capable of moving cargo weighing hundreds or even thousands of pounds. For instance, in an embodiment where cargo loader rails, such as side rails 722 and legs 772, have approximately 3 inch diameters and are composed of steel or aluminum alloys, cargo loader 700 be able to load and move cargo as heavy as 1500 lbs.

As shown in FIG. 51, cargo loader hoops 770 may be able to accommodate attachment of elevated rails 600. An extendable rod may be provided at or proximate to elbow 774, and the elevated rails 600 may attached to the rod as described in other embodiments described herein. Sleeve 792 may be positioned so as to provide clearance from extension cross bar 632 and extension portion 630. Additional cross bars 80 between elbows 74 so as to permit placement of cargo items on the top side of elevated rails 600, and resting on cross bars 80 and extension cross bar 632, thereby avoiding cargo loader hoop cross bar 776 or plate 780 from having to support cargo on its top side.

Figures 52, 53:
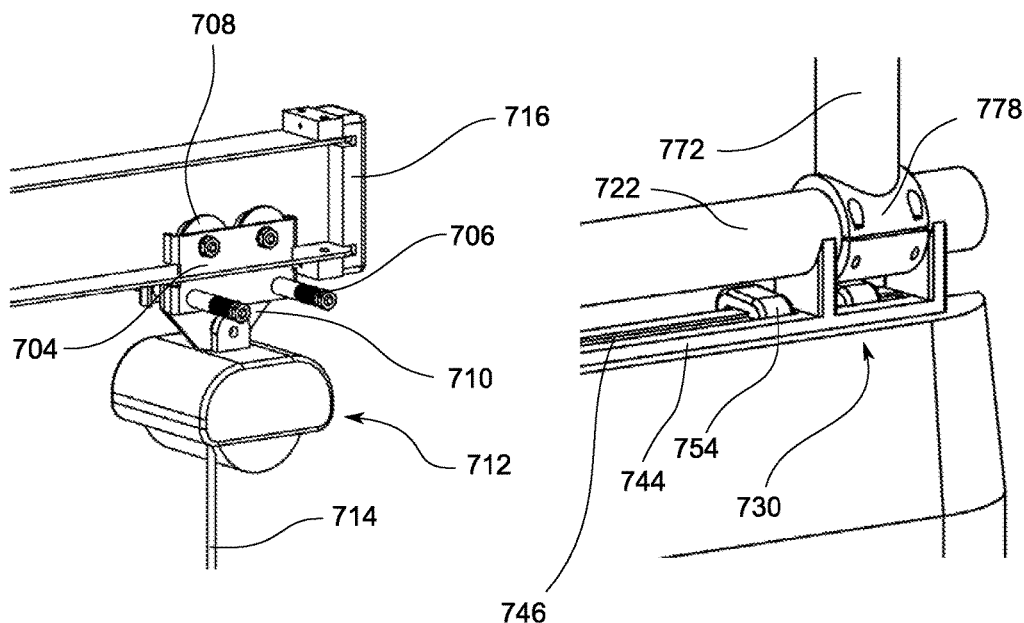
FIG. 52 illustrates a perspective view of an embodiment of a cargo supporter as part of an embodiment of a cargo loader.
FIG. 53 illustrates a perspective view of a portion of an embodiment of a cargo loader near the stanchion.
Figure 53:
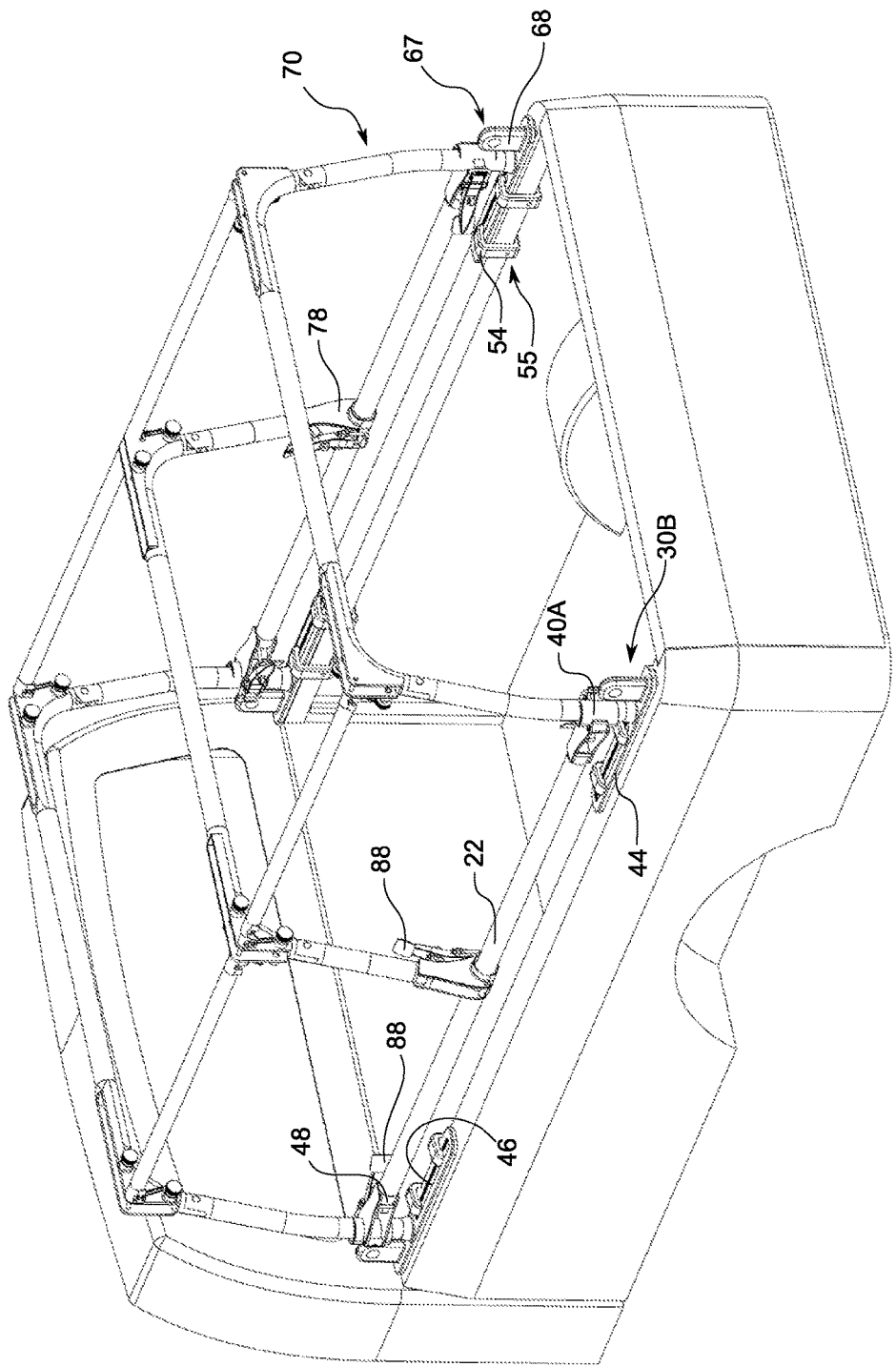
Figure 54:
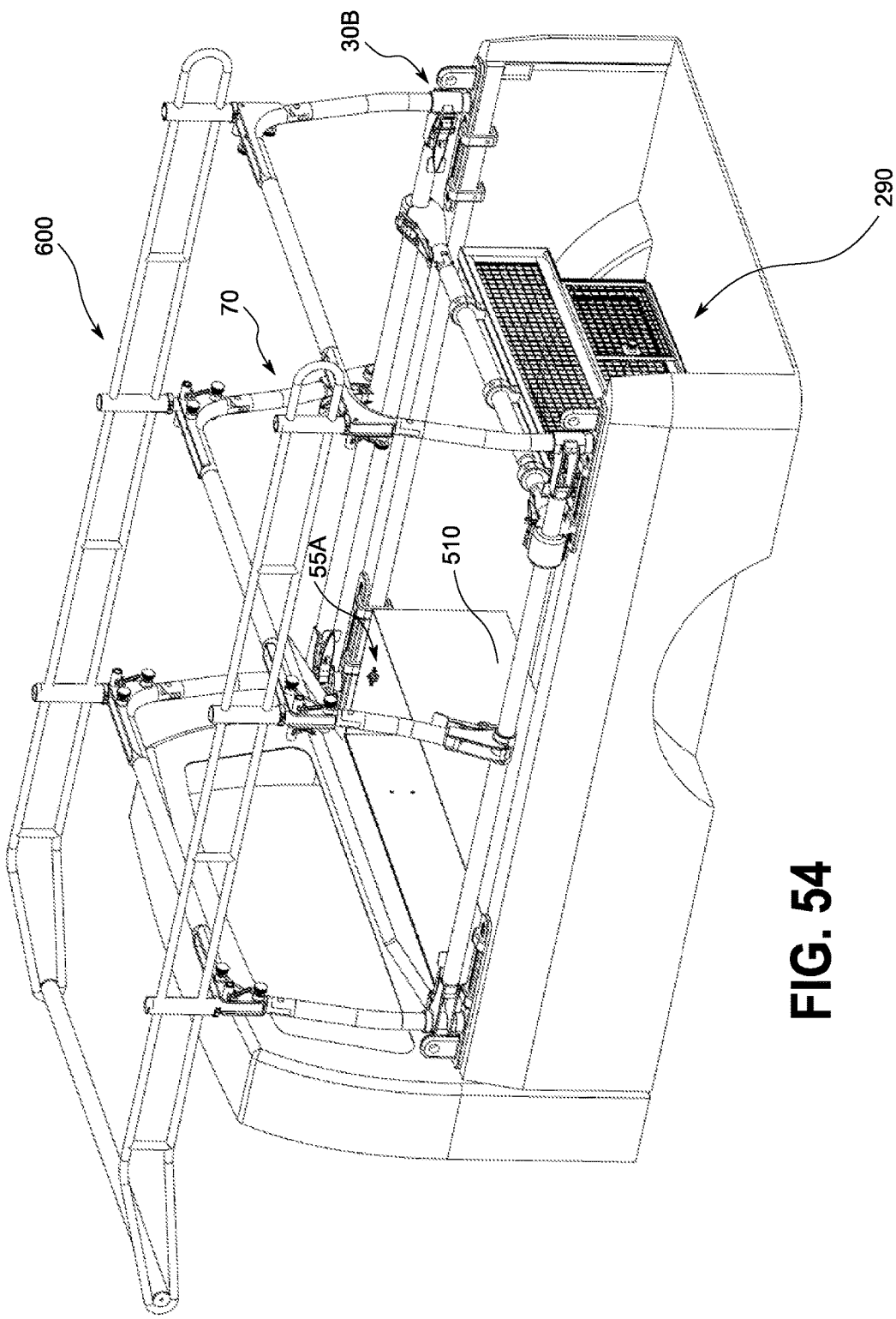
FIG. 54 illustrates a top perspective view of an embodiment of a cargo system including embodiments of a stanchion, a bed divider, elevated rails, and a crossover box.
Figure 55:
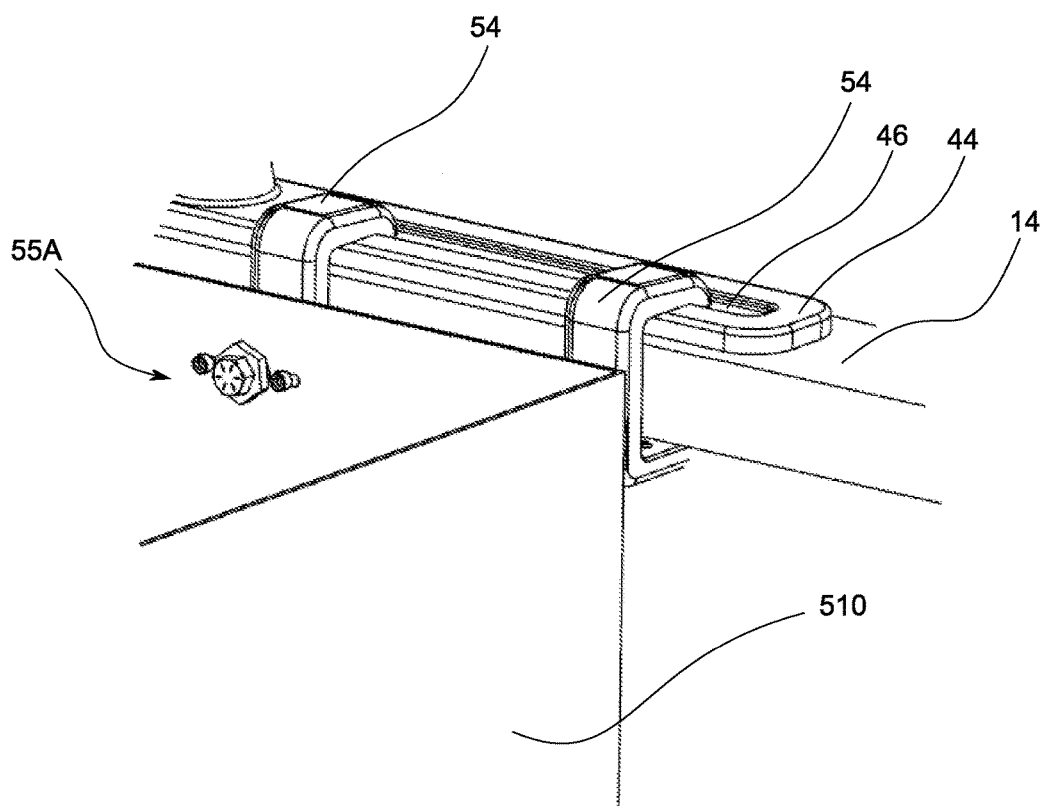
FIG. 55 illustrates a the cargo system of claim near the crossover box and one of the stanchions.

Referring now to FIGS. 53-55, embodiments of cargo systems are shown having stanchions 30B. Unlike other stanchions 30, 30A disclosed herein, this embodiment of stanchion 30B does not include stand posts or an upper bar element. Rather, hoop 70 may be connected to stanchions 30B through engagement with a projecting portion 40A, thereby obviating the inclusion of a clamp 78 as part of hoop 70. Side rail 22 may be engaged with the rail side end 48 of stanchion 30B. A lever 88 may be provided as part of stanchion 30B in order to forcibly press fit hoop legs 72 and side rails 22 with stanchion 30B. A stanchion eyelet 67 may be included in this embodiment, where eyelet perimeter 68 may project away from the top surface of the base platform of stanchion 30B.

With further reference to FIG. 55, clamps 54 disclosed herein for securing stanchions 30, 30A, 30B to the truck bed side walls may include a clamp aperture 55. Components of cargo bed systems may be secured at clamp aperture using known or to be developed fasteners 55A. For instance, an embodiment of crossover box 510 is shown as being attached to clamp apertures 55. In some embodiments, engagement with clamp apertures 55 may be the only connection of certain components with the rest of the cargo system.

Figure 56:
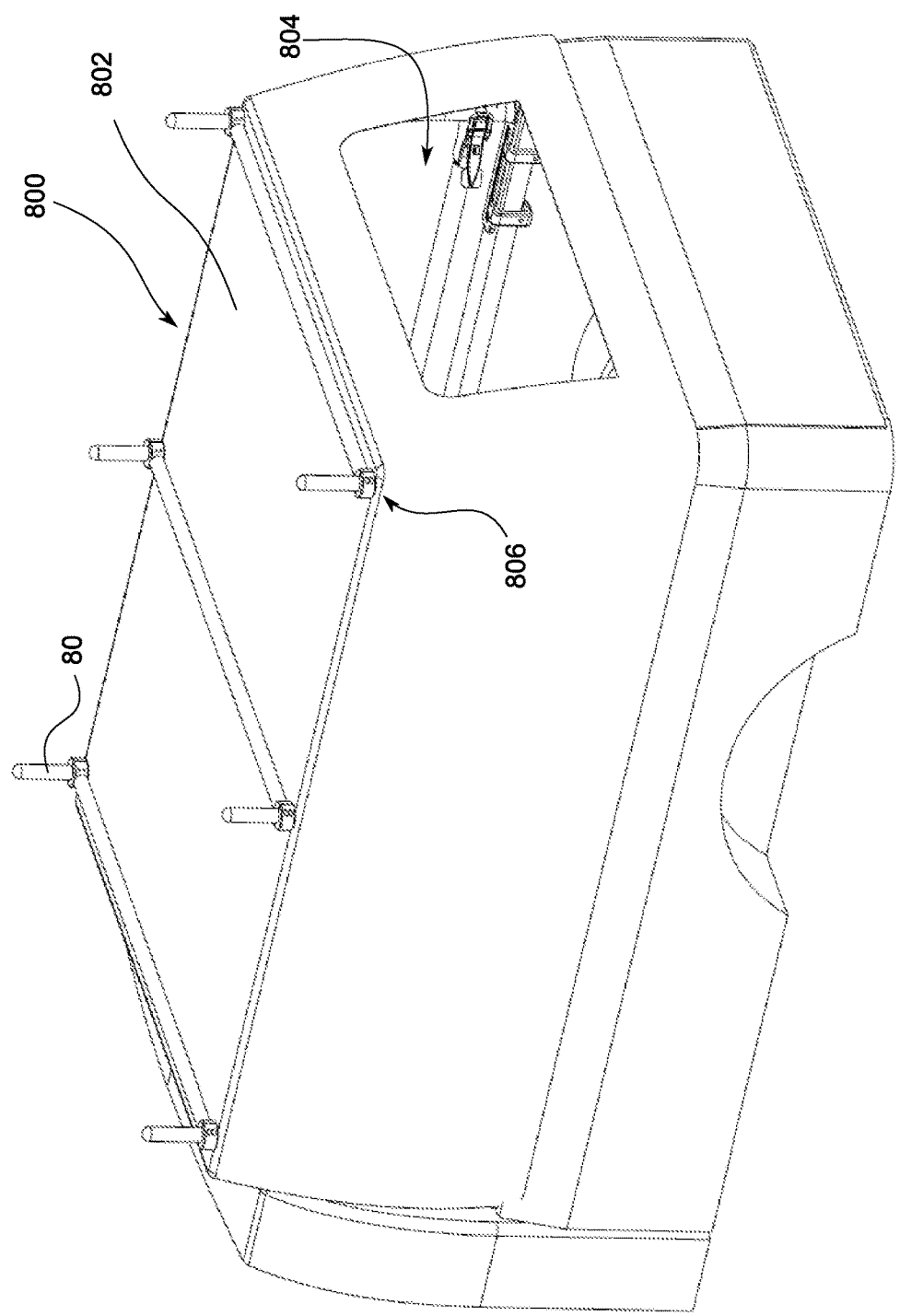
FIG. 56 illustrates a top perspective view of a cargo system including an embodiment of a cover.
Figure 57:
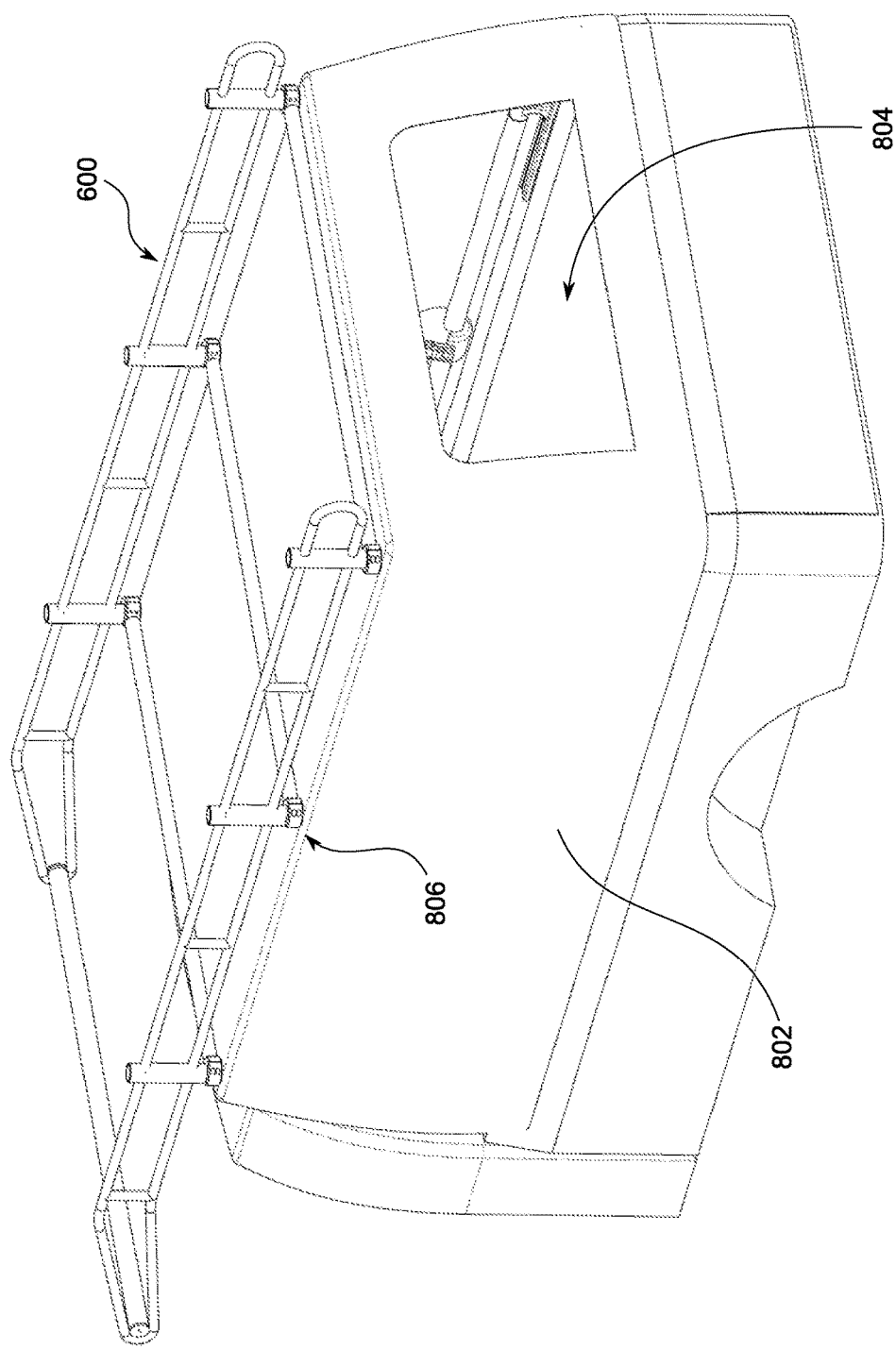
FIG. 57 illustrates a top perspective view of a cargo system including an embodiment of a cover and an embodiment of elevated rails.

FIGS. 56 and 57 illustrate embodiments of a cargo system including an exterior cover 800. Cover 800 may include a tarpaulin or other cover material 802 which may be secured over hoops 70 as previously described herein. One or more windows 804 may be provided in the cover material 802 to facilitate viewing of the interior of cover 800. Windows 804 may be placed, for instance, on the sides or on the rear end of the vehicle. Openings 806 may also be provided to accommodate protrusion of rods 80 from hoops 70 so as to permit attachment of elevated rails 600, or other similar components, even with cover 800 in place. In some embodiments, cover material 802 is transparent to further facilitate viewing of the interior. In some embodiments, cover material 802 may be made of a mesh or netting so as to facilitate air flow, which itself may facilitate the transportation of animals or livestock as the cargo. Tonneau covers are also contemplated for use with embodiments of cargo systems disclosed herein.

Figure 58:
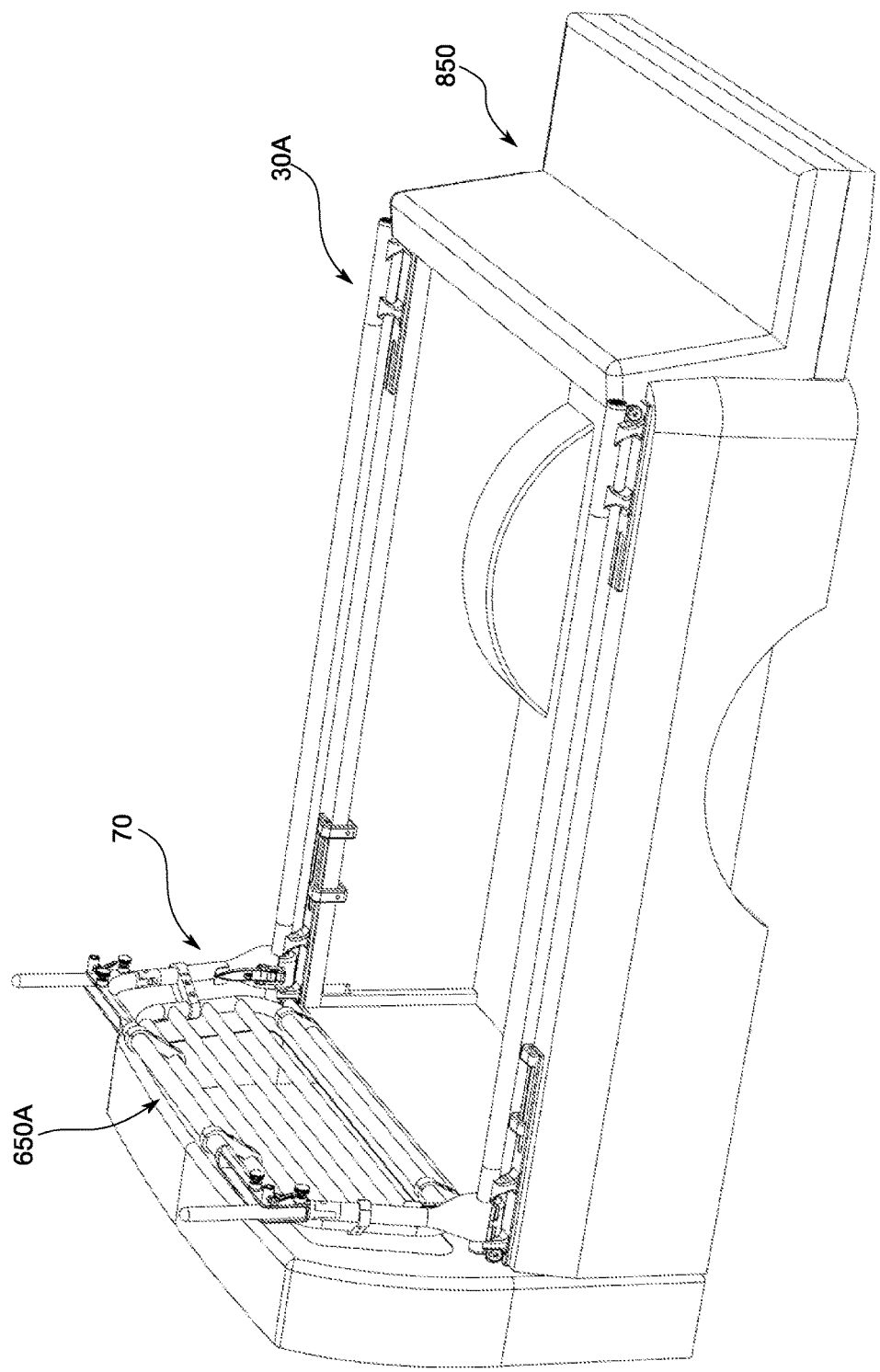
FIG. 58 illustrates a top perspective view of a cargo system including embodiments of a headache rack, stanchions, and a deployable seat.

FIG. 58 shows a cargo system including a deployable seat 850 proximate rear end of the vehicle, or the tail gate for embodiments where the vehicle is truck. Stanchions 30A having stanchion cross bars 66 may be utilized to provide a support to a seat 850 back. The seat 850 may be built into a truck tail gate or me a separate components to be placed on the truck tail gate.

Cargo to be carried and stored as cargo system should be understood to not necessarily be limited to solid items. For instance, a truck bed with an embodiment of the cargo system may be filled with a liquid, such as water. For the embodiment shown in FIG. 58, seat 850 may have a water tight fitting. Embodiments of bed dividers may also be utilized to create a liquid-tight seal at the side walls. A truck bed liner may be deployed to facilitate stowing and carrying liquid cargo thereby ensuring a liquid tight seal in the truck bed.

Figure 59:
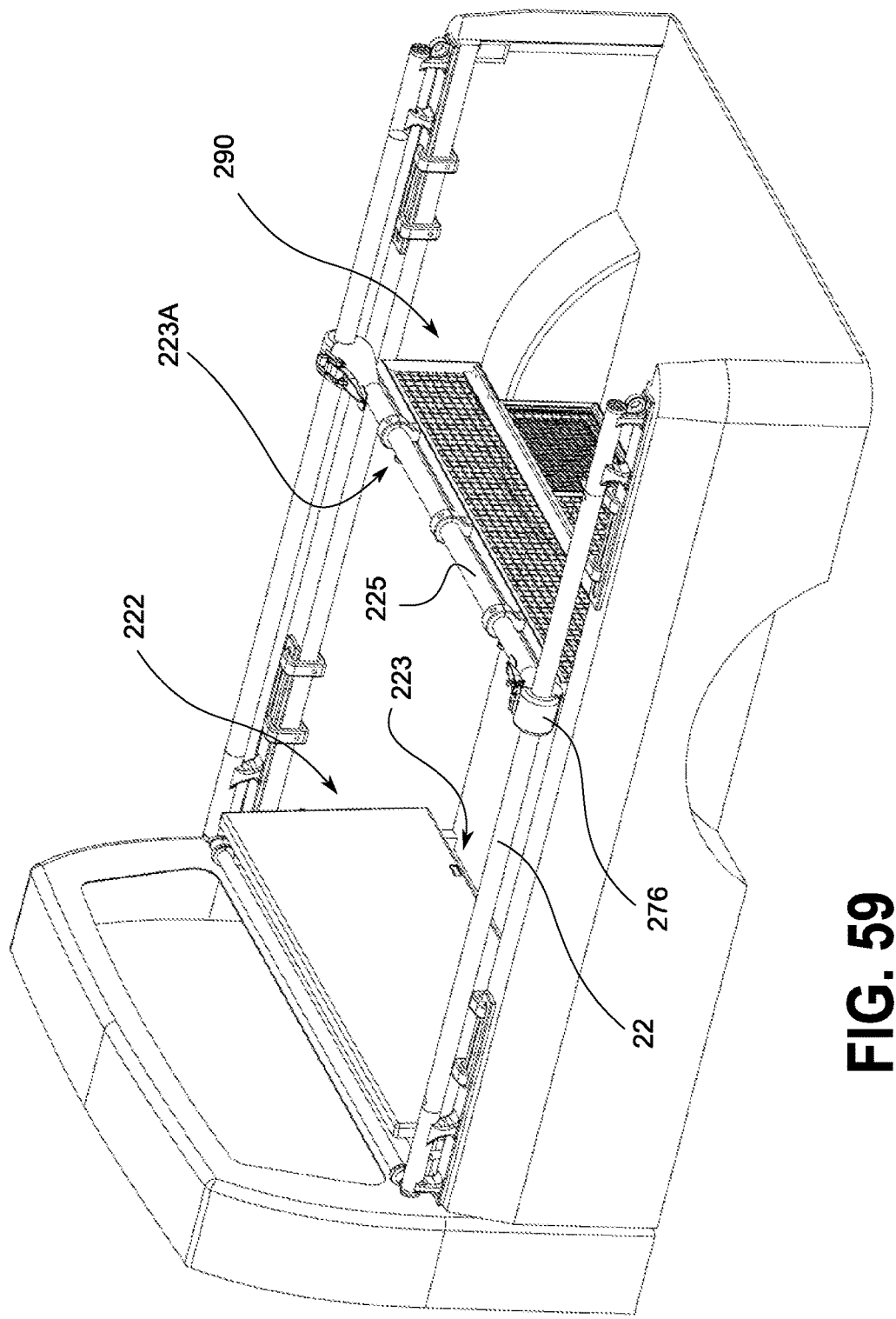
FIG. 59 illustrates a top perspective view of a cargo system including embodiments of a locker top and bed divider.

FIG. 59 illustrates an embodiment of cargo system including a locker top 222 and a bed divider 290, whereby locker top 222 is unsupported by bed divider 290 because the bed divider is positioned in a first position out of reach from locker top 222. The bed divider 290 may be slide along side rails 22, while secured to the side rails which may be by clamps 276, from a first position proximate the rear end, or tailgate side, of the vehicle to a second position proximate the forward end, or cabin side, of the vehicle. In its second position, bed divider 290 may be able to support locker top 222 on its cross bar 225. Grooves or slots 223 may be provided on locker top 222, which may be engageable with a projecting lock receiver 223A, which in one embodiment may be a hasp staple or other similar item. Lock receiver 223A may be provided on cross bar 225 and may inserted through slot 223 when bed divider 222 is in its second position. A lock, such as a pad lock, may be utilized with lock receiver 223A in order to secure locker top 222 to bed divider 225 in a closed orientation.

Embodiments of cargo systems disclosed herein should be not limited to embodiments where components of the cargo system only extend upwards in an elevated direction. For instance, stanchions 30 may project from the side of a vehicle thereby contemplating an embodiment where side rails 22, 24 run along the side of vehicle 10 or on the underside of a gunwale. As evidenced by this contemplated embodiment, the term "elevated" and similar terms used herein should not be limited to components having a greater distance from the earth than a related non-elevated component. Rather, the term "elevated" and similar terms should be recognized to generally mean two components at a distance, or perhaps a variable distance, between one another, including a possible horizontal or angled distance.

Figure 60:
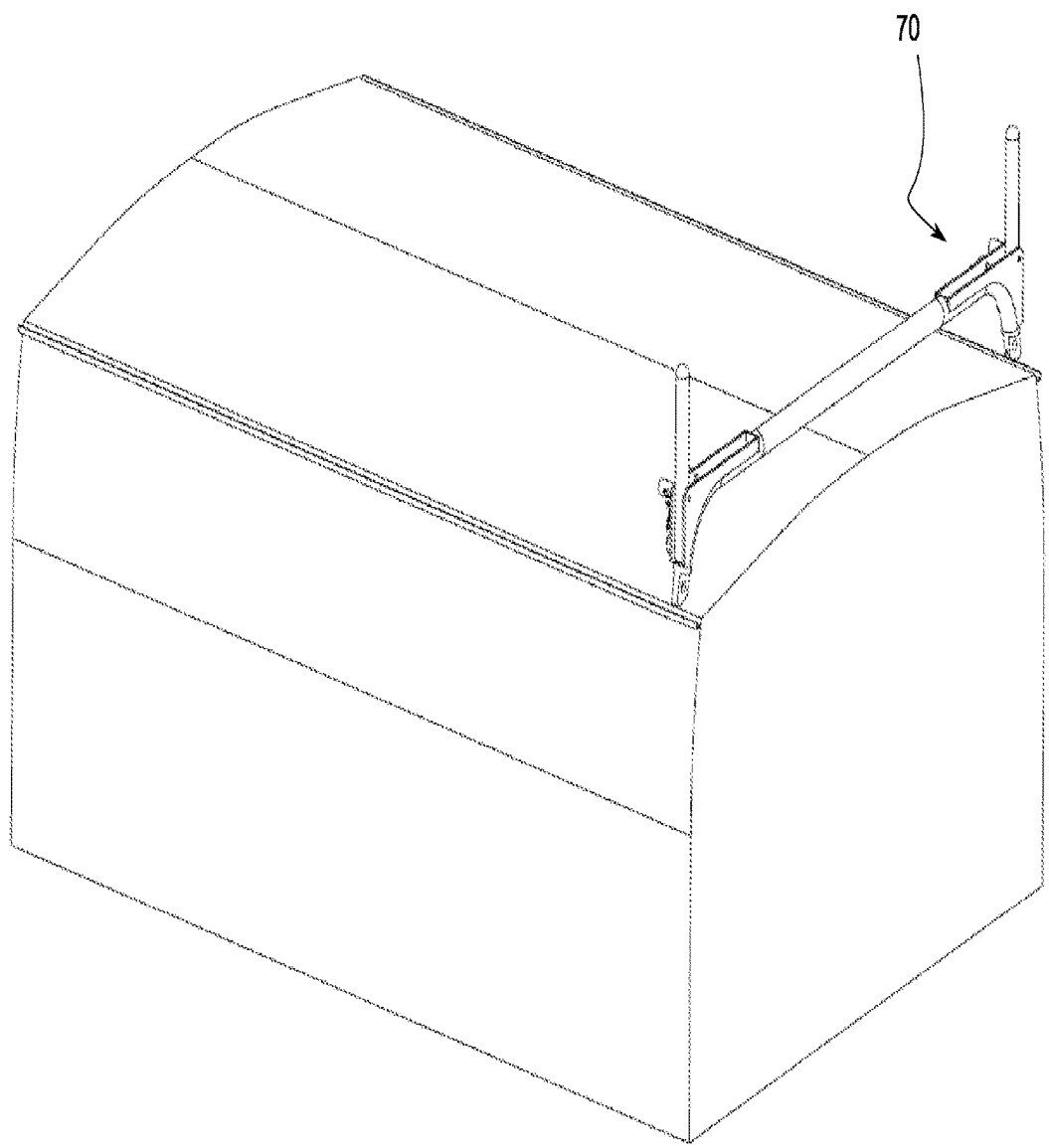
FIG. 60 illustrates a top perspective view of an embodiment for a cargo system for a vehicle other than a truck.

Cargo system embodiments may be utilized for a variety of vehicles, not just trucks as shown in the illustrated embodiments. For instance, a boat may be the vehicle having embodiments of stanchions, side rails, or both may be attached to gunwales of the boat, with modular components such as a bed dividers, hoops, or a cargo loader attached thereto. As another example, a van may be the vehicle whereby embodiments of stanchions, side rails, or both may be attached to the roof of the van, with modular components such as hoops and elevated rails attached thereto. FIG. 60, for instance, shows an embodiment where a hoop 70 is directly attached to the roof of a van. Although a stanchion is not illustrated in FIG. 60, embodiments of stanchions disclosed herein may be attached to the roof of the van, and hoop 70 may be attached thereto in accordance with the various embodiments disclosed herein. A person of ordinary skill in the art would understand the modification of dimensions of certain cargo system components, such as the length of hoop legs or length of side rails, from the illustrated embodiments would be routine in order to apply the components to vehicles other than trucks.

A person of ordinary skill in the art would appreciate that the cargo system embodiments described herein include a variety of modular components which may be interchangeably used in a variety of combinations to assemble a user's preferred cargo system. Simply because one component is described and illustrated separately from another component does not preclude the components from being used jointly as part of an embodiment of a cargo system. On the contrary, a user customizing a cargo system may desire a plurality of these modular components as part of a contemplated embodiment of a cargo system.

The descriptions set forth above are meant to be illustrative and not limiting. Various modifications of the invention, in addition to those described herein, will be apparent to those skilled in the art from the foregoing description. Such modifications are also intended to fall within the scope of the concepts described herein. The disclosures of each patent, patent application and publication cited or described in this document are hereby incorporated herein by reference, in their entireties.

The foregoing description of possible implementations consistent with the present disclosure does not represent a comprehensive list of all such implementations or all variations of the implementations described. The description of some implementation should not be construed as an intention to exclude other implementations. For example, artisans will understand how to implement the invention in many other ways, using equivalents and alternatives that do not depart from the scope of the invention. Moreover, unless indicated to the contrary in the preceding description, none of the components described in the implementations are essential to the invention. It is thus intended that the embodiments disclosed in the specification be considered as illustrative, with a true scope and spirit of the invention being indicated by the following claims

I claim:

1. A cargo system for use with a vehicle, the system comprising:
   a cargo loader, the cargo loader including:
      a plurality of stanchions connected to opposing sides of the vehicle;
      a plurality of hoops, each hoop having a first end and a second end, each end being attached to one of the plurality of stanchions on an opposite side of the vehicle from the other;
      a plurality of cargo loader beam supports, each cargo loader beam support attached to one of the plurality of hoops, wherein the cargo loader beam supports include a plurality of wheels;
      a cargo loader beam, wherein at least one beam support wheel is rollably engaged to each side of the cargo loader beam, wherein the cargo loader beam is movable with respect to the plurality of hoops in a longitudinal direction of the vehicle; and
      a beam sleeve attached to one of the plurality of hoops proximate to a longitudinal end of the cargo loader beam, the beam sleeve including a housing and a cavity defined within the housing, the cavity aligned with the direction of movement of the cargo loader beam and dimensioned to receive a portion of the beam as it moves towards the beam sleeve.

2. The cargo system of claim 1, wherein the cargo loader beam is an I-beam, wherein the cargo loader further includes a cargo supporter that includes a plurality of wheels, wherein at least one wheel is rollably engaged to each side of the cargo loader beam, wherein the cargo supporter is movable along the cargo loader beam.

3. The cargo system of claim 1, further comprising a plurality of sleeve supports connecting the beam sleeve with one of the hoops.

4. The cargo system of claim 1, wherein a distal end of the beam sleeve is closed.

5. A cargo system for use with a vehicle, the system comprising:
   a cargo loader, the cargo loader including:
      a plurality of stanchions connected to opposing sides of the vehicle;
      a plurality of hoops, each hoop having a first end and a second end, each end being releasably clamped to one of the plurality of stanchions on an opposite side of the vehicle from the other;
      a plurality of cargo loader beam supports, each cargo loader beam support attached to one of the plurality of hoops, wherein the cargo loader beam supports include a plurality of wheels; and a cargo loader beam, wherein at least one beam support wheel is rollably engaged to each side of the cargo loader beam, wherein the cargo loader beam is positioned under a longitudinal central portion of each hoop, wherein the cargo loader beam is movable with respect to the plurality of hoops in a longitudinal direction of the vehicle.

6. The cargo system of claim 5, further comprising a beam sleeve attached to one of the plurality of hoops proximate to a longitudinal end of the cargo loader beam, the beam sleeve including a housing and a cavity defined within the housing, the cavity aligned with the direction of movement of the cargo loader beam and dimensioned to receive a portion of the beam as it moves towards the beam sleeve.

7. The cargo system of claim 5, wherein the cargo loader beam is an I-beam, wherein the cargo loader further includes a cargo supporter that includes a plurality of wheels, wherein at least one wheel is rollably engaged to each side of the cargo loader beam, wherein the cargo supporter is movable along the cargo loader beam.

8. The cargo system of claim 5, wherein a distal end of the beam sleeve is closed.

\* \* \* \* \*